United States Patent
Mairs et al.

(10) Patent No.: US 10,171,678 B2
(45) Date of Patent: *Jan. 1, 2019

(54) SYSTEMS AND METHODS OF CALL-BASED DATA COMMUNICATION

(71) Applicant: Metaswitch Networks Ltd, Enfield (GB)

(72) Inventors: Chris Mairs, Enfield (GB); Liz Rice, Enfield (GB); Philip Pearl, Enfield (GB); Felix Palmer, Enfield (GB); David Drysdale, London (GB); Shaun Crampton, Enfield (GB)

(73) Assignee: METASWITCH NETWORKS LTD, Enfield, Middlesex (GB)

( * ) Notice: Subject to any disclaimer, the term of this patent is extended or adjusted under 35 U.S.C. 154(b) by 423 days.

This patent is subject to a terminal disclaimer.

(21) Appl. No.: 14/727,690

(22) Filed: Jun. 1, 2015

(65) Prior Publication Data

US 2016/0088452 A1 Mar. 24, 2016

Related U.S. Application Data

(63) Continuation of application No. 13/864,486, filed on Apr. 17, 2013, now Pat. No. 9,071,950, which is a (Continued)

(30) Foreign Application Priority Data

Mar. 18, 2011 (GB) .................................. 1104545.7

(51) Int. Cl.
*H04M 11/06* (2006.01)
*H04W 4/16* (2009.01)
(Continued)

(52) U.S. Cl.
CPC ......... *H04M 11/06* (2013.01); *H04L 65/1089* (2013.01); *H04L 65/4023* (2013.01);
(Continued)

(58) Field of Classification Search
None
See application file for complete search history.

(56) References Cited

U.S. PATENT DOCUMENTS

| 5,802,282 A | 9/1998 | Hales et al. | |
| 6,112,084 A * | 8/2000 | Sicher | H04W 76/02 370/337 |

(Continued)

FOREIGN PATENT DOCUMENTS

| EP | 0999712 A2 | 5/2000 |
| EP | 1069789 A1 | 1/2001 |

(Continued)

OTHER PUBLICATIONS

International Search Report and Written Opinion issued in corresponding application No. PCT/GB2011/001490 dated Feb. 17, 2012.

(Continued)

*Primary Examiner* — Antim G Shah
(74) *Attorney, Agent, or Firm* — EIP US LLP

(57) ABSTRACT

A method of establishing a communications session for communication of data with respect to a telephony user device and at least one other user device in a data communications network. Communications are conducted with a server system. The communications comprise a client-server connection. Call party details of a telephone call are transmitted to the server system in the communications. The telephone call involves at least the telephony user device, as a first telephony user device involved in the call, and a second telephony user device involved in the call. The call (Continued)

party details including a first identity associated with the first telephony user device and a second identity associated with the second telephony user device.

14 Claims, 36 Drawing Sheets

Related U.S. Application Data continuation of application No. PCT/GB2011/001493, filed on Oct. 18, 2011.

(60) Provisional application No. 61/394,329, filed on Oct. 18, 2010, provisional application No. 61/394,330, filed on Oct. 18, 2010, provisional application No. 61/394,331, filed on Oct. 18, 2010, provisional application No. 61/394,332, filed on Oct. 18, 2010, provisional application No. 61/394,333, filed on Oct. 18, 2010, provisional application No. 61/394,334, filed on Oct. 18, 2010.

(51) Int. Cl.

| | | |
|---|---|---|
| *H04L 29/06* | (2006.01) | |
| *H04L 29/08* | (2006.01) | |
| *H04M 3/42* | (2006.01) | |
| *H04M 3/00* | (2006.01) | |
| *H04M 1/253* | (2006.01) | |
| *H04W 88/06* | (2009.01) | |
| *H04W 76/15* | (2018.01) | |

(52) U.S. Cl.
CPC .............. *H04L 67/02* (2013.01); *H04L 67/14* (2013.01); *H04M 3/42042* (2013.01); *H04W 4/16* (2013.01); *H04M 1/253* (2013.01); *H04M 3/007* (2013.01); *H04W 76/15* (2018.02); *H04W 88/06* (2013.01)

(56) References Cited

U.S. PATENT DOCUMENTS

| | | | |
|---|---|---|---|
| 6,295,551 B1 | 9/2001 | Roberts et al. | |
| 6,317,609 B1 | 11/2001 | Alperovich et al. | |
| 6,351,639 B1 | 2/2002 | Motohashi | |
| 6,516,203 B1 | 2/2003 | Enzmann et al. | |
| 6,658,100 B1 | 12/2003 | Lund | |
| 6,704,294 B1 | 3/2004 | Cruickshank | |
| 6,888,936 B1 | 5/2005 | Groen et al. | |
| 7,039,170 B1 | 5/2006 | Sylvain et al. | |
| 7,496,978 B1 | 3/2009 | Begeja et al. | |
| 7,996,552 B2 | 8/2011 | Philyaw et al. | |
| 9,071,950 B2* | 6/2015 | Mairs ..................... H04L 67/14 | |
| 2002/0019812 A1 | 2/2002 | Board et al. | |
| 2002/0057678 A1 | 5/2002 | Jiang et al. | |
| 2002/0181446 A1 | 12/2002 | Preston et al. | |
| 2003/0078053 A1 | 4/2003 | Abtin et al. | |
| 2004/0114747 A1 | 6/2004 | Trandal et al. | |
| 2004/0152457 A1 | 8/2004 | Goldstein et al. | |
| 2004/0190695 A1 | 9/2004 | Parker | |
| 2004/0213207 A1 | 10/2004 | Silver et al. | |
| 2005/0165719 A1 | 7/2005 | Greenspan et al. | |
| 2005/0249146 A1 | 11/2005 | Pinault et al. | |
| 2006/0026277 A1 | 2/2006 | Sutcliffe | |
| 2006/0227047 A1 | 10/2006 | Rosenberg | |
| 2007/0002840 A1 | 1/2007 | Song et al. | |
| 2007/0010264 A1 | 1/2007 | Sun et al. | |
| 2007/0242809 A1 | 10/2007 | Mousseau et al. | |
| 2007/0244811 A1 | 10/2007 | Tumminaro | |
| 2008/0043965 A1 | 2/2008 | Cellini et al. | |
| 2008/0081627 A1* | 4/2008 | Shan ................... H04W 76/028 455/445 |
| 2008/0117897 A1 | 5/2008 | Criddle et al. | |
| 2008/0146256 A1* | 6/2008 | Hawkins ........... H04M 1/72522 455/466 |
| 2008/0317000 A1* | 12/2008 | Jackson ............. H04L 65/1016 370/352 |
| 2009/0164645 A1 | 6/2009 | Sylvain | |
| 2009/0215425 A1 | 8/2009 | Ebersberger | |
| 2010/0007712 A1 | 1/2010 | Jang | |
| 2010/0056119 A1 | 3/2010 | Shaffer et al. | |
| 2010/0235894 A1 | 9/2010 | Allen et al. | |
| 2010/0250754 A1 | 9/2010 | Birch et al. | |
| 2011/0117878 A1 | 5/2011 | Barash et al. | |
| 2011/0197200 A1 | 8/2011 | Huang et al. | |
| 2011/0225238 A1* | 9/2011 | Shaffer ................... H04L 63/08 709/204 |
| 2013/0136076 A1 | 5/2013 | McNamara et al. | |
| 2013/0230157 A1 | 9/2013 | Mairs | |
| 2013/0230158 A1 | 9/2013 | Mairs | |
| 2013/0252595 A1 | 9/2013 | Mairs | |
| 2013/0278385 A1 | 10/2013 | Baskin et al. | |
| 2014/0013371 A1 | 1/2014 | Brown et al. | |

FOREIGN PATENT DOCUMENTS

| | | |
|---|---|---|
| EP | 1296499 A2 | 3/2003 |
| EP | 1441555 A1 | 7/2004 |
| EP | 2081369 A1 | 7/2009 |
| GB | 2362291 B1 | 1/2004 |
| GB | 2498905 A | 7/2013 |
| GB | 2499544 A | 8/2013 |
| GB | 2500130 A | 9/2013 |
| GB | 2500547 A | 9/2013 |
| JP | 11017782 A | 1/1999 |
| WO | 9859256 A2 | 12/1998 |
| WO | 9949677 A1 | 9/1999 |
| WO | 2002015519 A2 | 2/2002 |
| WO | 03034692 A2 | 4/2003 |
| WO | 2004059995 A1 | 7/2004 |
| WO | 2005064958 A1 | 7/2005 |
| WO | 2006010373 A1 | 2/2006 |
| WO | 2007004933 A1 | 1/2007 |
| WO | 2007062077 A2 | 5/2007 |
| WO | 2007092908 A2 | 8/2007 |
| WO | 2008065662 A2 | 6/2008 |
| WO | 2009009167 A1 | 1/2009 |
| WO | 2009061332 A1 | 5/2009 |
| WO | 2011069559 A1 | 6/2011 |
| WO | 2012052705 A1 | 4/2012 |
| WO | 2012052706 A1 | 4/2012 |
| WO | 2012052707 A1 | 4/2012 |
| WO | 2012052708 A1 | 4/2012 |
| WO | 2012052709 A1 | 4/2012 |
| WO | 2012052710 A1 | 4/2012 |
| WO | 2012080731 A1 | 6/2012 |
| WO | 2012110804 A1 | 8/2012 |

OTHER PUBLICATIONS

International Search Report and Written Opinion issued in corresponding application No. PCT/GB2011/001493 dated Jan. 25, 2012.
International Search Report and Written Opinion issued in corresponding application No. PCT/GB2011/050332 dated Jun. 5, 2012.
International Search Report and Written Opinion issued in corresponding application No. PCT/GB2011/052477 dated May 21, 2012.
International Search Report and Written Opinion issued in corresponding application No. PCT/GB2011/001491 dated Jan. 23, 2012.
International Search Report and Written Opinion issued in corresponding application No. PCT/GB2011/001492 dated Jan. 23, 2012.

\* cited by examiner

SYSTEMS AND METHODS OF CALL-BASED DATA COMMUNICATION

CROSS-REFERENCE TO RELATED APPLICATIONS

This application is a continuation of U.S. application Ser. No. 13/864,486, filed Apr. 17, 2013, which is a continuation of International Application No. PCT/GB2011/001493, filed Oct. 18, 2011, which claims the benefit of: U.S. Provisional Application No. 61/394,329, filed on Oct. 18, 2010; U.S. Provisional Application No. 61/394,330, filed on Oct. 18, 2010; U.S. Provisional Application No. 61/394,331, filed on Oct. 18, 2010; U.S. Provisional Application No. 61/394,332, filed on Oct. 18, 2010; U.S. Provisional Application No. 61/394,333, filed on Oct. 18, 2010; U.S. Provisional Application No. 61/394,334 filed on Oct. 18, 2010; and GB Patent Application No. 1104545.7, filed on Mar. 18, 2011. Each of the above-referenced patent applications is incorporated by reference in its entirety.

BACKGROUND OF THE INVENTION

Field of the Invention

The present invention relates to the communication of data. In particular, but not exclusively, the present invention relates to the communication of data between user devices during telephone calls.

Description of the Related Technology

Communication between parties in a telecommunications network can be carried out in a number of ways. Most commonly, communication is carried out by a calling party dialing the telephone dialing number of a called party telephony device on a calling party telephony device. The dialing of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The exemplary methods of communication described above provide a wide range of options for remote parties to communicate with each other. However, each method typically has different requirements in terms of device and/or network capability and interchanging between the different methods is either not possible or requires use of inconvenient set-up or configuration processes.

It would therefore be desirable to provide improved methods for communicating data between remote parties, including communication of data in a manner convenient to the parties.

SUMMARY

According to a first embodiment of the invention, there is provided a method of establishing a communications session for communication of data with respect to a telephony user device and at least one other user device in a data communications network, the method comprising:

conducting communications with a server system, said communications comprising a client-server connection; and transmitting call party details of a telephone call to the server system in said communications, the telephone call involving at least said telephony user device, as a first telephony user device involved in said call, and a second telephony user device involved in said call, said call party details including a first identity associated with said first telephony user device and a second identity associated with said second telephony user device, wherein said call party details allow the server system to establish a communications session whilst the telephone call is in progress, the communications session being separate from said telephone call and for the transmission of data between said telephony user device and said at least one other user device via the server system, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a second embodiment of the invention, there is provided a telephony user device capable of establishing a communications session for communication of data with respect to at least one other user device in a data communications network, the telephony user device being arranged to:

conduct communications with a server system, said communications comprising a client-server connection; and transmit call party details of a telephone call to the server system in said communications, the telephone call involving at least said telephony user device, as a first telephony user device involved in said call, and a second telephony user device involved in said call, said call party details including a first identity associated with said first telephony user device and a second identity associated with said second telephony user device, wherein said call party details allow the server system to establish a communications session whilst the telephone call is in progress, the communications session being separate from said telephone call and for the transmission of data between said telephony user device and said at least one other user device via the server system, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a third embodiment of the invention, there is provided a computer program product comprising a non-transitory computer-readable storage medium having computer readable instructions stored thereon, the computer readable instructions being executable by a computerized device to cause the computerized device to perform a method of establishing a communications session for communication of data with respect to a telephony user device and at least one other user device in a data communications network, the method comprising:

conducting communications with a server system, said communications comprising a client-server connection; and transmitting call party details of a telephone call to the server system in said communications, the telephone call involving at least said telephony user device, as a first telephony user device involved in said call, and a second telephony user device involved in said call, said call party details including a first identity associated with said first telephony user device and a second identity associated with said second telephony user device, wherein said call party details allow the server system to establish a communications session whilst the telephone call is in progress, the communications session being separate from said telephone call and for the transmission of data between said telephony user device and said at least one other user device via the server system, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a fourth embodiment of the invention, there is provided a method of establishing a communications session for communication of data with respect to a telephony user device and at least one further user device in a data communications network, the method comprising:

conducting communications with a telephony user device, said communications comprising a client-server connection; and receiving call party details of a telephone call from the telephony user device in said communications, the telephone call involving at least said telephony user device, as a first telephony user device involved in said call, and a second telephony user device involved in said call, said call party details including a first identity associated with said first telephony user device and a second identity associated with said second telephony user device, establishing a communications session whilst the telephone call is in progress, the communications session being separate from said telephone call and for the transmission of data between said telephony user device and said at least one other user device, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a fifth embodiment of the invention, there is provided a server system for establishing a communications session for communication of data with respect to a telephony user device and at least one further user device in a data communications network, the server system being arranged to:

conduct communications with a telephony user device, said communications comprising a client-server connection; and receive call party details of a telephone call from the telephony user device in said communications, the telephone call involving at least said telephony user device, as a first telephony user device involved in said call, and a second telephony user device involved in said call, said call party details including a first identity associated with said first telephony user device and a second identity associated with said second telephony user device, establish a communications session whilst the telephone call is in progress, the communications session being separate from said telephone call and for the transmission of data between said telephony user device and said at least one other user device, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a sixth embodiment of the invention, there is provided a telecommunications network arranged to perform a method of establishing a communications session for communication of data with respect to a telephony user device and at least one further user device in a data communications network, the method comprising:

conducting communications with a telephony user device, said communications comprising a client-server connection; and receiving call party details of a telephone call from the telephony user device in said communications, the telephone call involving at least said telephony user device, as a first telephony user device involved in said call, and a second telephony user device involved in said call, said call party details including a first identity associated with said first telephony user device and a second identity associated with said second telephony user device, establishing a communications session whilst the telephone call is in progress, the communications session being separate from said telephone call and for the transmission of data between said telephony user device and said at least one other user device, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

According to a seventh embodiment of the invention, there is provided a computer program product comprising a non-transitory computer-readable storage medium having computer readable instructions stored thereon, the computer readable instructions being executable by a computerized device to cause the computerized device to perform a method of establishing a communications session for communication of data with respect to a telephony user device and at least one further user device in a data communications network, the method comprising:

conducting communications with a telephony user device, said communications comprising a client-server connection; and receiving call party details of a telephone call from the telephony user device in said communications, the telephone call involving at least said telephony user device, as a first telephony user device involved in said call, and a second telephony user device involved in said call, said call party details including a first identity associated with said first telephony user device and a second identity associated with said second telephony user device, establishing a communications session whilst the telephone call is in progress, the communications session being separate from said telephone call and for the transmission of data between said telephony user device and said at least one other user device, wherein the separate communications session is continued in parallel with said telephone call, such that voice call data is transmitted and received between the telephony user device and the second telephony user device via said telephone call and other data may be transmitted and received between said telephony user device and said at least one further user device via the separate communications session.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
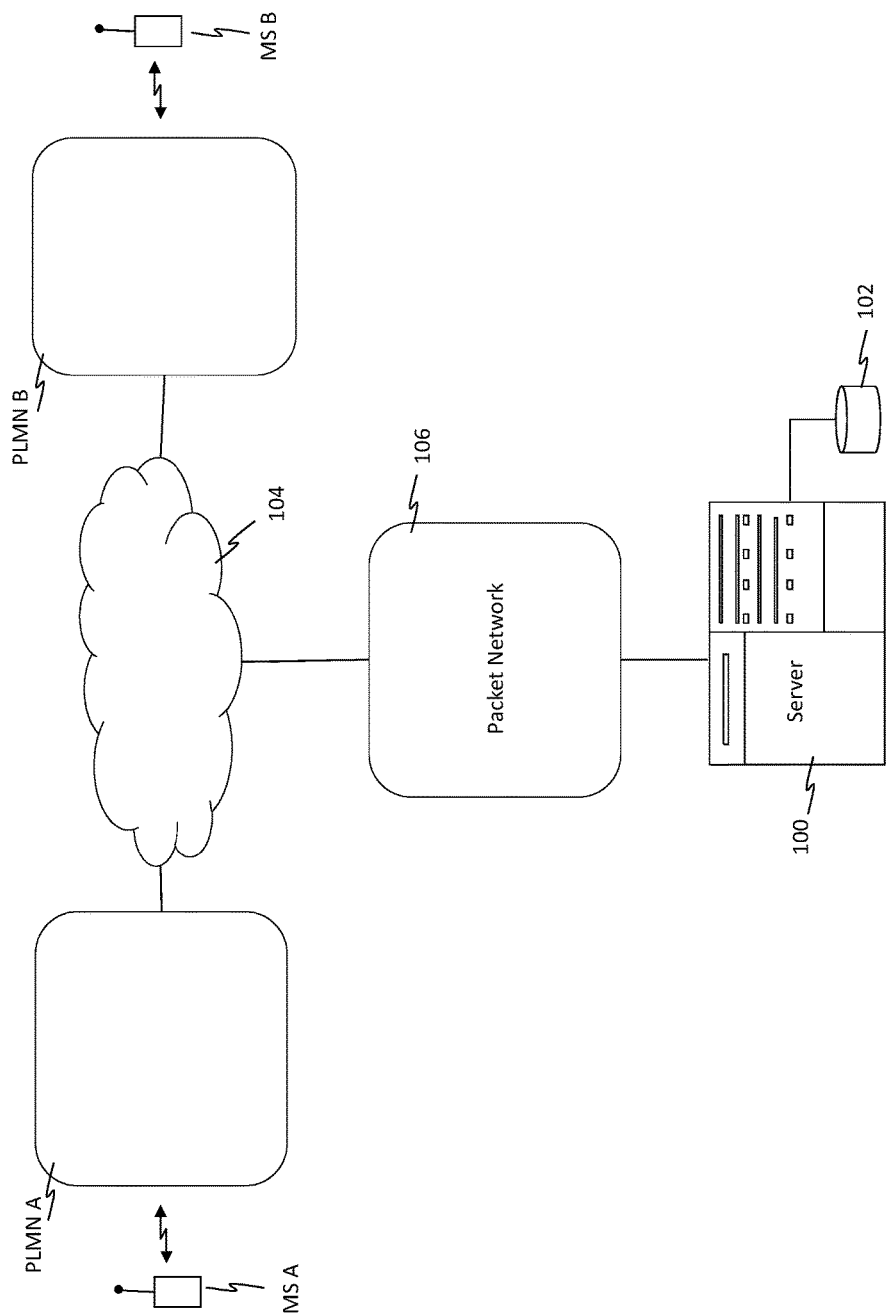
FIG. 1 is a system diagram according to one or more embodiments of the invention.

FIG. 1 is a system diagram showing a data communications network according to embodiments of the present invention. These embodiments involve two mobile stations (MS) MS A and MS B which access public land mobile networks (PLMNs) PLMN A and PLMN B respectively via radio interfaces. MS A and MS B may be smart phones having data processing capabilities and operating systems.

PLMN A and PLMN B contain mobile telephony network infrastructure including one or more mobile switching centers, one or more base station controllers, and one or more base transceiver stations; the function of such entities is well known in the art and will not be described in detail here.

PLMN A and PLMN B are connected via a telecommunications network 104 comprising one or more Public Switched Telephone Networks (PSTNs) and/or packet networks. Telecommunications network 104 comprises one or more media and/or signaling gateway entities (not shown) for performing conversion between the various protocols and data formats used to transfer media and signaling data within and between the different networks. Server system 100 has an associated data store 102 and is connected to telecommunications network 104 via a packet network 106.

Although server system 100 is depicted as a single entity in FIG. 1, server system 100 may be a single device, a cluster of servers or servers distributed throughout the data communications network.

MS A has an associated identity in the form of a telephone dialing number (TDN), TDN A. MS B has an associated identity in the form of a telephone dialing number TDN B. MS A has communication session application software running on it with an associated application identifier AppID A. MS B also has communication session application software running on it with an associated application identifier AppID B.

In some embodiments of the invention, during installation of the application software on MS A, server system 100 may be informed of AppID A and creates a record for MS A in data store 102 containing AppID A stored in association with TDN A. Similarly, in some embodiments of the invention, during installation of the application software on MS B, server system 100 may informed of AppID B and creates a record for MS B in data store 102 containing AppID B stored in association with TDN B.

Figure 2:
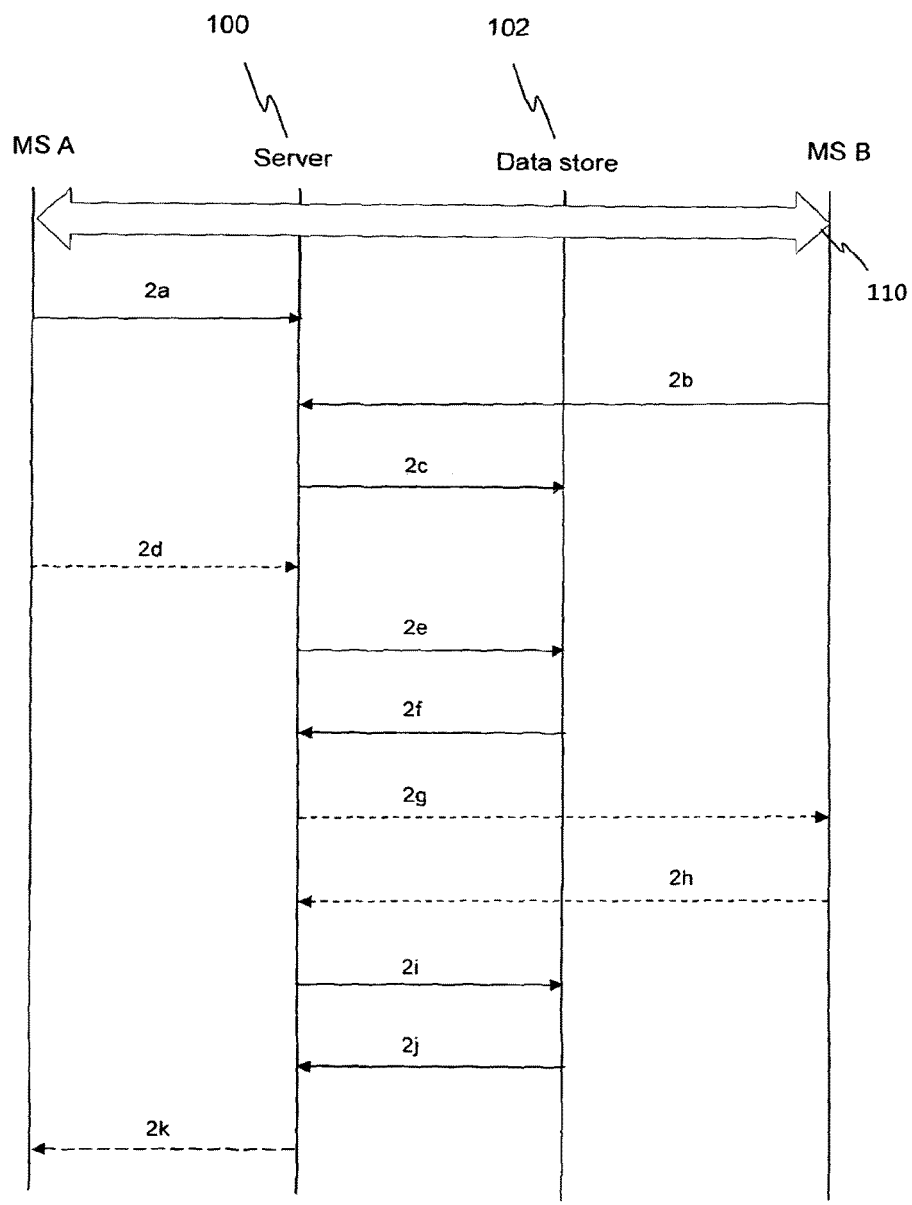
FIG. 2 is a flow diagram depicting operation of one or more embodiments of the invention using the system of FIG. 1.

FIG. 2 is a flow diagram depicting operation of embodiments of the invention, for example implemented in a system depicted in FIG. 1.

In this and subsequent flow diagrams, solid arrows denote transfer of control, messaging or signaling data, whereas dashed arrows denote transfer of media or payload data.

A voice call is currently in progress between MS A in PLMN A and MS B in PLMN B, as shown by item 110. The voice call will typically be a circuit-switched voice call, the set-up and control for which is known in the art.

Application software running on MS A detects that there is a call in progress between MS A and MS B and notifies server system 100 of call party details for the call, e.g. the TDNs of telephones involved in the call, TDN A associated with MS A and TDN B associated with MS B, in step 2a. Similarly, application software running on MS B detects the call in progress between MS B and MS A and notifies server system 100 of call party details for the call, e.g. the TDNs of telephones involved in the call, TDN A associated with MS A and TDN B associated with MS B, in step 2b.

Application software running on MS A may detect that the call is in progress by registering with the operating system of MS A to be notified upon start of a call involving MS A. This could for example involve registering with an application programming interface (API) of the operating system of MS A associated with start and end of call events. A similar call detection process may occur on MS B.

In these embodiments, the user of MS A could be the calling or the called party for the call. Call party details are received from both telephony apparatus acting on behalf of the calling party and telephony apparatus acting on behalf of the called party for the call, e.g. telephony device MS A and telephony device MS B.

Server system 100 identifies that the notification of step 2a from MS A and notification of step 2b from MS B have call party details, TDN A and TDN B, in common and establishes a separate communications session, separate from the telephone call, for the communication of data between MS A and MS B. The separate communications session is established on the basis of the received call party details, TDN A and TDN B. The separate communications session is established whilst the telephone call is in progress, and is continued in parallel with the telephone call, such that voice call data is transmitted via the telephone call and other data may be transmitted via the communications session, after the establishment of the separate communications session.

Server system 100 updates the records for MS A and MS B in data store 102 to indicate that a call is in progress between MS A and MS B and that a communications session between MS A and MS B, separate to the voice call between MS A and MS B, has been established in step 2c.

Server system 100 may respond (not shown) to the notifications of steps 2a and 2b by responding with respective acknowledgements to MS A and MS B.

If MS A wants to communicate data to (e.g. share data with) MS B, it transmits the data to server system 100 in step 2d. Server system 100 performs a lookup in data store 102 using TDN A for MS A in step 2e and identifies that a communications session has been established between MS A and MS B. Server system 100 retrieves TDN B for MS B in step 2f and transmits the data received from MS A to MS B using the retrieved TDN B in step 2g.

In embodiments of the invention, the lookup in data store 102 of step 2e may also result in AppID B being retrieved. The data may then be transmitted to MS B using both TDN B and AppID B, with TDN B being used to locate MS B and AppID B being used to direct the data to the communications session application software running on MS B. The data may be transmitted by means of a push notification directed to AppID B of the communication session application on MS B. In the case of MS B being an Apple® iPhone, the push notification could employ use of the Apple® Push Notification Service (APNS).

If MS B wants to send data to MS A, it sends the data to server system 100 in step 2h. Server system 100 performs a lookup in data store 102 using TDN B for MS B in step 2i and identifies that a communications session has been established between MS B and MS A. Server system 100 retrieves TDN A for MS A in step 2j and transmits the data received from MS B to MS A using the retrieved TDN A in step 2k.

In embodiments of the invention, the lookup in data store 102 of step 2j may also result in AppID A being retrieved. The data may then be transmitted to MS A using both TDN A and AppID A, with TDN A being used to locate MS A and AppID A being used to direct the data to the communications session application software running on MS A. The data may be transmitted by means of a push notification directed to AppID A of the communication session application on MS A.

In embodiments of the invention, the communication session is established in the form of a client-server relationship, with server system 100 acting as the server and each of MS A and MS B acting as clients. One connection is created between server system 100 and MS A and another connection is created between server system 100 and MS B. The two connections together create a channel between MS A and MS B through which data can be communicated in either direction.

In embodiments of the invention, server system 100 establishes client-server connections with MS A and MS B in response to receiving one or more client-server connection requests.

In embodiments of the invention, a client-server connection request is transmitted in response to the telephone call being established between MS A and MS B. In other embodiments, a client-server connection request is transmitted in response to initiation of a data communications service on MS A or MS B after the telephone call is established between them.

Each of the connections could be HyperText Transfer Protocol (HTTP) or HyperText Transfer Protocol Secure (HTTPS) connections.

To avoid loss of the channel between MS and MS B, the connections can be maintained by maintenance messages ('heartbeats') transmitted from server system 100 to MS A and MS B, for example transmitted at periodic intervals sufficiently short to prevent time-out of the connections due to inactivity, e.g. a client-server connection can be maintained by transmitting a message to keep the connection alive if the telephone call lasts more than a connection threshold period.

The data communicated via the session may comprise server system 100 receiving data identifying a downloadable resource, selected from the group consisting of a photographic image data file; a word processing document data file; a spreadsheet document data file; a presentation document data file; a video image data file; and streaming video, from one of MS A and MS B, during the separate communications session, and transmitting the data to the other of MS A and MS B, for example via the client-server connection.

In embodiments of the invention, the communications session between MS A and MS B can be maintained after the voice call is terminated allowing the users of MS A and MS B to continue communicating data between their user devices.

In alternative embodiments of the invention, the separate communications session is established via server system 100 and data is transmitted via a data communication path between MS A and MS B which is established on the basis of information received from said server system, but with server system 100 not being including in the data communication path.

Server system 100 may receive a service data object from MS A or MS B during the separate communications session and transmit the service data object to the other of MS A and MS B.

Server system 100 may receive a service data object from MS A or MS B during the separate communications session, process the service data object in combination with additional service data to generate derived service data; and transmit the derived service data to the other of MS A and MS B.

Figure 3:
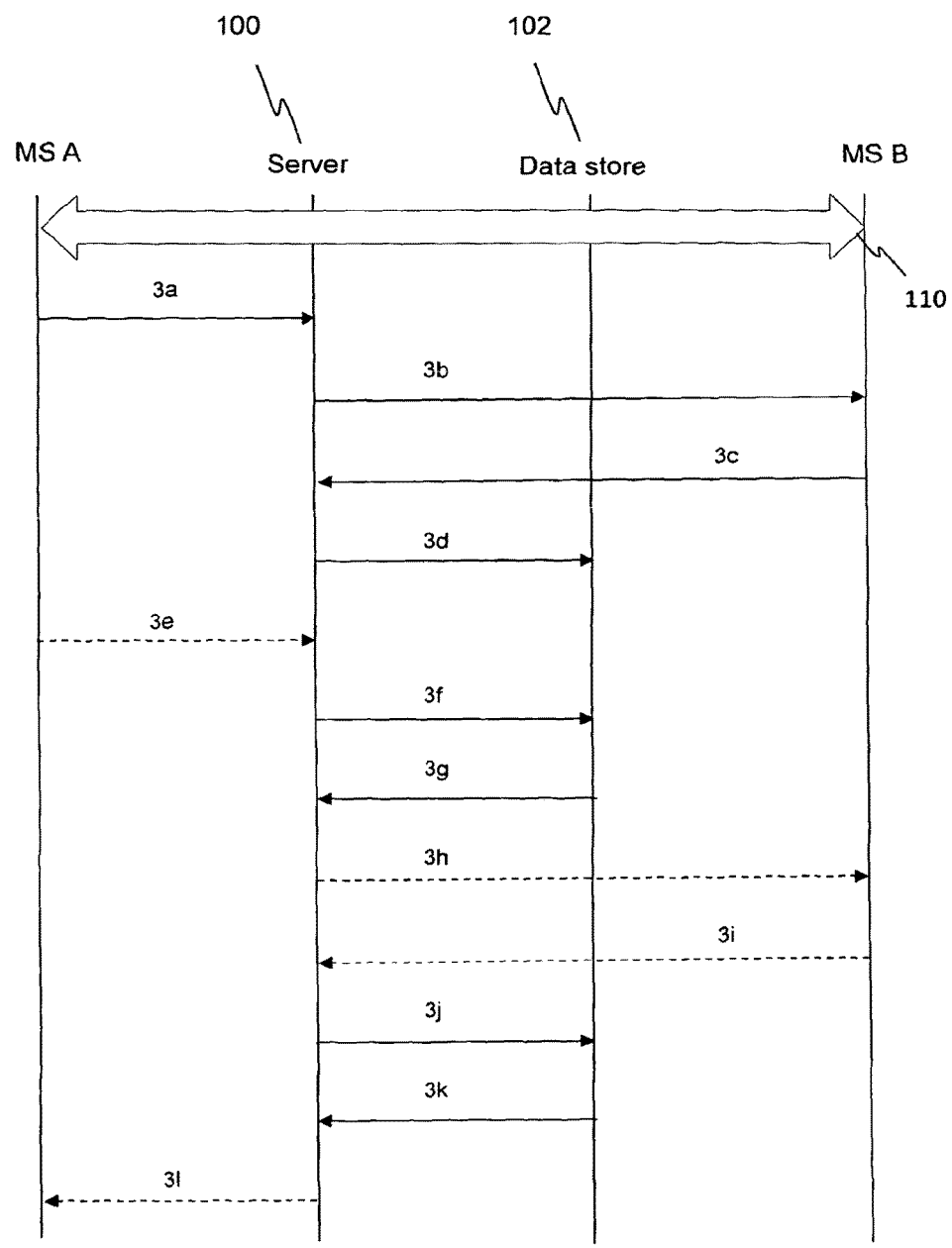
FIG. 3 is a flow diagram depicting operation of one or more embodiments of the invention using the system of FIG. 1.

FIG. 3 is a flow diagram depicting operation of embodiments of the invention, for example implemented in a system depicted in FIG. 1. Similarly to FIG. 2 described above, a voice call is currently in progress between MS A in PLMN A and MS B in PLMN B, as shown by item 110.

Application software running on MS A detects that there is a call in progress between MS A and MS B and notifies server system 100 of call party details for the call, e.g. the TDNs of telephones involved in the call, TDN A associated with MS A and TDN B associated with MS B, in step 3a. Here, however, MS B does not have application software or any other capability which can detect the call with MS A and notify server system 100 of such. Instead, server system 100 notifies MS B of the receipt of call party details for the call from MS A by transmitting a separate communication session initiation request to MS B in step 3b. The communication session initiation request may cause a message such as "Do you want to establish a data communication session with the party you are speaking to?" or such like. If the user of MS B accepts the request by appropriate user input, MS B transmits a separate communication session initiation response to server system 100 in step 3c indicating that a communication session between MS B and MS A, separate to the voice call, should be established.

In these embodiments, the user of MS A could be the calling or the called party for the call. Call party details are received from either telephony apparatus acting on behalf of the calling party or telephony apparatus acting on behalf of the called party, e.g. MS A.

Once, the response of step 3c is received, server system 100 updates the records for MS A and MS B in data store 102 in step 3d to indicate that a call is in progress between MS A and MS B and that a separate communications session between MS A and MS B should be established.

Similarly to FIG. 2 described above, server system 100 establishes a separate communications session, separate from the telephone call, for the communication of data between MS A and MS B. The separate communications session is established on the basis of the received call party details, e.g. TDN A and TDN B, whilst the telephone call is in progress, and is continued in parallel with the telephone call, such that voice call data is transmitted via the telephone call and other data can be transmitted via the communications session, after the establishment of the separate communications session.

Communication of data from MS A to MS B can now occur in steps 3e to 3h by a similar process to that described above for steps 2d to 2g in relation to FIG. 2. Further, communication of data from MS B to MS A can now occur in steps 3i to 3l in a similar process to that described above for steps 2h to 2k in relation to FIG. 2.

Figure 4:
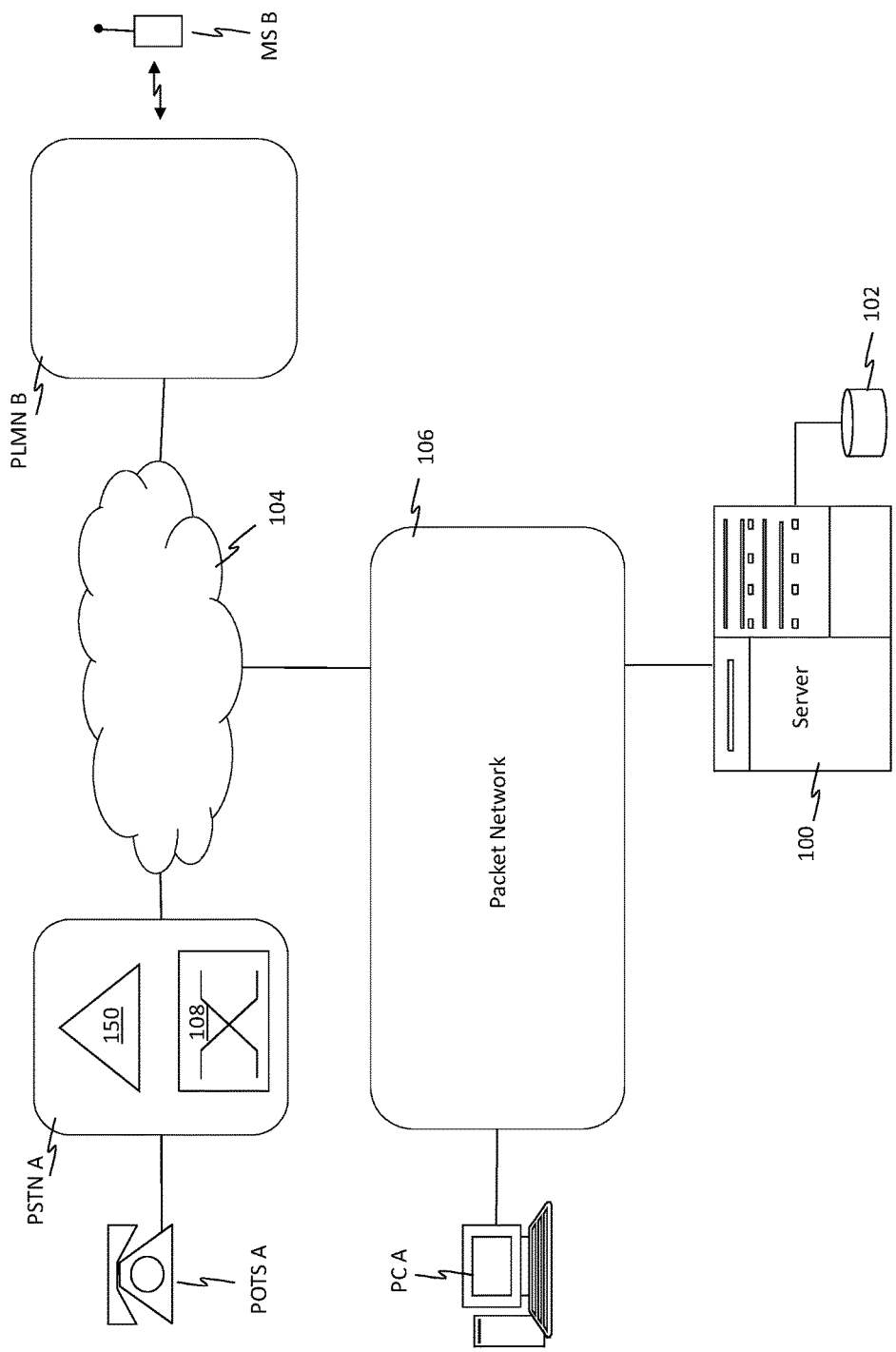
FIG. 4 is a system diagram according to one or more embodiments of the invention.

FIG. 4 is a system diagram showing a data communications network according to embodiments of the present invention. FIG. 4 includes some entities similarly depicted and labelled to FIG. 1, with such entities functioning in a similar manner.

The embodiments of FIG. 4, however, involve an analogue telephone (sometimes referred to as a Plain Old Telephone Service (POTS) telephone or a 'black phone'), denoted POTS A, located in PSTN A, and a mobile station MS B located in PLMN B. PSTN A and PLMN B are connected via a telecommunications network 104 comprising one or more PSTNs and/or packet networks. Further, the user of POTS A also has an associated personal computer PC A connected to packet network 106.

In these embodiments of the invention, the user of POTS A cannot conduct communications sessions separate to voice calls conducted via POTS A just using POTS A alone. The user of POTS A therefore additionally employs PC A through which separate communications sessions can be conducted. To provide both voice calls via POTS A and separate communication sessions via PC A, POTS phone and PC A are coupled together logically.

POTS A has an associated telephone dialing number TDN A and MS B has an associated telephone dialing number TDN B. PC A has an associated network address in the form of an Internet Protocol (IP) address IP A in packet network 106. MS B has communications session application software running on it with an associated identifier AppID B.

PSTN A includes a network element 108 in the form of a call switching element, sometimes referred to as a Service Switching Point (SSP), which is capable of detecting whether a query should be raised in relation to calls to/from particular telephone dialing numbers by analyzing in-call signaling information for the calls. Network element 108 acts on behalf of the user of POTS A and PC A and is configured to trigger a query, e.g. hand call control, to a service control point (SCP) network node 150 when it detects a predetermined call state for a call to/from TDN A associated with POTS A, for example by use of an Intelligent Network (IN) or Advanced Intelligent Network (AIN) call origination/termination trigger. SCP 150 is a network node responsible for deciding upon how such queries should be dealt with and acting accordingly, for example responding to network element 108 with appropriate instructions. The query from network element 108 to SCP 150 may pass via one or more Signaling Transfer Points (STPs) (not shown).

Upon receipt of in-call signaling information relating to a query from network element 108, SCP 150 is configured to trigger notification of such to server system 100. Any such notification to server system 100 will include call party details for the call, e.g. the TDNs of telephones involved in the call, TDN A associated with POTS A and TDN B associated with MS B.

Configuration of SCP 150 may involve storing an IP address for server system 100 in association with TDN A, such that when in-call signaling information relating to a call to/from POTS A is received, notification to server system 100 at the stored IP address is triggered.

In the embodiments of FIG. 4, POTS A has no communication session application software running on it. Further, POTS A has no capability to generate notifications when a call is outgoing from or incoming to POTS A.

Instead, PC A has communication session application software running on it for facilitating communication sessions according to embodiments of the invention.

During installation of the communication session application software on PC A, server system 100 is informed that PC A and POTS A are to be coupled together logically. PC A sends IP A and TDN A to server system 100 which creates a record for the user of POTS A and PC A in data store 102 containing IP A stored in association with TDN A. Similarly, during installation of the application software on MS B, server system 100 is informed of AppID B and creates a record for MS B in data store 102 containing AppID B stored in association with TDN B.

Figure 5:
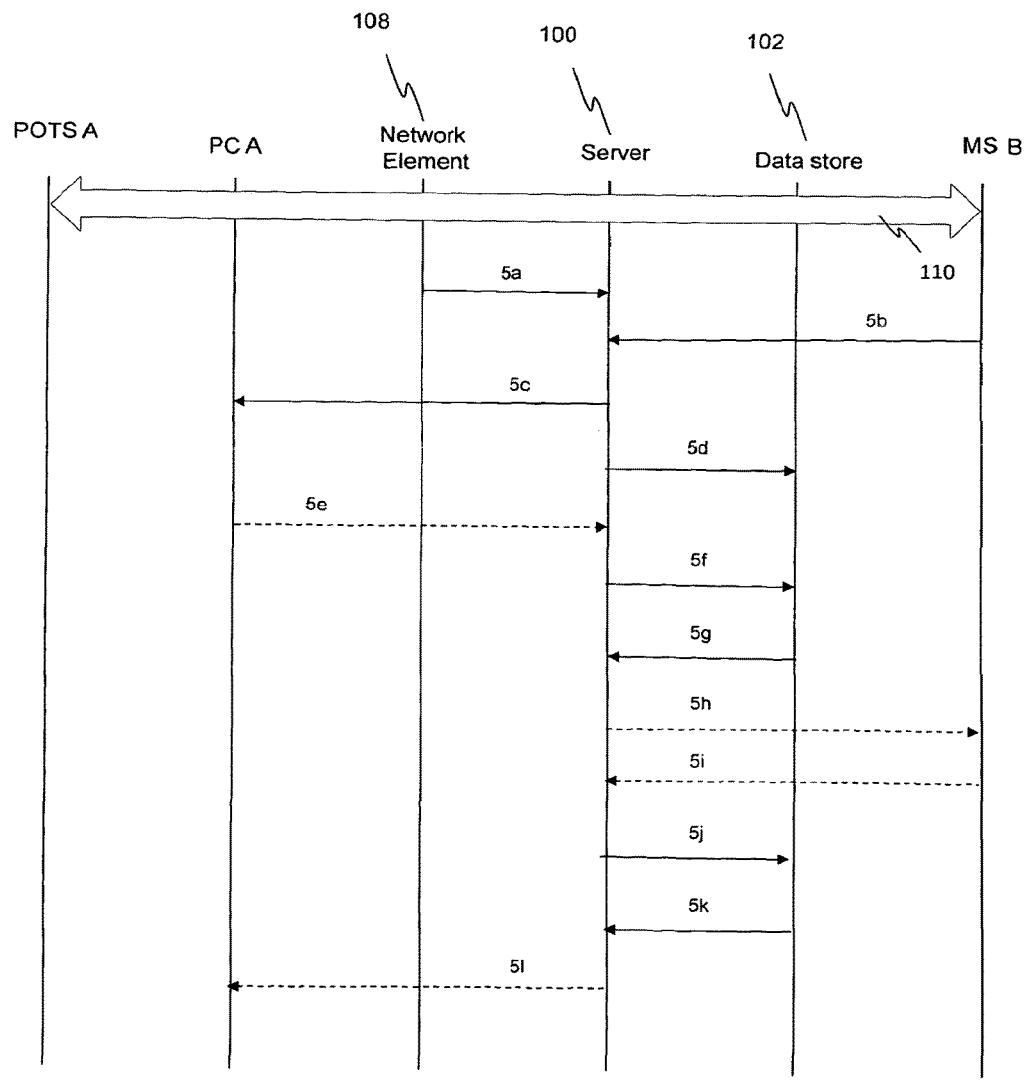
FIG. 5 is a flow diagram depicting operation of one or more embodiments of the invention using the system of FIG. 4.

FIG. 5 is a flow diagram depicting operation of embodiments of the invention, for example implemented in a system depicted in FIG. 4. Similarly to FIG. 2 described above, a voice call is currently in progress between POTS A in PSTN A and MS B in PLMN B, as shown by item 110.

In the case of an outgoing call being made by POTS A to MS B, network element 108 receives in-call signaling information for the call, including TDN A, for which an AIN call origination trigger is configured. This triggers notification of call party details for the call to server system 100 in step 5a.

In the case of an incoming call being received by POTS A from MS B, network element 108 receives in-call signaling information for the call, including TDN, for which an AIN call termination trigger is configured. This triggers notification of call party details for the call to server system 100 in step 5a.

A call termination/origination trigger relating to a call to/from POTS A will include call party details for the call, e.g. the TDNs of telephones involved in the call, TDN A associated with POTS A and TDN B associated with MS B.

Application software running on MS B detects the call in progress between MS B and POTS A and notifies server system 100 of call party details for the call, e.g. the TDNs of telephones involved in the call, TDN A associated with POTS A and TDN B associated with MS B, in step 5b.

In these embodiments, the user of POTS A could be the calling or the called party for the call. Call party details are received from non-telephony apparatus acting on behalf of one of the call parties and from the telephony apparatus acting on behalf of the other of the call parties, e.g. network element 108 and MS B.

Server system 100 identifies that the notification of step 5a from network element 108 and the notification of step 5b from MS B have call party details, TDN A and TDN B, in common, e.g. server system 100 matches the call party details received on behalf of each respective party to the call.

Server system 100 maps the identity TDN A of POTS A to the network address for PC A, e.g. IP A, by reference to data store 102. Alternatively, IP A may be received during the call along with the call party details.

Server system 100 establishes a communications session, separate from the telephone call between POTS A and MS B, for the communication of data between PC A and MS B. The separate communications session is established on the basis of the received call party details, e.g. TDN A and TDN B. Once the separate communications session is established, voice call data is transmitted via the telephone call and other data can be transmitted via the separate communications session.

Server system 100 notifies PC A via IP A that a call has been detected between POTS A and MS B and that a separate communications session has been established between PC A and MS B in step 5c.

Server system 100 updates the records for POTS A/PC A and MS B in data store 102 in step 5d to indicate that a call is in progress between POTS A and MS B and that a separate communications session between PC A and MS B has been established.

If the user of POTS A and PC A wants to communicate data to MS B, the user sends the data using PC A to server system 100 in step 5e. Server system 100 performs a lookup in data store 102 using IP A for PC A in step 5f and identifies that a communications session has been established between PC A and MS B separately to the call taking place between POTS A and MS B. Server system 100 retrieves TDN B for MS B in step 5g and transmits the data received from PC A to MS B using the retrieved TDN B in step 5h.

In embodiments of the invention, the lookup in data store 102 of step 5f may also result in AppID B being retrieved. The data may then be transmitted to MS B using both TDN B and AppID B, with TDN B being used to locate MS B and AppID B being used to direct the data to the communications session application software running on MS B.

If the user of MS B wants to send data to the user of POTS A and PC A, the user of MS B sends the data to server system 100 in step 5i. Server system 100 performs a lookup in data store 102 using TDN A for POTS A in step 5j and identifies that a communications session has been established between PC A and MS B separately to the call taking place between MS B and POTS A. Server system 100 retrieves IP A for PC A in step 5k and transmits the data received from MS B to PC A using the retrieved IP A in step 5l.

In alternative embodiments of the invention, instead of both call party detail notifications being sent to server system 100 in steps 5a and 5b, server system 100 may instead notify MS B of the request from PC A to initiate establishment of a separate communications session in a similar manner to step 3b described above in relation to FIG. 3. Similarly to step 3c, MS B will then transmit a communication session initiation response (in response to user input on MS B indicating acceptance of the request) to server system 100 indicating that a communication session separate to the voice call between POTS A and MS B should be established between MS B and PC A.

Similarly to embodiments of the invention described above in relation to FIG. 2, the communication session is established in the form of a client-server relationship, with server system 100 acting as the server and each of PC A and MS B acting as clients. One connection is created between server system 100 and PC A and another connection is created between server system 100 and MS B. The two connections together create a channel between PC A and MS B through which data can be communicated in either direction.

In some embodiments of the invention, establishing the session comprises receiving a client-server connection request from PC A and establishing a client-server connection with PC A. In other embodiments of the invention, establishing the session comprises receiving a client-server connection request from MS B and establishing a client-server connection with MS B.

In embodiments of the invention, the client-server connection request is transmitted in response to the telephone call between POTS A and MS B being established. In other embodiments of the invention, the client-server connection request is transmitted in response to initiation of a data communications service on PC A after the telephone call between POTS A and MS B is established.

If the call between POTS A and MS B is terminated at any stage and server system 100 receives an indication of such, a notification message may be transmitted to PC A to inform it of a change of state of the separate communication session.

In alternative embodiments of the invention, network element 108 is a call initiating element, for example configured to initiate the establishment of the telephone call between POTS A and MS B in response to a remote click-to-dial website action by a user.

Figure 6:
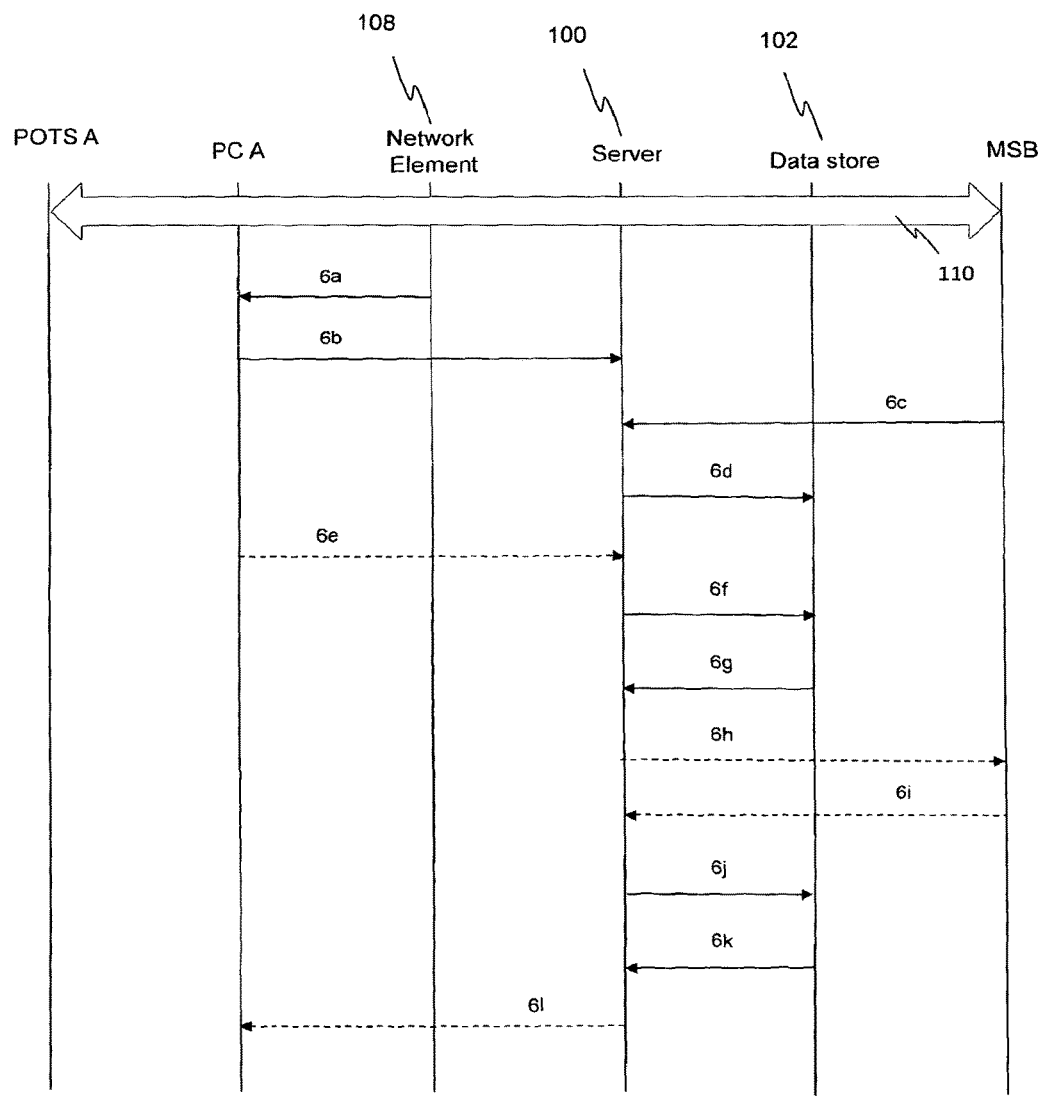
FIG. 6 is a flow diagram depicting operation of one or more embodiments of the invention using the system of FIG. 4.

FIG. 6 is a flow diagram depicting operation of embodiments of the invention, for example implemented in a system depicted in FIG. 4. Network element 108 is configured similarly to network element 108 described above in relation to FIG. 4, e.g. when it detects a call to/from TDN A associated with POTS A, for example by use of an Advanced Intelligent Network (AIN) call origination/termination trigger, a query to SCP 150 is triggered. Here, however, SCP is configured such that upon receipt of in-call signaling information relating to a query from network element 108, notification to PC A is triggered, instead of notification to server system 100. Any such notification to PC A will include call party details for the call, e.g. the TDNs of telephones involved in the call, TDN A associated with POTS A and TDN B associated with MS B.

Configuration of SCP 150 may involve storing an IP address IP A for PC A in association with TDN A, such that when a call is received to/from POTS A, PC A can be notified at the stored IP address.

In the embodiments of FIG. 6, when network element 108 detects the call being conducted between POTS A and MS B, it transmits call party details for the call, TDN A and TDN B, to PC A in step 6a. PC A forwards the call party details notification, including TDN A and TDN B, to server system 100 in step 6b.

Application software running on MS B detects the call in progress between MS B and POTS A and notifies server system 100 of call party details for the call, e.g. the TDNs of telephones involved in the call, TDN A associated with POTS A and TDN B associated with MS B, in step 6c.

In these embodiments, the user of POTS A could be the calling or the called party for the call. Call party details are received from telephony apparatus acting on behalf of the calling party and telephony apparatus acting on behalf of the called party, e.g. PC A and MS B.

Steps 6d to 6l of FIG. 6 then proceed in a similar manner to steps 5d to 5l described above in relation to FIG. 5.

Figure 7:
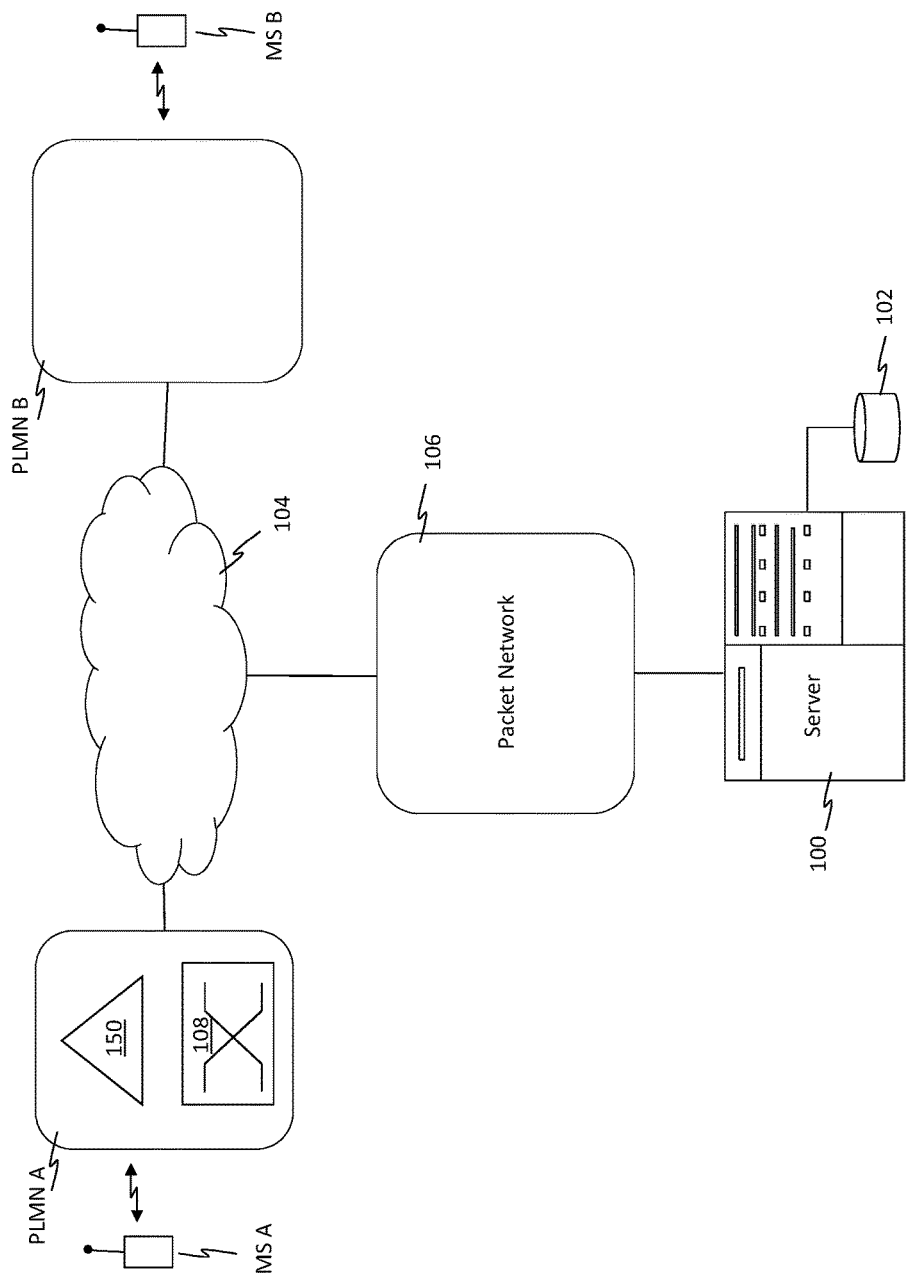
FIG. 7 is a system diagram according to one or more embodiments of the invention.

FIG. 7 is a system diagram showing a data communications network according to embodiments of the present invention. FIG. 7 includes some elements similarly depicted and labelled to FIG. 4, with such elements functioning in a similar manner.

In the embodiments of FIG. 7, MS A has communication session application software running on it with an associated identifier AppID A. However, MS A does not have application software (or any other capability) for detecting calls to/from MS A and notifying server system 100 of such.

MS B has communication session application software running on it with an associated identifier AppID B. In addition, MS B has application software running on it which is capable of detecting calls to/from MS B and notifying server system 100 of such.

During installation of the communication session application software on MS A, server system 100 is informed of AppID A and creates a record for MS A in data store 102 containing AppID A stored in association with TDN A. Similarly, during installation of the communication session application software on MS B, server system 100 is informed of AppID B and creates a record for MS B in data store 102 containing AppID B stored in association with TDN B.

PLMN A includes a network switching element 108, for example an SSP, capable of generating queries in response to triggers configured for calls to/from MS A. Network element 108 of FIG. 7 generates queries to SCP 150 in a similar manner to network element 108 described above in relation to FIG. 4. The network element 108 of FIG. 4 generates queries in relation to wireline network triggers, for example Advanced Intelligent Network (AIN) triggers, generated within PSTN of FIG. 4. In FIG. 7, however, the queries are generated in relation to wireless network triggers such as Customized Applications for Mobile networks Enhanced Logic (CAMEL) or Wireless Intelligent Network (WIN) triggers.

Network switching element 108 is configured to trigger a query including in-call signaling information to a service control point (SCP) network node 150 when it detects a call to/from TDN A associated with MS A. Upon receipt of in-call signaling information relating to a query from network element 108, SCP 150 is configured to trigger notification of such to server system 100. Any such notification to server system 100 will include call party details for the call, e.g. the TDNs of telephones involved in the call, TDN A associated with POTS A and TDN B associated with MS B.

Configuration of SCP 150 may involve SCP 150 storing an IP address for server system 100 in association with TDN A, such that when in-call signaling information relating to a call to/from POTS A is received, notification to server system 100 at the stored IP address is triggered.

Figure 8:
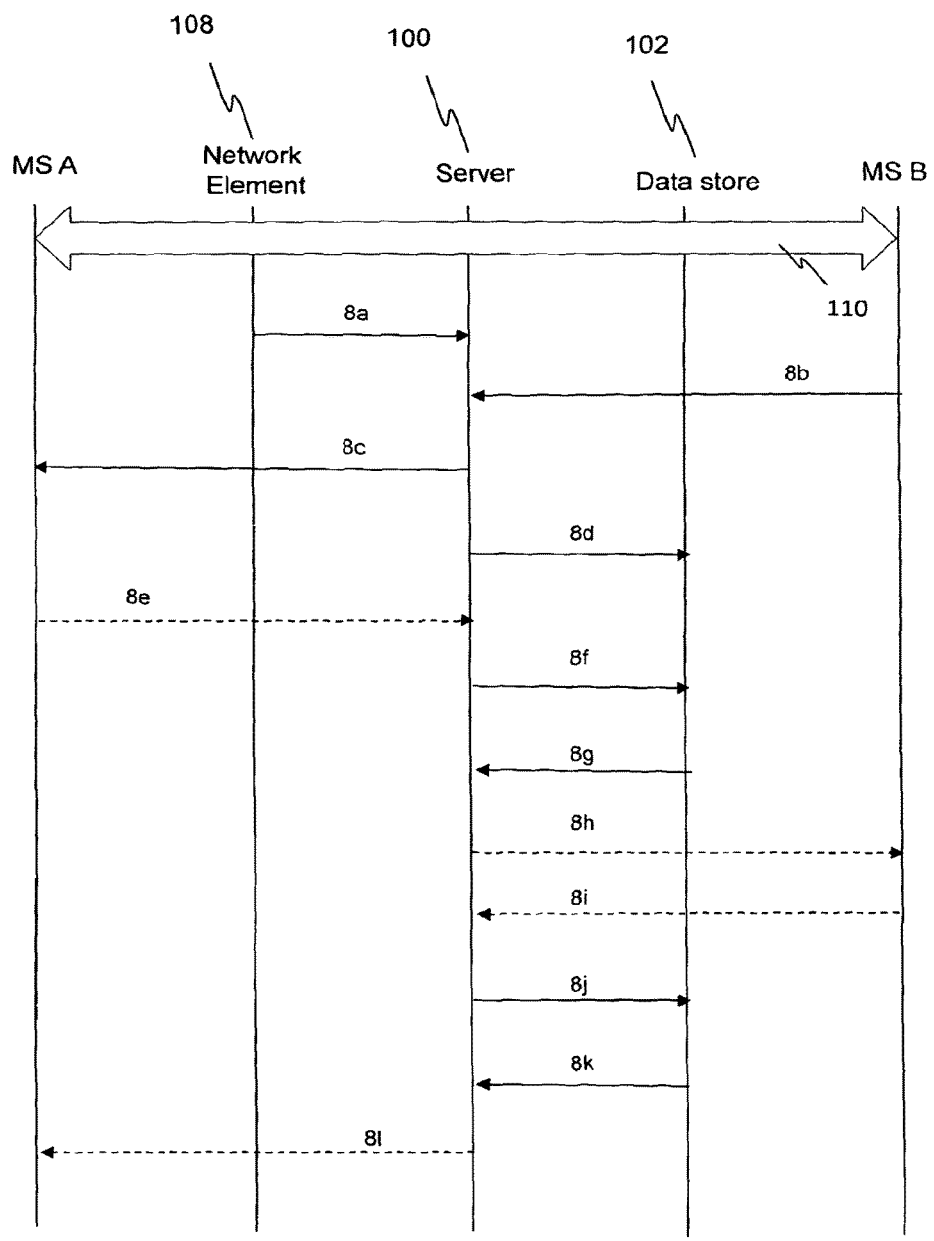
FIG. 8 is a flow diagram depicting operation of one or more embodiments of the invention using the system of FIG. 7.

FIG. 8 is a flow diagram depicting operation of embodiments of the invention, for example implemented in a system depicted in FIG. 7. Similarly to FIG. 2 described above, a voice call is currently in progress between MS A in PLMN A and MS B in PLMN B, as shown by item 110.

In the case of an outgoing call being made by MS A to MS B, network element 108 receives in-call signaling information for the call, including TDN A, for which a wireless call origination trigger is configured. This triggers notification of call party details for the call to server system 100 in step 8*a*.

In the case of an incoming call being received by MS A from MS B, network element 108 receives in-call signaling information for the call, including TDN A, for which a wireless call termination trigger is configured. This triggers notification of call party details for the call to server system 100 in step 8*a*.

A call termination/origination trigger relating to a call to/from MS A will include call party details for the call, e.g. the TDNs of telephones involved in the call, TDN A associated with MS A and TDN B associated with MS B.

Application software running on MS B detects the call in progress between MS B and MS A and notifies server system 100 of call party details for the call, e.g. the TDNs of telephones involved in the call, TDN A associated with MS A and TDN B associated with MS B, in step 8*b*.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server system 100 identifies that the notification of step 8*a* from network element 108 and the notification of step 8*b* from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted via the separate communications session.

Server system 100 notifies MS A that a call has been detected between MS A and MS B and that a separate communications session has been established between MS A and MS B in step 8*c*.

Server system 100 updates the records for MS A and MS B in data store 102 in step 8*d* to indicate that a call is in progress between MS A and MS B and that a separate communications session between MS A and MS B has been established.

Communication of data from MS A to MS B can now occur in steps 8*e* to 8*h* by a similar process to that described above for steps 2*d* to 2*g* in relation to FIG. 2. Further, communication of data from MS B to MS A can now occur in steps 8*i* to 8*l* in a similar process to that described above for steps 2*h* to 2*k* in relation to FIG. 2.

In alternative embodiments of the invention, instead of both call party detail notifications being sent to server system 100 in steps 8*a* and 8*b*, server system 100 may instead notify MS B of the request from MS A to initiate establishment of a separate communications session in a similar manner to step 3*b* described above in relation to FIG. 3. Similarly to step 3*c*, MS B will then transmit a communication session initiation response (in response to user input on MS B indicating acceptance of the request) to server system 100 indicating that a communication session separate to the voice call between MS A and MS B should be established between MS B and MS A.

Figure 9:
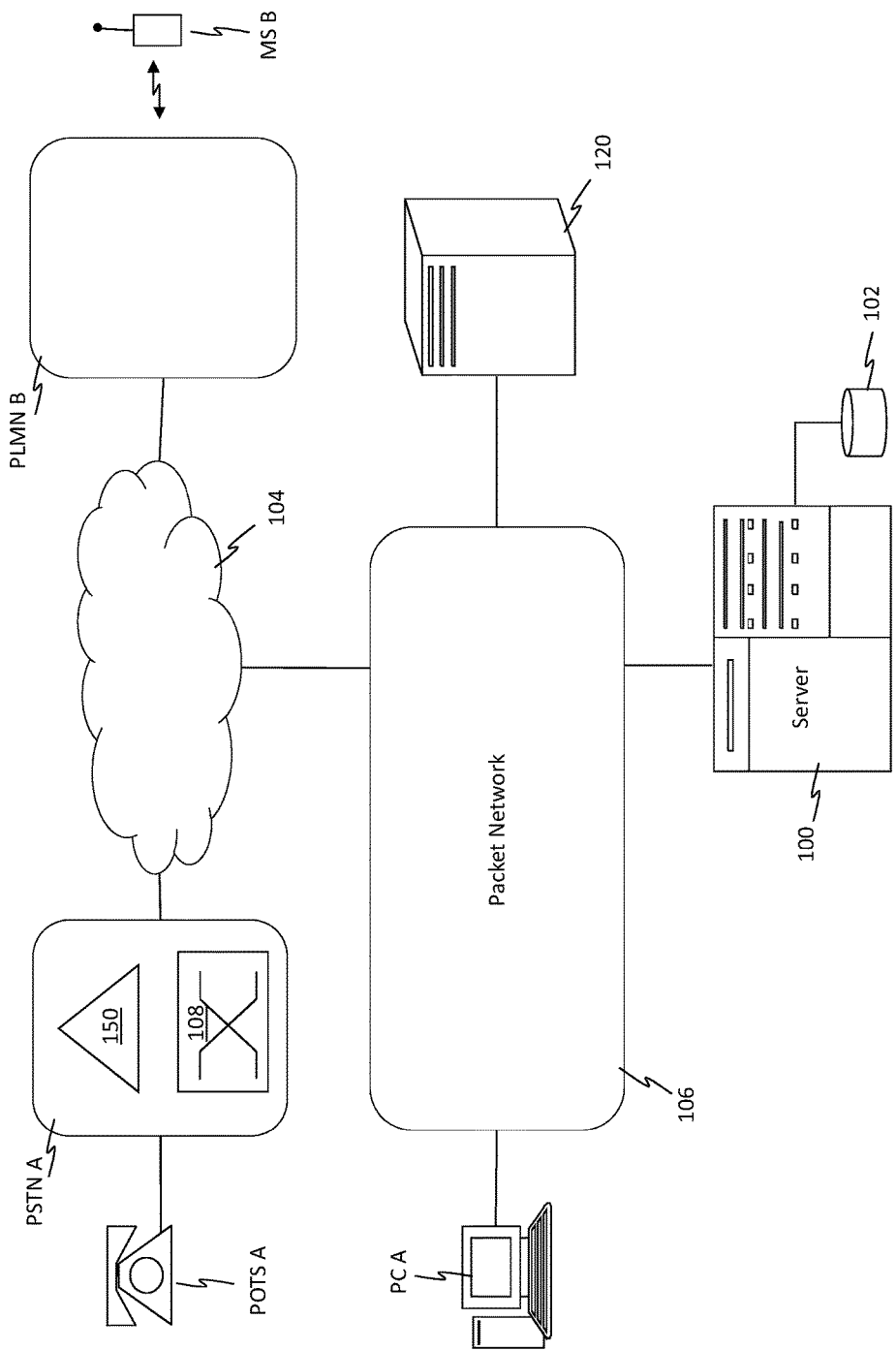
FIG. 9 is a system diagram according to one or more embodiments of the invention.

FIG. 9 is a system diagram showing a data communications network according to embodiments of the present invention. FIG. 9 includes some entities similarly depicted and labelled to FIG. 4, with such entities functioning in a similar manner. In addition, the system of FIG. 9 includes a content server 120 connected to packet network 106 at which electronic content can be provided, for example via electronic download. The electronic content could comprise software components such as applications or plug-ins, or media data such as music, videos, computer games, etc.

Figure 10:
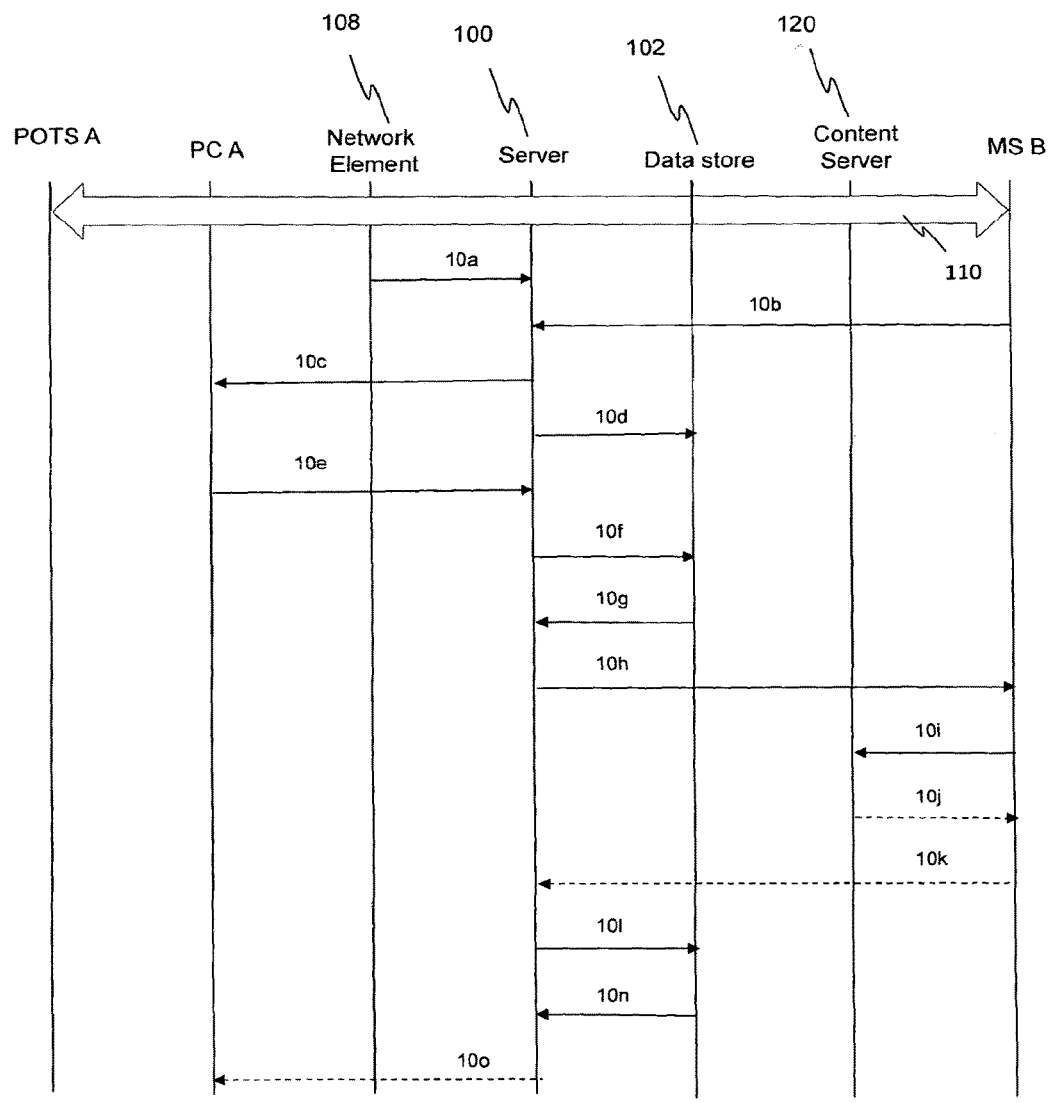
FIG. 10 is a flow diagram depicting operation of one or more embodiments of the invention using the system of FIG. 9.

FIG. 10 is a flow diagram depicting operation of embodiments of the invention, for example implemented in a system depicted in FIG. 9. Similarly to FIG. 5 described above, a voice call is currently in progress between POTS A in PSTN A and MS B in PLMN B, as shown by item 110.

Similarly to steps 5*a* to 5*d* described above in relation to FIG. 5, steps 10*a* to 10*d* of FIG. 10 depict detection of a voice call between POTS A and MS B by network element 108 and notification of such to server system 100, detection of the call between POTS A and MS B by MS B and notification of such to server system 100, establishment of a separate communications session between PC A and MS B and notification of such to PC A, and updating of data store 102.

In these embodiments, the user of POTS A and PC A wishes to use a software component in the separate communications session with MS B and transmits from PC A an identifier for the software component, for example an application name, file name or Uniform Resource Locator (URL), to server system 100 in step 10*e*. The software component may for example comprise a plug-in relating to the communications session application software installed on MS B and PC A.

Server system 100 performs a lookup in data store 102 using IP A for PC A in step 10*f* and identifies that a communications session, separate to the voice call between POTS A and MS B, has been established between PC A and MS B. Server system 100 retrieves TDN B for MS B in step 10*g* and proceeds to enable download of the software component by MS B.

Server system 100 enables the download by transmitting the identifier for the software component received from PC A to MS B in step 10*h*. The identifier could be transmitted to MS B embedded in a text message such as an SMS message.

Using the received software component identifier, MS B sends a download request for the software component to content server 120 in step 10*i*. Content server then provides the software component to MS B in step 10*j*.

If the user of MS B wants to communicate data relating to use of the software component to the user of POTS A and PC A, MS B transmits such data to server system 100 in step 10*k*. When server system 100 receives the data from MS B in step 10*k* it performs a lookup in data store 102 using TDN B for MS B in step 10*l* and identifies that a separate communications session has been established between PC A and MS B. Server system 100 retrieves IP A for PC A in step 10*n* and transmits the data received from MS B to PC A in step 10*o*. Data may be communicated from PC A to MS B in a similar manner as per steps 2*h* to 2*k* described above in relation to FIG. 2.

When server system 100 receives the software component identifier in step 10*e*, it may identify that further information is required for downloading the software component, for example if only an application name is supplied by PC A. The further information could include an IP address, domain name or URL for locating content server 120 in packet network 106; such further information may be stored locally to server system 100 or could be obtained via a search or query process carried out by server system 100 within packet network 106 or beyond. In such a case, server system 100 will additionally provide such further information to MS B in step 10*h*.

In alternative embodiments of the invention, when server system 100 receives the software component identifier in step 10*e*, it performs a lookup in data store 102 and identifies that that a separate communications session has been established between PC A and MS B. Server system 100 then downloads the software component from content server 120 itself using the software component identifier received from PC A, and transmits the software component directly to MS B.

In further alternative embodiments of the invention, instead of PC A transmitting an identifier for the software component to server system 100 as per step 10*e*, PC A transmits the software component itself to server system 100. Server system 100 performs a lookup in data store 102 and identifies that that a separate communications session has been established between PC A and MS B and transmits the software component received from PC A to MS B.

In embodiments of the invention, before download of the software component to MS B or PC A is enabled, a capability check is conducted to determine whether MS B or PC A is initially enabled with the software component. If the capability check indicates that the respective user device is not initially enabled with the software component, then enabling of the download may proceed.

In some embodiments, capability data for one or more user devices is stored in data store 102 and server system 100 may carry out a capability check by reference to data store 102. In other embodiments, the capability check involves transmitting a capability query to a user device, and receiving a response indicating whether said the device is initially enabled with the software component.

In embodiments of the invention, the separate communications session is established using a session establishment software application or operating system function on the user device to which the software component is being downloaded to and the software component is a software application which interoperates with the session establishment software application or operating system function.

In embodiments of the invention, a client-server connection request is transmitted by the user device to which the software component is being downloaded to server system 100 and a client-server connection is established between server system 100 and that device. The software component is transmitted via the established client-server connection. The client-server connection request could be transmitted in response to the telephone call being established or in response to a notification received during the telephone call, after the telephone call is established.

Figure 11:
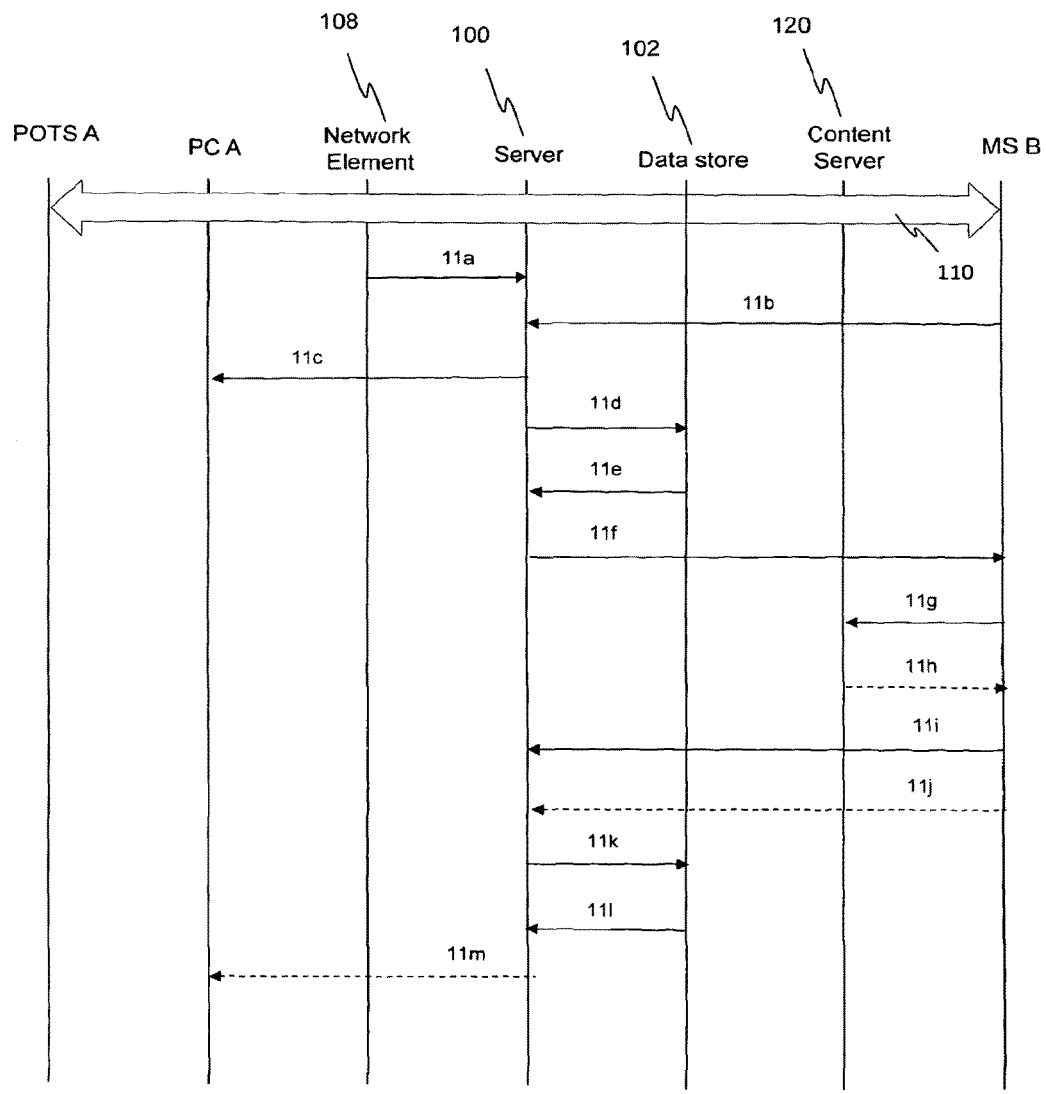
FIG. 11 is a flow diagram depicting operation of one or more embodiments of the invention using the system of FIG. 9.

FIG. 11 is a flow diagram depicting operation of embodiments of the invention, for example implemented in a system depicted in FIG. 9. Similarly to FIG. 10 described above, a voice call is currently in progress between POTS A in PSTN A and MS B in PLMN B, as shown by item 110.

Steps 11*a* to 11*c* of FIG. 11 depict detection of a voice call between POTS A and MS B by network element 108 and notification of call party details for such to server system 100, detection of the call between POTS A and MS B by MS B and notification of call party details for such to server system 100, as well as notification of the detected call to PC A.

When server system 100 receives the call party details for the call between POTS A and MS B in steps 11*a* and 11*b*, it performs a lookup in data store 102 for the TDNs of MS A and MS B in step 11*d*. From the lookup information received in step 11*e*, server system 100 identifies that MS B is an initially non-enabled user device that does not currently have a capability associated with participating in a communication session separate to the voice call between POTS A and MS B.

For example, a data record for MS B in data store 102 may indicate that MS B does not have communications session software installed on it, or there may be no data record at all for MS B in data store 102 which also indicates that MS B does not have communications session software installed on it.

In these embodiments, in order to provide the initially non-enabled user device MS B with the capability associated with participating in the session, server system 100 enables the download of a software application to the initially non-enabled user device MS B.

Server system 100 enables the download of the software application by transmitting an identifier for the software application to MS B in step 11*f*. The identifier could be transmitted to MS B embedded in a text message such as an SMS message.

Using the received software application identifier, MS B sends a download request for the software application to content server 120 in step 11*g*. Content server then provides the software application to MS B in step 11*h*.

MS B proceeds to install the software application, which when installed, sends an installation confirmation message to server system 100 in step 11*i*. Server system 100 is now able to establish a communications session between PC A and MS B which is separate to the voice call being conducted between POTS A and MS B.

Once the separate communications session between MS B and PC A is established, MS B may communicate data to PC A as shown in steps 11*j* to 11*m* in a similar manner to steps 5*i* to 5*l* as described above in relation to FIG. 5. Further, communication of data from MS B to MS A can now occur (not shown) in a similar process to that described above for steps 5*e* to 5*h* in relation to FIG. 5.

In embodiments of the invention, establishment of the separate communications session may be initiated by the user of POTS A and PC A, for example by user input on PC A. The user input causes communications session software installed on PC A to transmit a communications session initiation request message to server system 100 which then proceeds to establish a separate communications session as described above.

Figure 12:
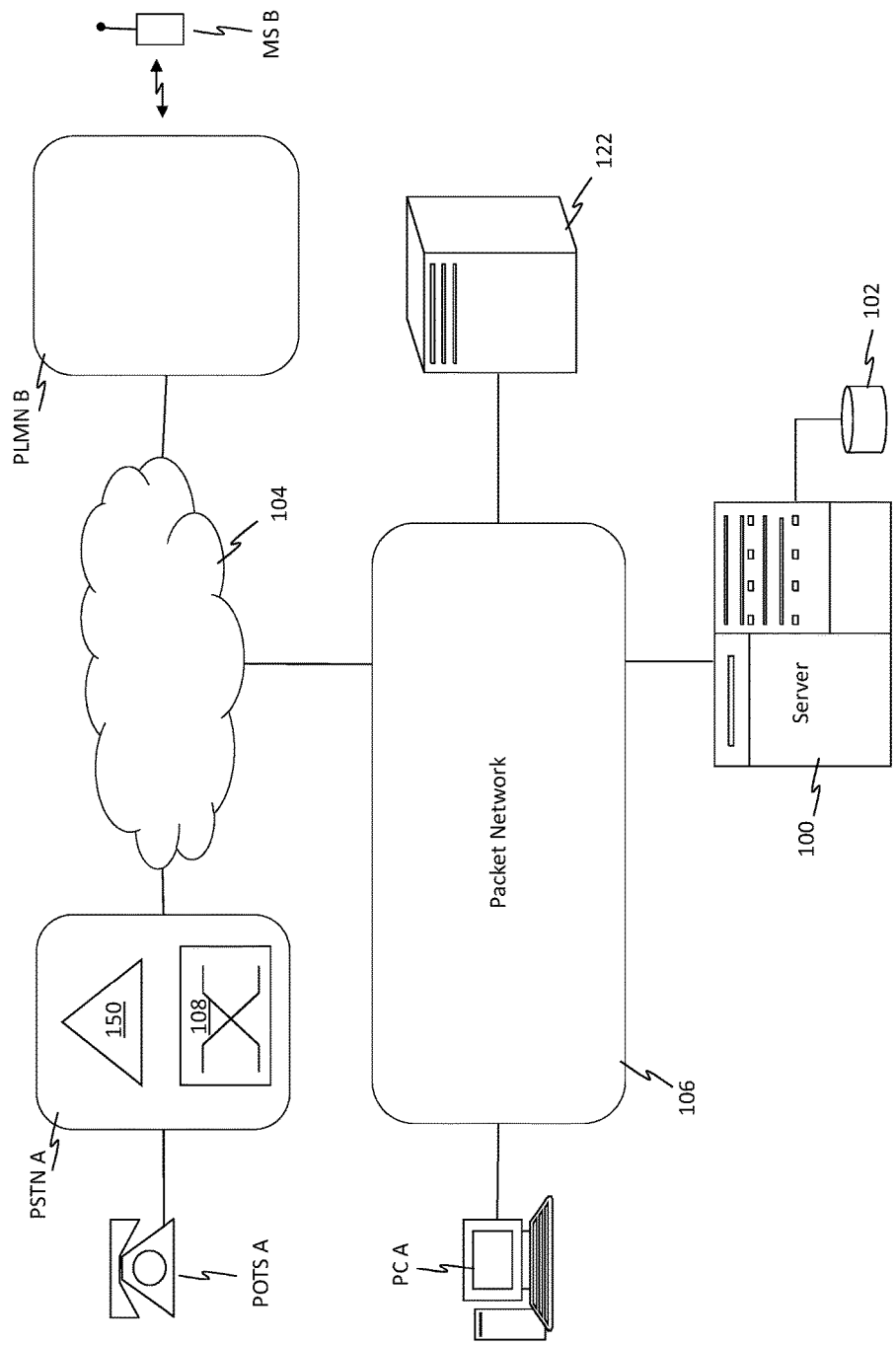
FIG. 12 is a system diagram according to one or more embodiments of the invention.

FIG. 12 is a system diagram showing a data communications network according to embodiments of the present invention. FIG. 12 includes some entities similarly depicted and labelled to FIG. 4, with such entities functioning in a similar manner. In addition, the system of FIG. 12 includes an authorization server 122 connected to packet network 106 at which authorization for use of copyrighted electronic content can be requested and granted. The electronic content could comprise software components such as applications and plug-ins, or media data such as music, videos, etc.

Figure 13:
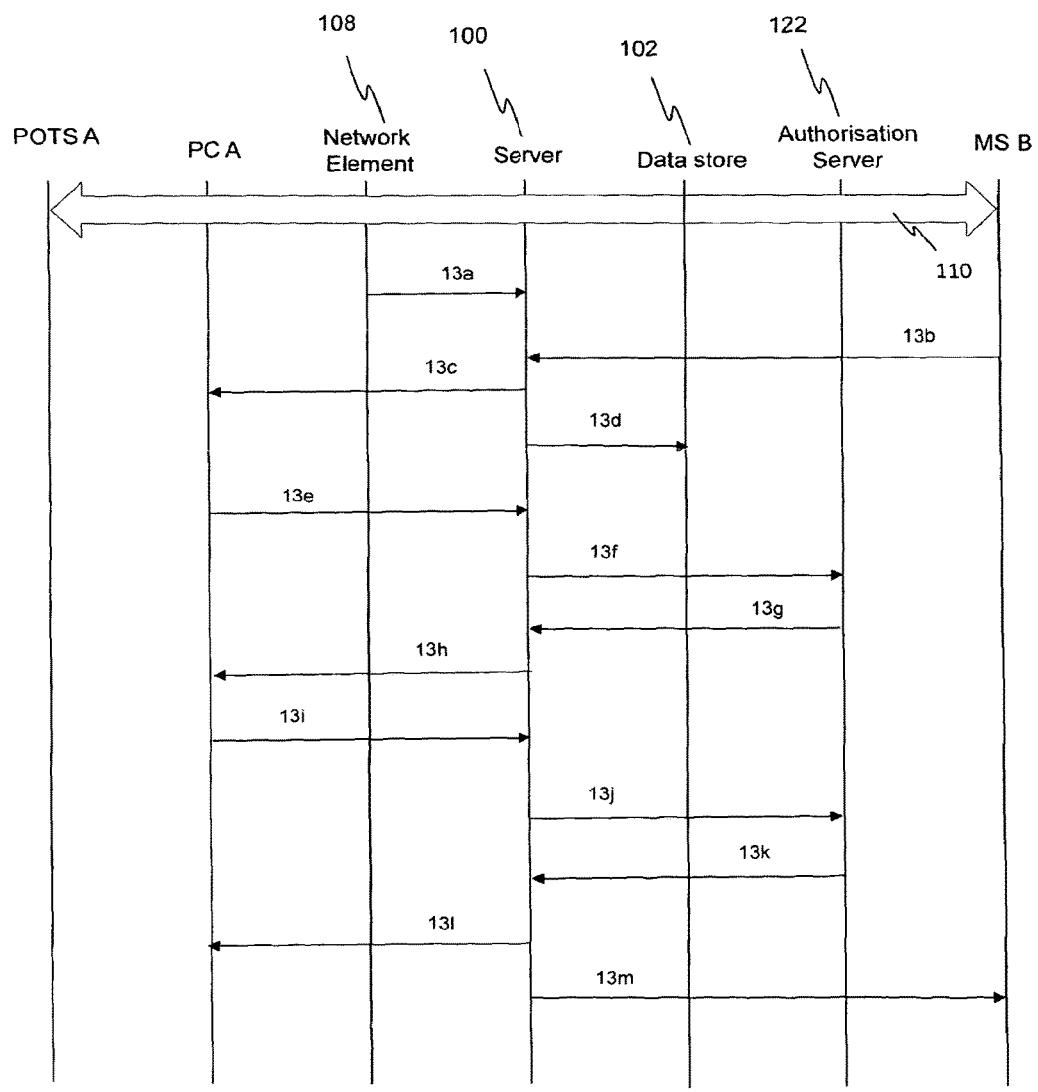
FIG. 13 is a flow diagram depicting operation of one or more embodiments of the invention using the system of FIG. 12.

FIG. 13 is a flow diagram depicting operation of embodiments of the invention, for example implemented in a system depicted in FIG. 12. Similarly to FIG. 5 described above, a voice call is currently in progress between POTS A in PSTN A and MS B in PLMN B, as shown by item 110.

Similarly to steps 5*a* to 5*d* described above in relation to FIG. 5, steps 13*a* to 13*d* of FIG. 13 depict detection of a voice call between POTS A and MS B by network element 108 and notification of call party details for such to server system 100, detection of the call between POTS A and MS B by MS B and notification of such to server system 100, establishment of a separate communications session between PC A and MS B and notification of such to PC A, and updating of data store 102 accordingly.

In these embodiments, the user of POTS A and PC A, transmits from PC A an identifier identifying a feature of the communications session separate to the voice call between POTS A and MS B that requires authorization for use by MS B in step 13*e*. The feature could for example be a software component or media data and the identifier could be a URL or other network address at which the feature can be located.

Upon receipt of the feature identifier, server system 100 transmits an authorization requirement query containing the feature identifier to authorization server 122 in step 13*f*. The authorization requirement query has the effect of asking the authorization server whether authorization for use of the identified feature by MS B in the separate communications session is required. Authorization server 122 performs any appropriate checks, for example with reference to a copyright records database (not shown), and transmits an authorization requirement response back to server system 100 in step 13*g*. In this case, the authorization requirement response of step 13*g* indicates that authorization for use of the identified feature by MS B is required, for example "A copyright fee of $xx must be paid" for use of the identified feature in the separate communications session.

Server system 100 now requests authorization from the user of PC A and POTS A to authorize the use of the identified feature by MS B in the separate communications session in step 13*h*, for example asking the user of POTS A and PC A whether they are willing to accept the $xx copyright charge. The user of POTS A and PC A accepts the charge by appropriate input via PC A which results in an indication of authorization being transmitted from PC A to server system 100 in step 13*i*.

When server system 100 receives the authorization indication of step 13*i* from PC A, server system 100 enables the use of the feature by MS B in the separate communications session. Server system 100 contacts authorization server 122 in step 13*j* requesting that authorization for the identified feature be granted. Server 122 responds to server system 100 with an authorization grant in step 13*k*.

Granting authorization may involve authorization server contacting a payment server of an appropriate financial institution on behalf of the user device in question, for example to pay a copyright fee for use of the feature. The charge will generally be passed on to a an account associated with the user of POTS A and PC A because it is that user who is requesting use of the identified feature by the user of MS B in the separate communications session.

The user of PC A is informed that authorization of the feature has been granted by a message transmitted from server system 100 to PC A in step 13*l*, for example including confirmation of the amount charged to their account.

Server system 100 enables use of the feature for MS B by transmitting an identifier for the feature along with an authorization token proving that use of the feature by MS B has been authorized. The user of MS B can then download (not shown) or otherwise access the feature using the feature identifier and authorization token received from server system 100 without having to request authorization (or pay for such). Download of the feature may involve contacting a content server such as item 120 in FIG. 9.

The authorization token may include a purchase token proving that a copyright fee or suchlike has already been paid for use of the feature.

In some embodiments of the invention, the feature may involve using a service application which requires authorization in order to process service data transmitted during the separate communications session. In alternative embodiments of the invention, the feature may involve accessing data which requires authorization in relation to which an identifier is transmitted during the separate communications session.

Figure 14:
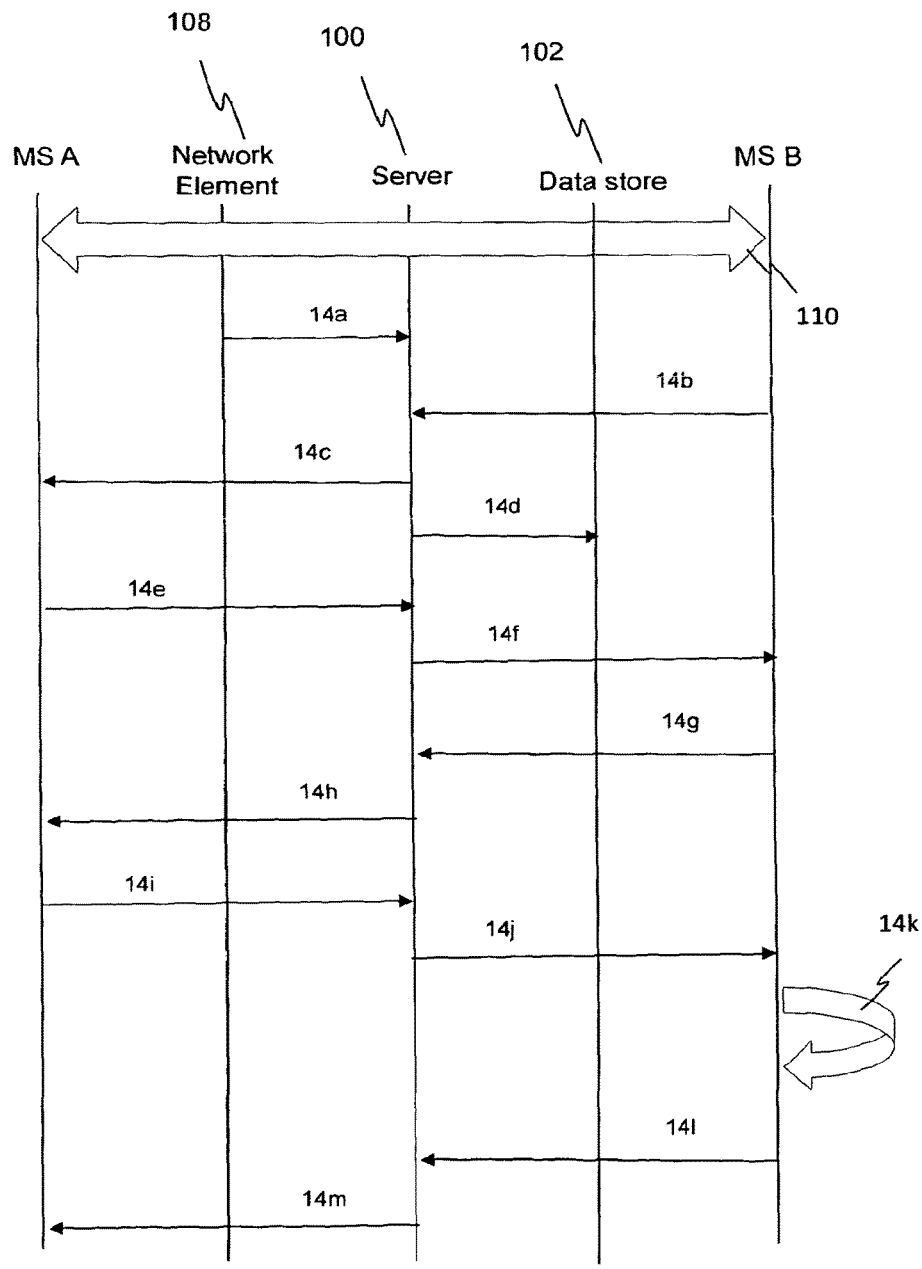
FIG. 14 is a flow diagram depicting operation of one or more embodiments of the invention using the system of FIG. 12.

FIG. 14 is a flow diagram depicting operation of embodiments of the invention, for example implemented in a system depicted in FIG. 7. Similarly to FIG. 2 described above, a voice call is currently in progress between MS A in PLMN A and MS B in PLMN B, as shown by item 110. MS B and MS A include geographical location modules, such as Global Positioning System (GPS) modules, capable of receiving geographical location data based on the physical location of MS A and MS B respectively. MS A and MS B both have map creation applications for creating maps for display on MS A and MS B respectively.

FIG. 14 depicts embodiments where the geographical location of MS B is 'pulled' from MS B by MS A.

Network element 108 receives in-call signaling information for the call between MS A and MS B which triggers notification of call party details, including TDN A and TDN B, for the call to server system 100 in step 14*a*.

Application software running on MS B detects the call in progress between MS B and MS A and notifies server system 100 of call party details for the call, e.g. the TDNs of telephones involved in the call, TDN A associated with MS A and TDN B associated with MS B, in step 14*b*.

Server system 100 identifies that the notification of step 14*a* from network element 108 and the notification of step 14*b* from MS B have call party details, TDN A and TDN B, in common and establishes a communications session, separate from the telephone call between MS A and MS B, for the communication of data between MS A and MS B. The separate communications session is established whilst the telephone call is in progress on the basis of the received call party details, e.g. TDN A and TDN B. Once the separate communications session is established, voice call data is transmitted via the telephone call and other data can be transmitted via the separate communications session.

Server system 100 notifies MS A that a call has been detected between MS A and MS B and that a separate communications session has been established between MS A and MS B in step 14*c*.

Server system 100 updates the records for MS A and MS B in data store 102 in step 14*d* to indicate that a call is in progress between MS A and MS B and that a separate communications session between MS A and MS B has been established.

In these embodiments, the user of MS A wishes to obtain geographical location data for MS B, for example to use in relation to a map creation application running on MS A. MS A transmits a geographical location capability check message to server system 100 in step 14*e*; the capability check message is for checking the capability of MS B to provide geographical location data relating to its physical location, for example checking if MS B has a map creation application running on it.

Server system 100 forwards the geographical location capability check message on to MS B in step 14f. Mobile station MS B responds by sending a geographical location capability response message to server system 100 in step 14g which forwards this on to MS A in step 14h; the capability response message includes information as to whether MS B can provide geographical location data relating to its physical location.

In this embodiment of the invention, the capability response message informs MS A that MS B is able to provide geographical location data (by use of its geographical location module), so MS A transmits a request for geographical location data for MS B to server system 100 in step 14i. Server system 100 forwards the request from MS A to MS B in step 14j.

When MS B receives the request for geographical location data from server system 100 in step 14j, MS B instructs its geographical location module to carry out a geographical location process and provide geographical location data relating to the physical location of MS B in step 14k. The geographical location data resulting from step 14k is transmitted to server system 100 in step 14l. Server system 100 then transmits data including or derived from the geographical location data received in step 14l to MS A in step 14m.

The map creation application of MS A can use the geographical location data received from server system 100 in step 14m to create a map which incorporates a representation of the physical location of MS B. For example, the received geographical location data may include a grid reference or longitude and latitude parameters which can be processed by the map creation application to plot the location of MS B within a map stored or accessible by MS A. Such embodiments could for example be useful for the user of MS A to give directions to MS B verbally during the telephone call being conducted via MS A and MS B with reference to the created map and indication of the location of MS B thereon.

In embodiments of the invention, steps 14i to 14m are repeated, allowing display of a dynamically updating map on MS A that shows changes in the physical location of MS B as they happen. Alternatively, steps 14k to 14m can be repeated allowing updating of the map on MS A without further requests as per steps 14i and 14j being required.

In embodiments of the invention where MS B is not able to provide geographical location data, for example because MS B has no geographical location module or other such capability, the capability response message of step 14g will state so, thus informing MS A that communication of geographical location data from MS B is not possible. In alternative embodiments of the invention where MS B is not able to provide geographical location data, MS B may not send any capability response message, and after a predetermined period with no response being received, MS A might conclude that communication of geographical location data from MS B will not be possible.

In further alternative embodiments of the invention, the geographical location capability check message of step 14e can be combined with the request for geographical location data of step 14i and the geographical location capability response message of step 14g can be combined with the transmittal of geographical location data of step 14l.

Figure 15:
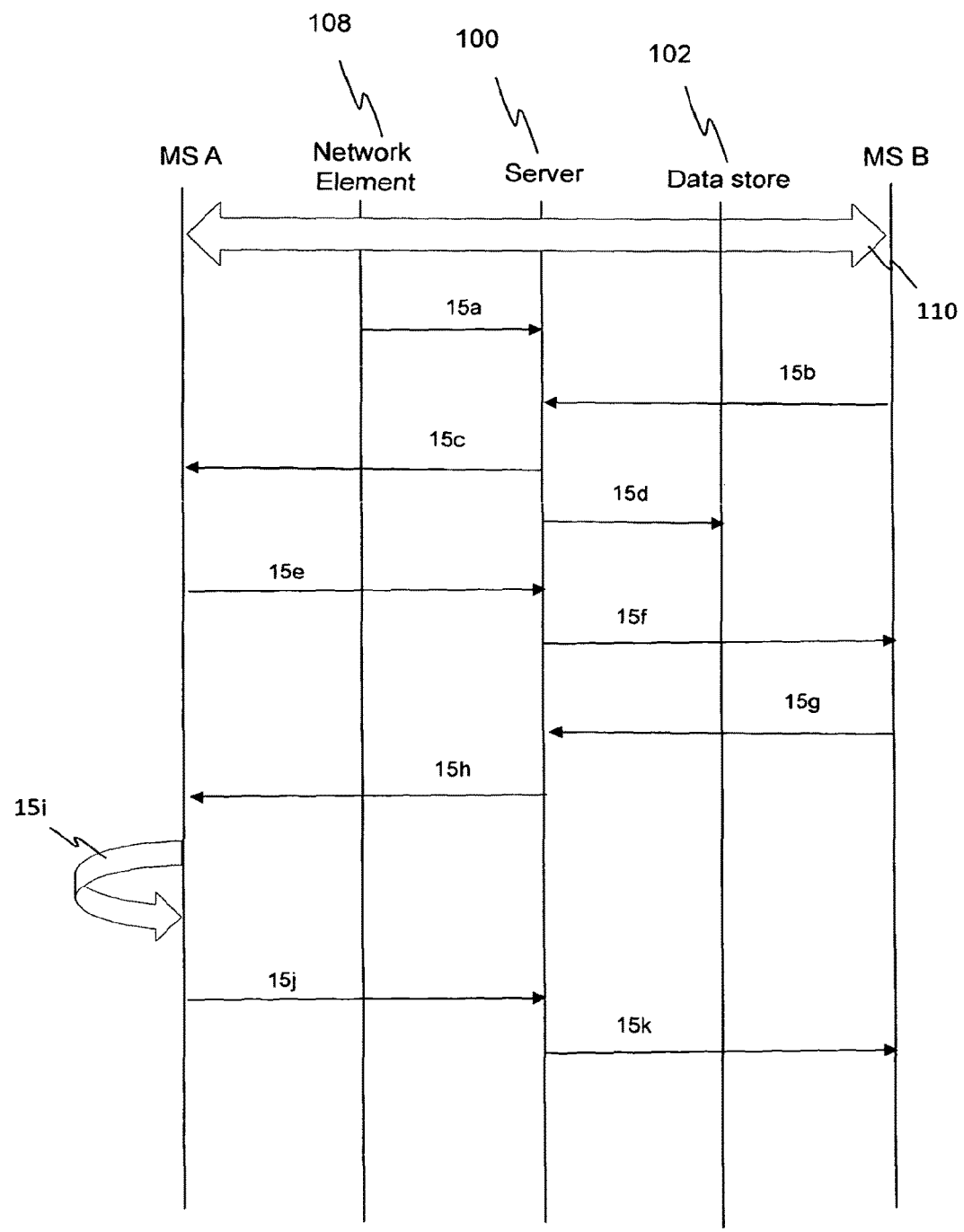
FIG. 15 is a flow diagram depicting operation of one or more embodiments of the invention using the system of FIG. 12.

FIG. 15 is a flow diagram depicting operation of embodiments of the invention, for example implemented in a system depicted in FIG. 7. In FIG. 15, steps 15a to 15d occur in a similar manner as per steps 14a to 14d described above in relation to FIG. 14.

FIG. 15 depicts embodiments where the geographical location of MS A is 'pushed' from MS A to MS B.

In these embodiments, the user of MS A wishes to send geographical location data for MS A to MS B.

Embodiments of the invention involve MS A checking the capability of MS B to process and/or display geographical location data by transmitting a geographical location capability check message to server system 100 in step 15e. Server system 100 forwards the geographical location capability check message on to MS B in step 15f. Mobile station MS B responds by sending a geographical location capability response message to server system 100 in step 15g which forwards this on to MS A in step 15h.

In this embodiment of the invention, the capability response message informs MS A that MS B is able to process geographical location data (by use of its map creation application), so the user of MS A triggers generation of appropriate geographical location data by appropriate input to the mapping application of MS A. Alternatively, generation of geographical location data could occur upon receipt of the capability response message of step 15h without any input from the user of MS A being required.

MS A instructs its geographical location module to carry out a geographical location process and provide geographical location data relating to the physical location of MS A in step 15i. The geographical location data resulting from step 15i is transmitted to server system 100 in step 15j. Server system 100 then transmits data including or derived from the geographical location data received in step 15j to MS B in step 15k.

The map creation application of MS B can use the geographical location data received from server system 100 in step 15k to create a map which incorporates a representation of the physical location of MS A. Such embodiments could for example be useful for the user of MS B to give directions to the user of MS A verbally during the telephone call being conducted via MS A and MS B with reference to the created map and indication of the location of MS A thereon.

In embodiments of the invention, steps 15i to 15k can be repeated, allowing display of a dynamically updating map on MS B that depicts changes in the physical location of MS A as they occur.

In alternative embodiments of the invention, MS B has no map creation application for creating maps for display on MS B, but does have the capability to display images, such information being indicated in the location capability response message of step 15g. In such embodiments, the MS A itself plots a map containing a physical representation of its physical location and creates an map image (for example a screenshot from the map creation application) depicting this information for transmittal to MS B via server system 100 in steps 15j and 15k; these steps would therefore involve transmittal of media (image) data. Upon receipt of the image data, MS B is able to display the image of the map created and provided by MS A, thus allowing the user of MS B to view a representation of the physical location of MS A even though MS B has no map creation capability itself.

In further alternative embodiments of the invention where MS B has no map creation application for creating maps for display on MS B, but does have the capability to display images, a network link, such as a URL, for an online mapping service such as Google Maps™ is transmitted to MS B. The network link contains information relating to the physical location of MS A and can be created by MS A and transmitted to server system 100 for transmittal on to MS B, or can be derived from the geographical location data received from MS A by server system 100 and transmitted on to MS B. When MS B receives the network link, it accesses the mapping service using the received network link. The mapping service uses the information in the network link relating to the physical location of MS A to generate a map image including a representation of the physical location of MS A and transmits the map image to MS B. Once MS B has downloaded the map image, it displays the map image to the user of MS B, thus allowing the user of MS B to view a representation of the physical location of MS A even though MS B has no map creation capability itself.

In embodiments of the invention, the geographical location data is received by server system 100 in the form of a data object including geographical coordinate data. A capability check can then be carried out by server system 100 in relation to whether the respective user device is capable of processing the geographical coordinate data during the separate communications session. If the capability check indicates that the respective user device is capable of processing the geographical coordinate data, server system 100 will transmit the geographical coordinate data during the separate communications session.

Establishing the separate communication session may comprise receiving a client-server connection request from, and establishing a client-server connection with the appropriate user device, and transmitting the data including or derived from the received geographical location data via the client-server connection.

Embodiments of the invention described below in relation to FIGS. 16 to 19 involve enabling the receipt of pre-configured user data by user devices during telephone calls conducted between the user devices. The pre-configured user data is specified by a user of a user device prior to establishment of a telephone call as data for receipt by other user devices during telephone calls conducted by the user.

The separate communication session is used to receive user data other than the call party details (such as the telephone dialing numbers) of a call without the participants to the call having to explicitly transmit the user data themselves. In embodiments of the invention, enabling of the receipt of the pre-configured user data occurs during a call between user devices and is triggered by establishment of a separate communications between the user devices.

The pre-configured user data is specified by a user of a user device as data for receipt by other user devices during telephone calls between the user and other users, e.g. the user can choose certain user data prior to making a telephone call which will be received by the other user device of the other party (or parties in the case of a teleconference) to the telephone call via the separate communication session. The pre-configured user data may comprise data other than the first and second identities received in the call party details of a call.

A user may specify their user data for receipt by other user devices during telephone calls via their telephony user device, for example using personal information manager, PIM, application software on their telephony user device. A user may configure their pre-configured user data by linking to a record in the PIM. A user may also specify their pre-configured user data for transmittal during telephone calls directly to server system 100, for example via a web interface.

Figure 16A:
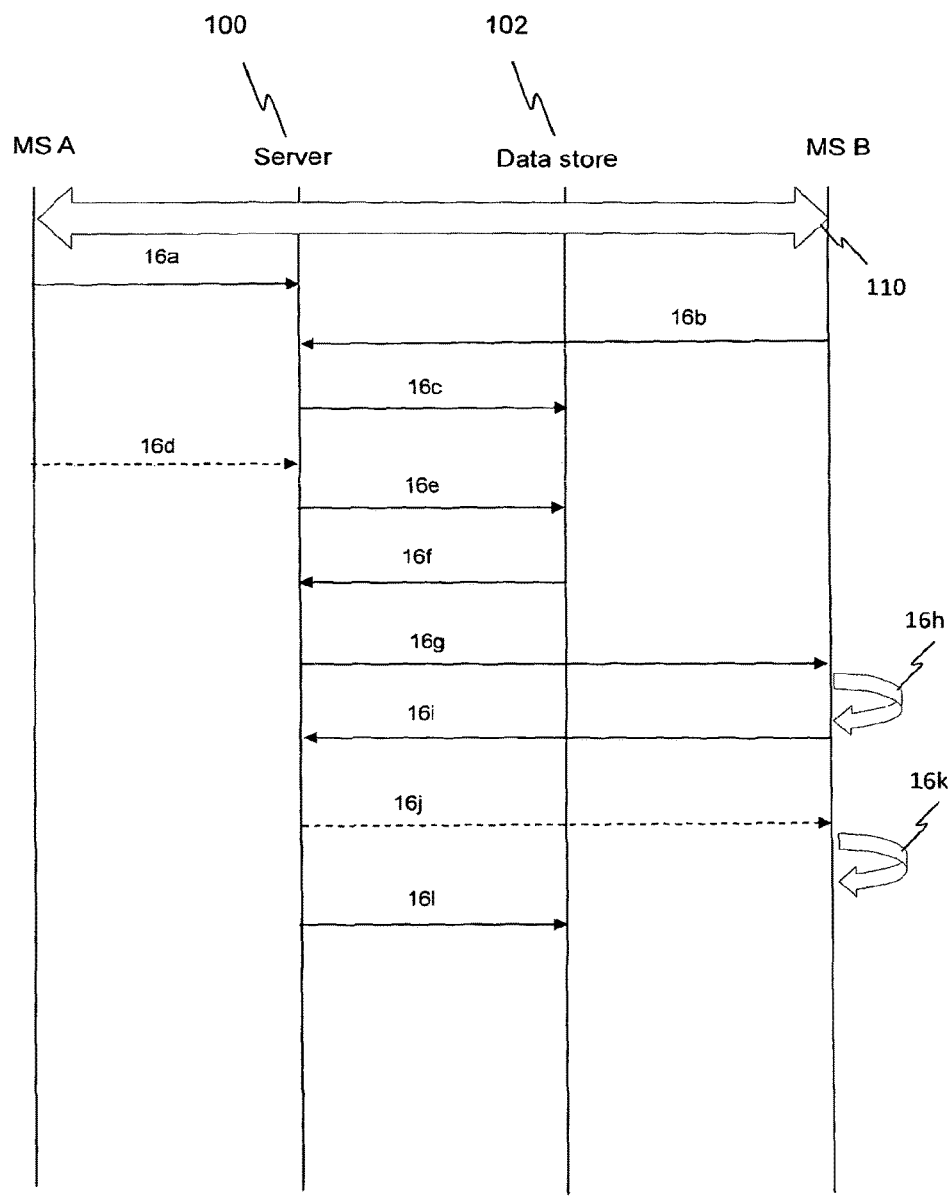
FIGS. 16A and 16B show a flow diagram depicting operation of one or more embodiments of the invention using the system of FIG. 1.
Figure 16B:
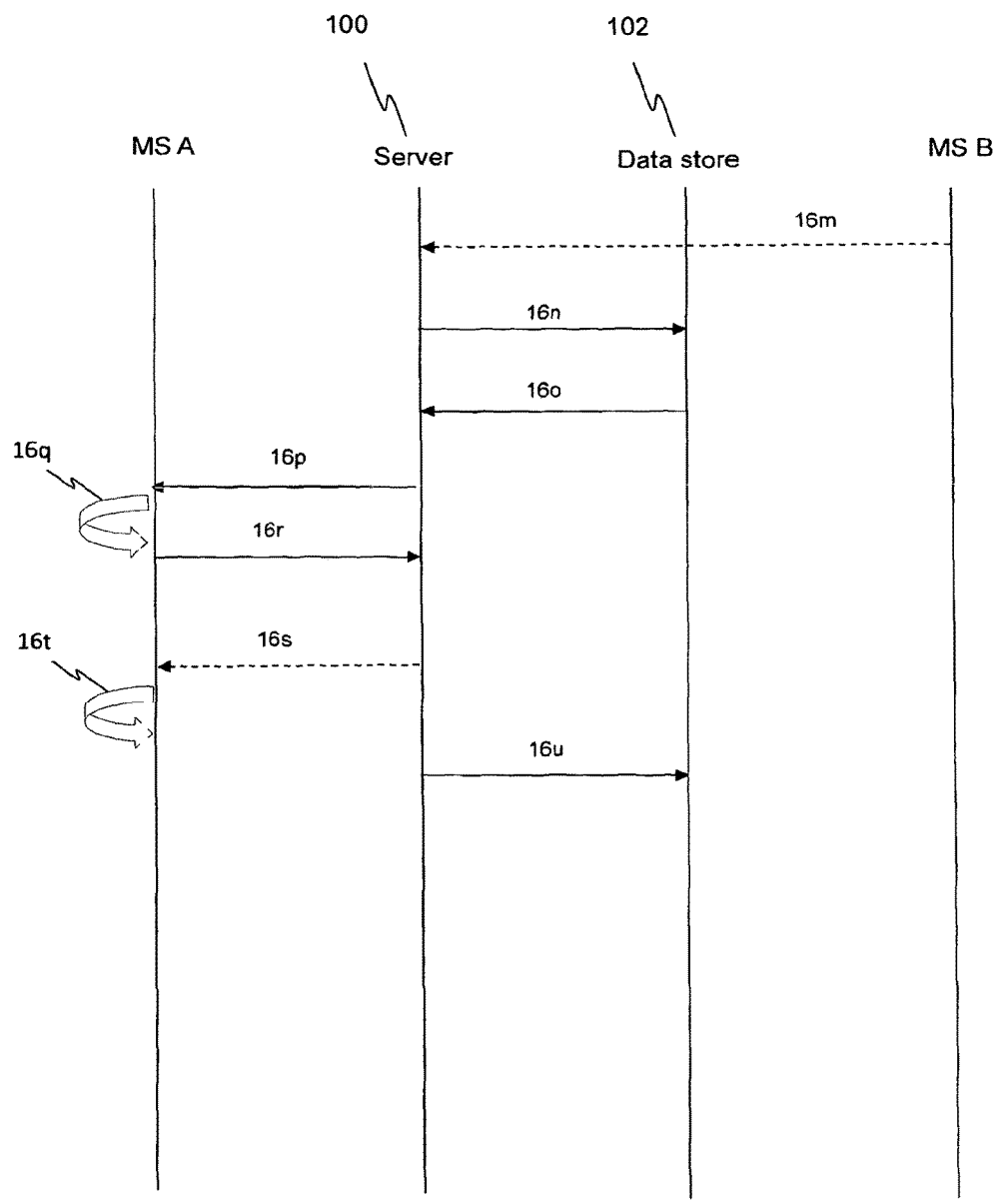

FIGS. 16A and 16B show a flow diagram depicting operation of embodiments of the invention using the system of FIG. 1.

In these embodiments of the invention, the user of MS A has specified, prior to establishment of telephone calls conducted by the user, pre-configured user data for receipt by other user devices during telephone calls conducted using MS A; the user's pre-configured user data is stored on memory associated with MS A.

Similarly, the user of MS B has specified, prior to establishment of telephone calls conducted by the user, pre-configured user data for receipt by other user devices during telephone calls conducted using MS B; the user's pre-configured user data is stored on memory associated with MS B.

These embodiments of the invention involve enabling the receipt of pre-configured user data configured by the user of MS A by MS B via a separate communications session and also involve enabling the receipt of pre-configured user data configured by the user of MS B by MS A via a separate communications session during a call conducted using MS A and MS B.

Similarly to FIG. 2 described above, a voice call is currently in progress between MS A in PLMN A and MS B in PLMN B, as shown by item 110. Application software running on MS A detects the call in progress between MS A and MS B and notifies server system 100 of call party details for the call, e.g. the TDNs of telephones involved in the call, TDN A associated with MS A and TDN B associated with MS B, in step 16*a*. Similarly, application software running on MS B detects the call in progress between MS B and MS A and notifies server system 100 of call party details for the call, e.g. the TDNs of telephones involved in the call, TDN B associated with MS B and TDN A associated with MS A, in step 16*b*.

Server system 100 identifies that the notification of step 16*a* from MS A and the notification of step 16*b* from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Server system 100 updates the records for MS A and MS B in data store 102 in step 16*c* to indicate that a call is in progress between MS A and MS B and that a separate communications session between MS A and MS B has been established.

Once the separate communications session between MS A and MS B has been established, MS A retrieves pre-configured user data from its memory and transmits this to server system 100 in step 16*d*. Server system 100 performs a lookup in data store 102 using TDN A for MS A in step 16*e* and identifies that a communications session has been established between MS A and MS B.

Server system 100 retrieves TDN B for MS B in step 16*f* and conducts a check to determine whether MS B already has pre-configured user data for the user of MS A stored locally. Conducting the check involves server system 100 transmitting a query to MS B in step 16*g*. Upon receiving the query of 16*g*, MS B checks its memory to see whether it has pre-configured user data for the user of MS A stored locally in step 16*h* and transmits a response to server system 100 in step 16*i*. In this case, the response of step 16*i* indicates that at least a part of the pre-configured user data for the user of MS A is not stored locally to MS B, so server system 100 transmits pre-configured user data for MS A to MS B in step 16*j*.

In step 16*k*, MS B updates its local memory according to the pre-configured user data received in step 16*j*. Server system 100 updates data store 102 in step 16*l* to indicate which pre-configured user data was received by MS B via the separate communications session in step 16*j*.

MS B retrieves pre-configured user data from its memory and transmits this to server system 100 in step 16*m*. Server system 100 performs a lookup in data store 102 using TDN B for MS B in step 16*n*, identifies that a communications session has been established between MS A and MS B and retrieves TDN A for MS A in step 16*o*.

A check is conducted to determine whether MS A already has pre-configured user data for the user of MS B stored locally. Conducting the check involves server system 100 transmitting a query to MS A in step 16*p*. Upon receiving the query of 16*p*, MS A checks its memory to see whether it has pre-configured user data for the user of MS B stored locally in step 16*q* and transmits a response to server system 100 in step 16*r*. In this case, the response of step 16*r* indicates that at least a part of the pre-configured user data for the user of MS B is not stored locally to MS A, so server system 100 transmits the pre-configured user data for MS B to MS A in step 16*s*.

In step 16*t*, MS A updates its local memory according to the pre-configured user data received in step 16*s*. Server system 100 updates data store 102 in step 16*u* to indicate which pre-configured user data was received by MS A via the separate communications session in step 16*s*.

In alternative embodiments of the invention, server system 100 stores pre-configured user data for a plurality of user devices in data store 102. Data store 102 will include data indicating which user devices have received pre-configured user data in relation to which other user devices, and also which data fields and which versions of pre-configured user data have been transmitted from and received by which user devices. In such embodiments of the invention, checks can be carried out at server system 100 with reference to data store 102, without the need to query MS B in step 16*g* or MS A in step 16*p*.

In the description of the embodiments of 16A and 16B above, enabling of the receipt of pre-configured user data by MS B is carried out if the check indicates that MS B does not have at least a part of the pre-configured user data for the user of MS A stored locally. In other embodiments of the invention, the configured user data comprises a plurality of data fields and the check involves determining whether current versions of the data fields in data stored locally to MS B require updating to more recent versions. In such embodiments, server system 100 will include indications of the values and/or versions of data fields of the pre-configured user data received in step 16*d* in the query of step 16*g*.

MS B compares the received data field values and/or versions received in step 16*g* with data field values and/or versions stored locally to MS B in step 16*h*. The response of step 16*i* includes an indication as to which data fields for MS A user data are missing and which require updating. Server system 100 transmits the appropriate data field values and/or versions of pre-configured user data for MS A in step 16*j*. Such embodiments can help avoid receipt of the entire pre-configured user data received in step 16*d* to MS B in step 16*j*, e.g. only pre-configured user data required to update MS B can be received and not pre-configured user data which MS B already has. This could for example be particularly useful if the pre-configured user data includes a file having a relatively large file size (such as an image) where repeated transmission/reception of such could have an impact on limited bandwidth resources to/from MS B in PLMN B.

Figure 17:
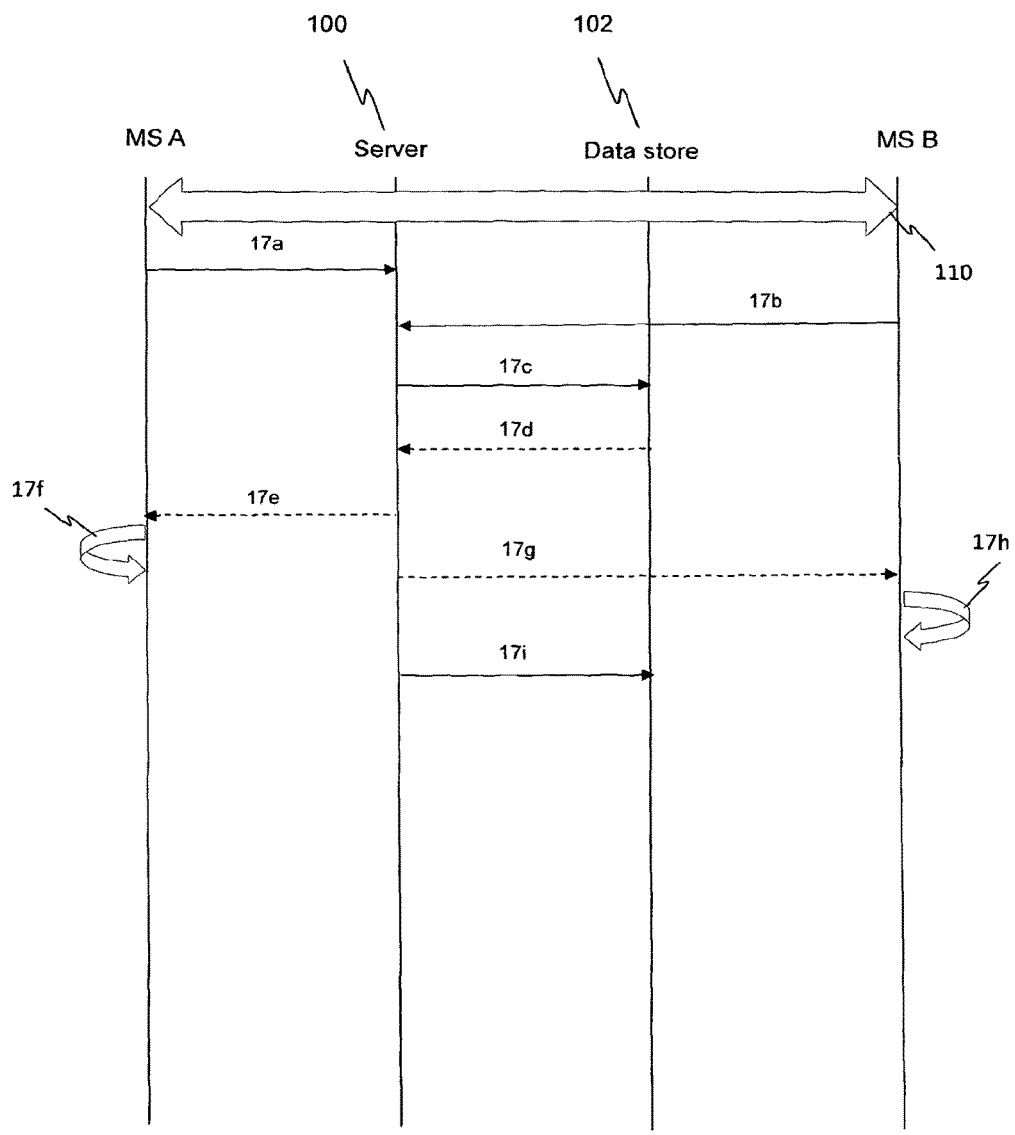
FIG. 17 is a flow diagram depicting operation of one or more embodiments of the invention using the system of FIG. 1.

FIG. 17 is a flow diagram depicting operation of embodiments of the invention using the system of FIG. 1.

In these embodiments of the invention, the user of MS A has specified, prior to establishment of telephone calls conducted by the user, pre-configured user data for receipt by other user devices during subsequent telephone calls conducted using MS A. The user's pre-configured user data has previously been stored in data store 102 associated with server system 100, for example transmitted to server system 100 from MS A or entered directly to server system 100 via a web interface.

Similarly, the user of MS B has specified, prior to establishment of telephone calls conducted by the user, pre-configured user data for receipt by other user devices during subsequent telephone calls conducted using MS B. The user's pre-configured user data has previously been stored in data store 102 associated with server system 100, for example transmitted to server system 100 from MS B or entered directly to server system 100 via a web interface.

Pre-configured user data in data store 102 may be updated via a synchronization process between MS A and server system 100. Synchronization may involve periodic update requests being sent from server system 100 to MS A, with MS A responding with any updates to the pre-configured user data. Alternatively, MS A may send a pre-configured user data update to server system 100 whenever the user of MS A makes an update to pre-configured user data within the memory of MS A.

A similar synchronization process may be carried out for MS B.

These embodiments of the invention involve enabling the receipt of pre-configured user data configured by the user of MS A by MS B via a separate communications session and also enabling the receipt of pre-configured user data configured by the user of MS B by MS A via a separate communications session during a call conducted between MS A and MS B.

Similarly to FIG. 16A described above, a voice call is being conducted between MS A and MS B and steps 17*a* and 17*b* occur similarly to steps 16*a* and 16*b* as described above.

Server system 100 identifies that the notification of step 17*a* from MS A and the notification of step 17*b* from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Once the separate communications session between MS A and MS B has been established, server system 100 accesses data store 102 to update the records for MS A and MS B in step 17*c* to indicate that a call is in progress between MS A and MS B and that a separate communications session between MS A and MS B has been established.

Step 17*c* also involves server system 100 performing a lookup in data store 102 to retrieve pre-configured user data specified for reception by other user devices, including MS B, in relation to MS A and pre-configured user data specified for reception by other user devices, including MS A, in relation to MS B in step 17*d*.

When server system 100 receives pre-configured user data specified for transmittal in relation to MS B in step 17*d*, it transmits the pre-configured user data to MS A in step 17*e*. In step 17*f*, MS A updates its local memory according to the pre-configured user data received in step 17*e*.

When server system 100 receives pre-configured user data specified for receipt by other user devices in relation to MS A in step 17*d*, it transmits the pre-configured user data to MS B in step 17*g*. In step 17*h*, MS B updates its local memory according to the pre-configured user data received in step 17*g*.

Server system 100 updates data store 102 in step 17*i* to indicate which pre-configured user data was received by MS A in step 17*e* and which pre-configured user data was received by MS B in step 17*g*.

The embodiments of FIG. 17 may include conducting checks for MS A and MS B respectively, either at server system 100 or by querying MS A and MS B, in a similar manner as described above for FIG. 16.

Figure 18:
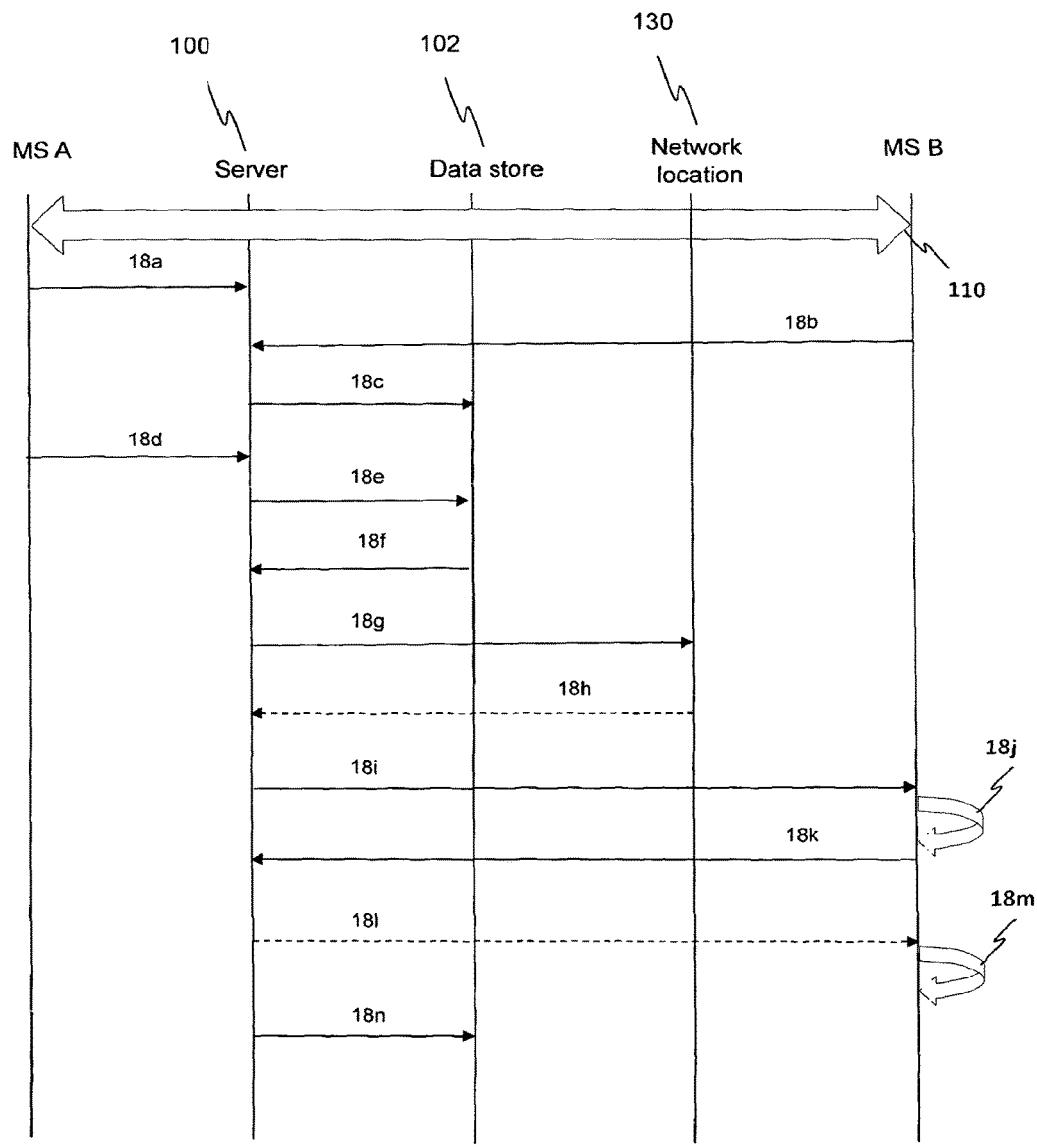
FIG. 18 is a flow diagram depicting operation of one or more embodiments of the invention using the system of FIG. 1.

FIG. 18 is a flow diagram depicting operation of embodiments of the invention using the system of FIG. 1.

In these embodiments of the invention, the user of MS A has specified, prior to establishment of telephone calls conducted by the user, pre-configured user data for reception by other user devices during subsequent telephone calls conducted using MS A. The user's pre-configured user data has previously been stored at network location 130, for example in a database accessible via a web server. The user's pre-configured user data may have been transmitted to network location 130 from MS A or entered directly to network location 130 via a web interface using a personal computer or similar computing device.

These embodiments of the invention involve enabling the receipt of pre-configured user data configured by the user of MS A by MS B via a separate communications session during a call conducted using MS A and MS B.

Similarly to FIG. 16A described above, a voice call is being conducted between MS A and MS B and steps 18*a* and 18*b* occur similarly to steps 16*a* and 16*b* as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server system 100 in step 18*d*.

Server system 100 performs a lookup in data store 102 using TDN A for MS A in step 18*e*, identifies that a communications session has been established between MS A and MS B, and retrieves TDN B for MS B in step 18*f*.

In step 18*g*, server system 100 locates and accesses pre-configured user data for the user of MS A at network location 130 on the basis of the identifier received from MS A in step 18*d*. The pre-configured user data is transmitted from network location 130 to server system 100 in step 18*h*.

Server system 100 uses the retrieved TDN B for MS B to conduct a check to determine whether MS B already has pre-configured user data for the user of MS A stored locally. Conducting the check involves server system 100 transmitting a query to MS B in step 18*i*. Upon receiving the query of 18*i*, MS B checks its memory to see whether it has pre-configured user data for the user of MS A stored locally in step 18*j* and transmits a response to server system 100 in step 18*k*. In this case, the response of step 18*k* indicates that at least a part of the pre-configured user data for the user of MS A is not stored in memory in MS B, so server system 100 transmits pre-configured user data for MS A to MS B in step 18*l*.

In step 18*m*, MS B updates its local memory according to the pre-configured user data received in step 18*l*. Server system 100 updates data store 102 in step 18*n* to indicate which pre-configured user data was transmitted to and received by MS B in step 18*l*.

The identifier could be a network address from which the pre-configured user data can be downloaded, for example a Uniform Resource Locator (URL). As an example, the pre-configured user data identifier could be a URL for an online user account such as a social network account, e.g. a user identity associated with a Facebook™ profile; the pre-configured user data could correspond to a public profile of a user's online account. A user can pre-configure within their profile which user data is to be received by other user devices during telephone calls and the URL identifier can be set to point to such. Server system 100 can use the URL identifier to contact the appropriate network address in step 18*g* and download the appropriate pre-configured user data in step 18*h*.

In the embodiments of the invention described above in relation to FIG. 18, the identifier transmitted to server system 100 in step 18*d* is used by server system 100 in step 18*g* to retrieve pre-configured user data from network location 130 in step 18*h*. In alternative embodiments of the invention, the identifier could comprise an identifier for use in retrieving the pre-configured user data from data store 102; in such embodiments, the user of MS A will have previously stored pre-configured user data in data store 102 either transmitted from MS A or entered directly via a web interface using a personal computer or similar computing device.

In alternative embodiments of the invention, the notification of step 18*a* and the identifier transmittal of step 18*d* are combined into a single step. Similarly, the data store updating of step 18*c* and data store lookup of step 18*e* could be combined into a single step.

Figure 19:
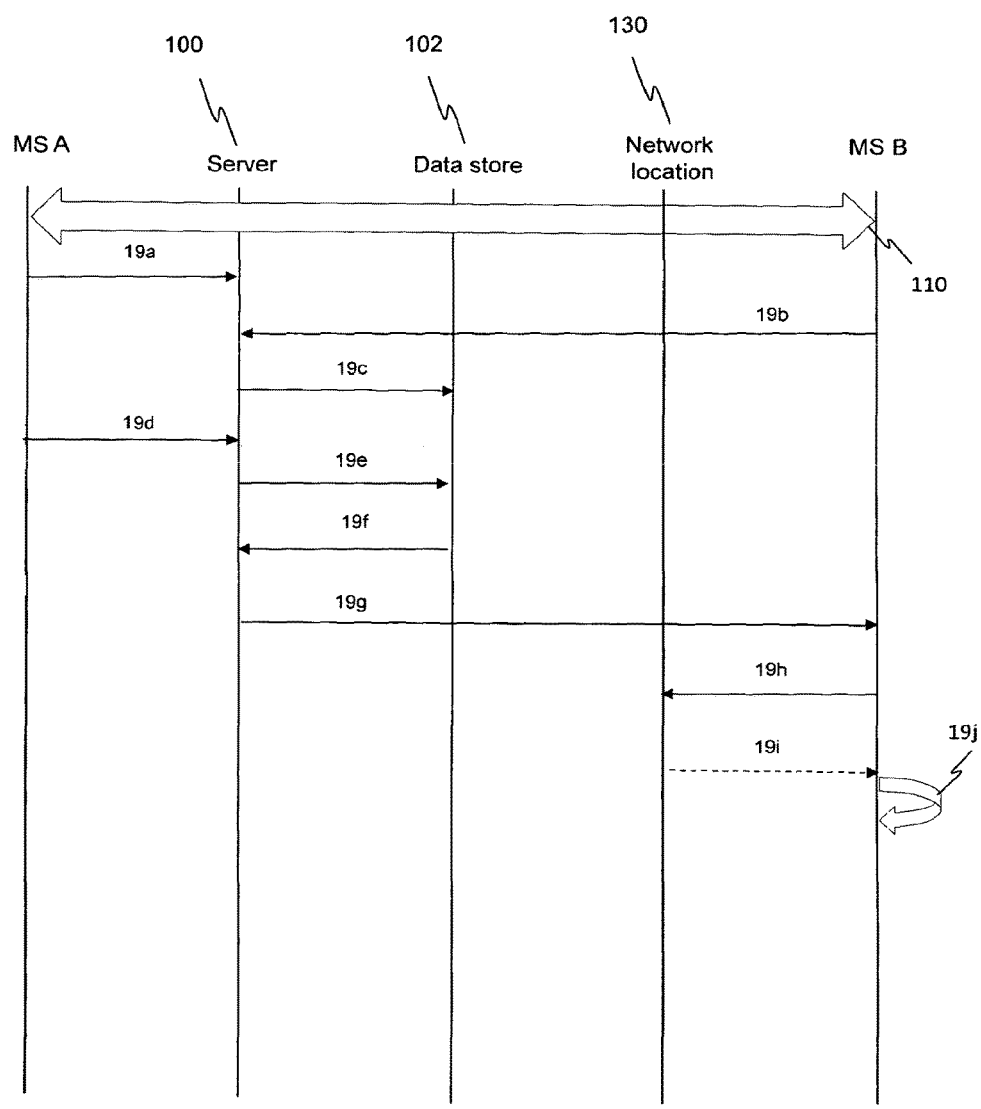
FIG. 19 is a flow diagram depicting operation of one or more embodiments of the invention using the system of FIG. 1.

FIG. 19 is a flow diagram depicting operation of embodiments of the invention using the system of FIG. 1.

In these embodiments of the invention, the user of MS A has specified, prior to establishment of telephone calls conducted by the user, pre-configured user data for reception by other user devices during subsequent telephone calls conducted using MS A. The user's pre-configured user data has previously been stored at network location 130 identified by a pre-configured user data identifier, for example a network address in packet network 106.

These embodiments of the invention involve enabling the reception of pre-configured user data configured by the user of MS A by MS B via a separate communications session during a call conducted using MS A and MS B.

Similarly to FIG. 16A described above, a voice call is being conducted between MS A and MS B and steps 19*a* to 19*c* occur similarly to steps 16*a* to 16*c* as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server system 100 in step 19*d*.

Server system 100 performs a lookup in data store 102 using TDN A for MS A in step 19*e*, identifies that a communications session has been established between MS A and MS B, and retrieves TDN B for MS B in step 19*f*.

Server system 100 transmits the pre-configured user data identifier received in step 19*d* to MS B in step 19*g*. MS B locates and accesses pre-configured user data for the user of MS A at network location 130 on the basis of the identifier received from MS A in step 19h. The pre-configured user data is transmitted from network location 130 to server system 100 in step 19i. In step 19j, MS B updates its local memory according to the pre-configured user data received in step 19i.

In other embodiments of the invention, the pre-configured user data identifier is stored in data store 102 and can be retrieved from data store 102 by server system 100, for example in combination with steps 19e and 19f, without requiring transmittal of the pre-configured user data identifier from MS A to server system 100 in step 19d.

Download of the pre-configured user data by MS B may include conducting a check in a similar manner as described above for FIG. 16.

In alternative embodiments of the invention, the notification of step 19a and the identifier transmittal of step 19d are combined into a single step. Similarly, the data store updating of step 19c and data store lookup of step 19e could be combined into a single step.

Embodiments of the invention involve server system 100 instructing a user device to display one or more parts of pre-configured user data received during a call. Instructing a user device to display pre-configured user data could be combined with transmittal of the pre-configured user data or an identifier for the pre-configured user data to a user device, or could involve a distinct instruction step. Such functionality could be particularly useful if for example the pre-configured user data includes a name for a user associated with the pre-configured user data; displaying the name or user identity associated with a user of one user device on another user device involved in a call provides a convenient way to identify a user involved in a telephone call.

The pre-configured user data could comprise a variety of different types of user data such as one or more of a user's name, a social network user identity, an email address, a date, an image file, and a postal or street address.

Transmittal of pre-configured user data in the form of a name or user identity could be useful in identifying a user conducting a call to one or more other parties to the call. If the image is a photo of a calling party, then a similar effect can be achieved.

Transmittal of pre-configured user data in the form of a postal or street address or email address could be useful in identifying how to contact a user by a different communication means after the telephone call is terminated.

Transmittal of pre-configured user data in the form of a date could be useful in highlighting a date of interest to users such as the date of a user's birthday or other such event date.

Embodiments of the invention described above involve enabling receipt of pre-configured user data associated with the user of a user device to one or more other devices during a call between the user devices. In other embodiments, a user specifies different pre-configured user data for receipt by one or more pre-defined user devices during calls with those user devices. When a user configures their user data, they can pre-define one or more subsets of their pre-configured user data for receipt during calls with one or more pre-defined user devices of their choosing.

Configuration could for example involve associating one or more user devices into different groups such as a family group, a work group etc. Different pre-defined user data can then be received during a call with a user device in the family group than pre-defined user data received during a call with a user device in the work group.

Embodiments of the invention involve identifying that a call is being conducted with a pre-defined user device on the basis of received call party details for the call, for example a telephone dialing number associated with a user device pre-defined by a user. When a call with such a pre-defined user device is identified, the subset of pre-configured user data can be received the pre-defined user device instead of or in addition to the pre-defined user data received by other non-pre-defined user devices.

Embodiments of the invention involve a telephony user device capable of establishing a communications session for communication of data with respect to at least one other user device in a data communications network, the telephony user device comprising a data store and being capable of:

transmitting call party details of a telephone call, the telephone call involving at least the telephony user device, the telephony user device being a first telephony user device, and a second telephony user device, the call party details including a first identity associated with the first telephony user device and a second identity associated with the second telephony user device, at least one of the first and second identities comprising a telephone dialing number;

establishing, on the basis of the first and second identities received in the call party details, a separate communications session, separate from the telephone call, for the communication of data to and/or from the at least one other user device;

receiving data from the at least one other user device via the separate communications session; and presenting the user of the telephony user device with an option to update the data store with at least a part of the received data.

In such embodiments, the received data need not be user data and need not have been have been specified by a user of a user device prior to the establishment of the telephone call as data for receipt by other user devices during telephone calls conducted by the user.

In such embodiments of the invention, upon receipt of data at a user device, the user device may carry out a search of a local data store or internal memory to see if data corresponding to the received data or part thereof is already stored with the data store. If the search of a user device's data store does not find data corresponding to at least a part of the received data in its store, then the data store can be updated with one or more parts of the received data accordingly.

When the data is received at a user device, one or more parts of the received data may be displayed by the user device during the call, for example the name of the other party to the call could be displayed during the call. The display may occur in response to receipt of a display instruction from server system 100 and may include giving the user the option to allow display of the data or not.

Displaying the received data may involve overlaying the display of the received data over other data displayed during the call. The received data may for example be overlaid over other data already displayed in association with an in-call screen application (or call dialing application) running on the user device and operable via a touch-screen interface; such an application will typically involve display of a number of touch-sensitive icons for inputting telephone dialing number digits and facilitating operations such as 'dial number', 'end call', 'hold call' etc. The other data may also include a telephone number or other identifier associated with a calling or called party for the call. Overlaying the received data may involve displaying the received data in a translucent manner such that other data displayed during the call can also be seen through the displayed received data. Alternatively, overlaying the received data may involve displaying the received data in a non-translucent manner to replace data already displayed during the call, for example the display of the telephone dialing number of the other party to the call could be replaced by the name of the other party to the call.

When the data is received at a user device, the user device may present the user with an option to update the user device data store with the received data, for example by appropriate output on a display of the user device. The user can authorize updating of the data store by user input via a telephony device user input interface.

The option to update the data store of a user device with received data may be presented when the users are still conducting a telephone call. Alternatively, or in addition, the update option is presented to a user after termination of the call.

Termination of the call may be detected by application software on the telephony user device which is capable of detecting termination of calls made by the telephony user device.

Alternatively, the telephony user device may receive notification of termination of the call from the data communications network, for example from a network entity such as server system 100, network element 108 or SCP 150.

The telephony user device may temporarily update its data store with all or a part of the data received via the separate communication session for the duration of the call. The user can then be presented with the option to confirm the temporary (in-call) updating of the data store after termination of the call.

In alternative embodiments of the invention, the data store of the telephony user device is updated in response to receipt of data via the separate communications session without the user being presented with the option to accept the update(s) or not.

Embodiments of the invention allow the user of the telephony user device to choose if and to what extent the data store of their telephony user device is updated with data received via the separate communication session. Such embodiments may for example involve allowing the user to configure settings such that any updates for data received from a particular contact in the telephony user device address book are rejected, or data received from a particular contact are only used to update the data store a single time, or data received from contacts contained in the telephony user device address book are used to update the date store without requiring confirmation from the user. Another embodiment might involve allowing a user to create a black-list of a number of contacts from which received data are not to be used to update the data store.

Embodiments of the invention described below in relation to FIGS. 20 to 24 involve a user of one user device recommending a downloadable resource (or more than one downloadable resource) for download to the user device of another user (or to a plurality of user devices of other users). The recommended downloadable resource could for example be a software application (e.g. a game), a software component (e.g. a plug-in), audio data (e.g. an mp3 (Moving Picture Experts Group-2 Audio Layer 3) music file), image data (e.g. a photo), and video data (e.g. a Moving Picture Experts Group-4 file).

Download of a recommended downloadable resource is tracked such that when the recommended downloadable resource is downloaded, a predetermined identifier is associated with the download such that the recommendation of the downloadable resource for download by or via the predetermined identifier can be recognized and the predetermined affiliate credited or otherwise rewarded accordingly. Tracking of the download may be enabled via use of an affiliate identifier which identifies the appropriate predetermined affiliate.

Such embodiments of the invention can be used to allow a user to share a third-party mobile phone application (or 'app') with a person they are talking to over the phone, for example allowing one user to recommend a favorite game to another user.

Such embodiments could for example be implemented on a mobile phone by use of a "recommend a download" option (for example implemented via a soft-key icon on a touch-screen user interface) which allows a local user to select a downloadable resource such as an application they want to recommend (possibly from a list of apps installed on the phone) to a user of a remote mobile phone they are conducting a telephone call with. A link, for example a URL to an app store where the recommended downloadable resource can be purchased and downloaded, is then sent to the phone of the remote user. The link is operable to associate a predetermined affiliate, e.g. the user recommending the app, with the download; in this way, the app store is notified of the affiliate recommendation that led to the purchase of the app and can credit the affiliate accordingly. The app store may pay the affiliate a bounty (perhaps a fixed fee or a percentage of the purchase price) for each app bought via an affiliate recommendation.

In some embodiments of the invention, the predetermined identifier identifies the user conducting the telephone call and recommending the downloadable resource. In such embodiments, the affiliate identifier may comprise an identity associated with the user device of the user conducting the call such as the telephone dialing number of the user device.

In other embodiments of the invention, the predetermined identifier identifies a service provider associated with generation of the transmissible identifier. In such embodiments, the predetermined identifier may comprise an identity associated with a network entity operated by the service provider, for example an IP address of a server.

Figure 20:
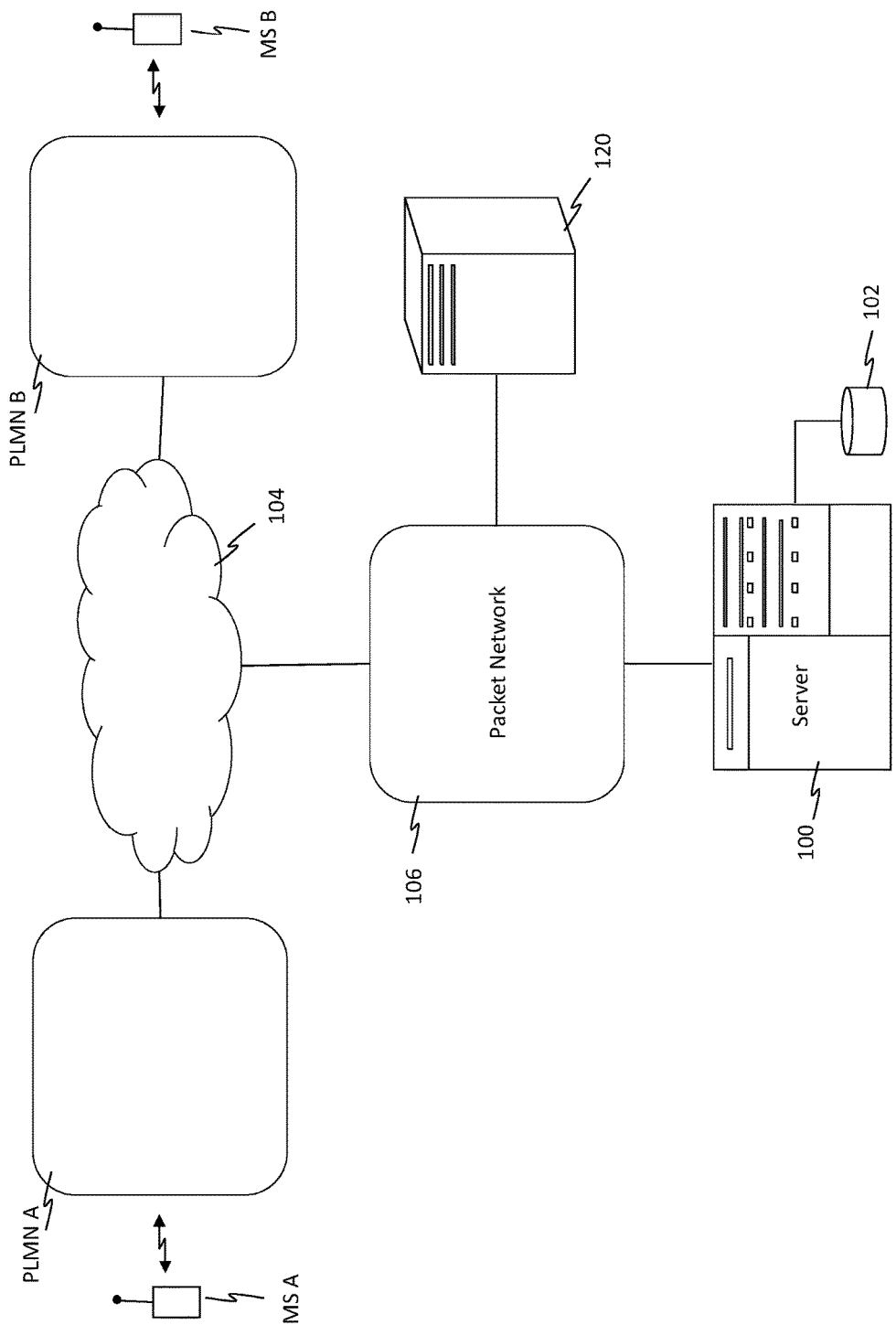
FIG. 20 is a system diagram according to one or more embodiments of the invention.

FIG. 20 is a system diagram showing a data communications network according to embodiments of the present invention. FIG. 20 includes some entities similarly depicted and labelled to FIG. 1, with such entities functioning in a similar manner. In addition, the system of FIG. 20 includes a content server 120 connected to packet network 106 at which electronic content can be provided, for example via electronic download as described above in relation to FIG. 9. Content server 120 could comprise an app store and the electronic content could comprise one or more electronic files, for example software applications such as computer games, plug-ins, or media data such as music, videos, etc.

Figure 21:
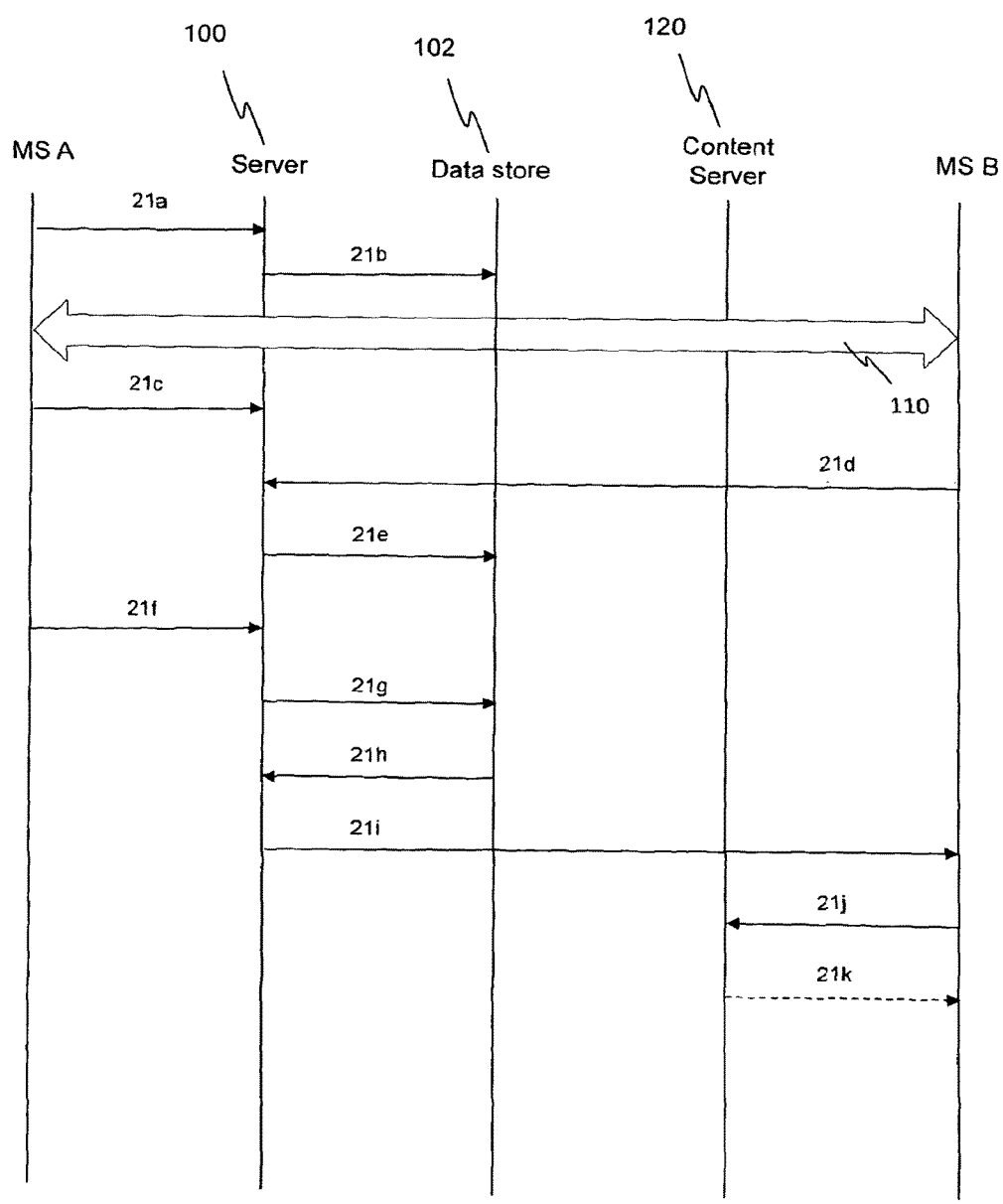
FIG. 21 is a flow diagram depicting operation of one or more embodiments of the invention using the system of FIG. 20.

FIG. 21 is a flow diagram depicting operation of embodiments of the invention, for example implemented in a system depicted in FIG. 20.

In these embodiments, the predetermined affiliate comprises a user of user device MS A. Prior to a call between MS A and MS B, MS A transmits an affiliate identifier which identifies the user of MS A to server system 100, as shown by step 21a.

The predetermined identifier could comprise a name, email address, telephone dialing number, nickname, username, number, alphanumeric string, etc.

In step 21b, server system 100 updates data store 102 with the affiliate identifier associated with MS A. A voice call is subsequently conducted between MS A in PLMN A and MS B in PLMN B, as shown by item 110.

The predetermined identifier could be transmitted to server system 100 in a text or email message or could be entered on a registration page of a web-server interface of server system 100 using a browser application running on MS A.

Similarly as described above in relation to FIG. 2, application software running on MS A detects that there is a call in progress between MS A and MS B and notifies server system 100 of call party details for the call e.g. the TDNs of telephones involved in the call, TDN A associated with MS A and TDN B associated with MS B, in step 21c, and application software running on MS B detects the call in progress between MS B and MS A and notifies server system 100 of call party details, e.g. TDN A and TDN B, for the call in step 21d.

Server system 100 identifies that the notification of step 21c from MS A and notification of step 21d from MS B have call party details, TDN A and TDN B, in common and establishes a separate communications session, separate from the telephone call, for the communication of data between MS A and MS B. Server system 100 updates the records for MS A and MS B in data store 102 to indicate that a call is in progress between MS A and MS B and that a communications session between MS A and MS B, separate to the voice call between MS A and MS B, has been established in step 21e.

During the call, the user of MS A decides to recommend one or more downloadable resources to the user of MS B and using appropriate input on MS A transmits an identifier identifying one or more downloadable resources to server system 100 in step 21f. The identifier may be a network address such as a URL for a location where the one or more downloadable resources may be downloaded. Appropriate input from the user of MS A might involve pressing a 'recommend a download' icon on a touch-screen user interface on MS A and subsequently selecting a particular installed file via a file manager or web browser application running on MS A. This installed file preferably corresponds to a downloadable resource, which is available from a remote network data store.

When server system 100 receives the identifier identifying one or more downloadable resources of step 21f, it performs a lookup in data store 102 using TDN A for MS A in step 21g and identifies that a communications session has been established between MS A and MS B.

Server system 100 retrieves the affiliate identifier for MS A and TDN B for MS B from data store 102 in step 21h. Server system 100 then generates a transmissible identifier based at least in part on the identifier received from MS A in step 21f. The transmissible identifier is operable to, in response to download of the one or more downloadable resources using the transmissible identifier, associate a predetermined affiliate, e.g. the user of MS A, with the download.

In some embodiments of the invention, both the establishment of a separate communication session and the generation of a transmissible identifier may be carried out by a single server. In other embodiments of the invention, the establishment of a separate communication session is carried out by a different server to that which generates the transmissible identifier.

Server system 100 then enables the download of the one or more downloadable resources to MS B by transmitting the transmissible identifier to MS B in step 21i.

When the transmissible identifier is received at MS B, the user of MS B uses the transmissible identifier to locate the one or more downloadable resources recommended by the user of MS A in step 21j and download of the one or more downloadable resources to MS B occurs in step 21k.

Download of the one or more downloadable resources to MS B using the transmissible identifier in step 21k results in the user of MS A being associated with the download, thus allowing the user of MS A to be rewarded or otherwise credited for recommending the one or more downloadable resources to the user of MS B. The user of MS B may choose to download the one or more downloadable resources either during the call with the user of MS A, or after the call has been terminated.

In some embodiments of the invention, when the download from content server 120 occurs, the transmissible identifier indicates to content server 120 that the recommendation came from via MS A and content server 120 can thus identify the user of the MS A as the predetermined affiliate associated with the download to MS B. Content server then increments an account associated with the predetermined affiliate in order to keep track of recommendations provided via MS A which resulted in downloads to other user devices.

In other embodiments of the invention, when the download from content server 120 occurs, the transmissible identifier indicates to content server 120 that it should transmit a download notification message to a predetermined network address. The predetermined network address could correspond to a download tracking entity (not shown) responsible for keeping track of downloadable resource recommendations and resulting downloadable resource downloads for a plurality of content servers. The download tracking entity can thus recognize that the user of MS A recommended the one or more downloadable resources that were subsequently downloaded by the user of MS B and credit the user of MS A accordingly. In such embodiments, the predetermined network address may be transmitted by server system 100 to MS B and on to content server 120 in conjunction with steps 21i and 21j, or alternatively, content server 120 could be configured with knowledge of the predetermined network address prior to the call between MS A and MS B.

In embodiments of the invention, generating the transmissible identifier comprises inserting a predetermined identifier into the received identifier, with the result being the transmissible identifier. The inserted predetermined identifier could comprise an identity associated with the user device of the user recommending the one or more downloadable resources for download, for example comprising one or more of the identities upon which establishment of the separate communications session is based. Alternatively, the inserted predetermined identifier could comprise an identity associated with a network entity operated by a service provider.

In some embodiments, if the received identifier is a URL for a network location at which one or more downloadable resources can be downloaded, then the transmissible identifier comprises a URL which points to the same network location at which the one or more downloadable resources can be downloaded, but which also contains a predetermined identifier for the user device from which the downloadable resource download recommendation originated which can be used by content server 120 to identify the user device which was the source of the download recommendation.

In other embodiments, if the received identifier is a URL for a network location at which one or more downloadable resources can be downloaded, then the transmissible identifier comprises a URL for a different network location at which the one or more downloadable resources may be downloaded and where the user of MS A can be credited for the recommendation that led to the download of the one or more downloadable resources to a user device of another user.

Figure 22:
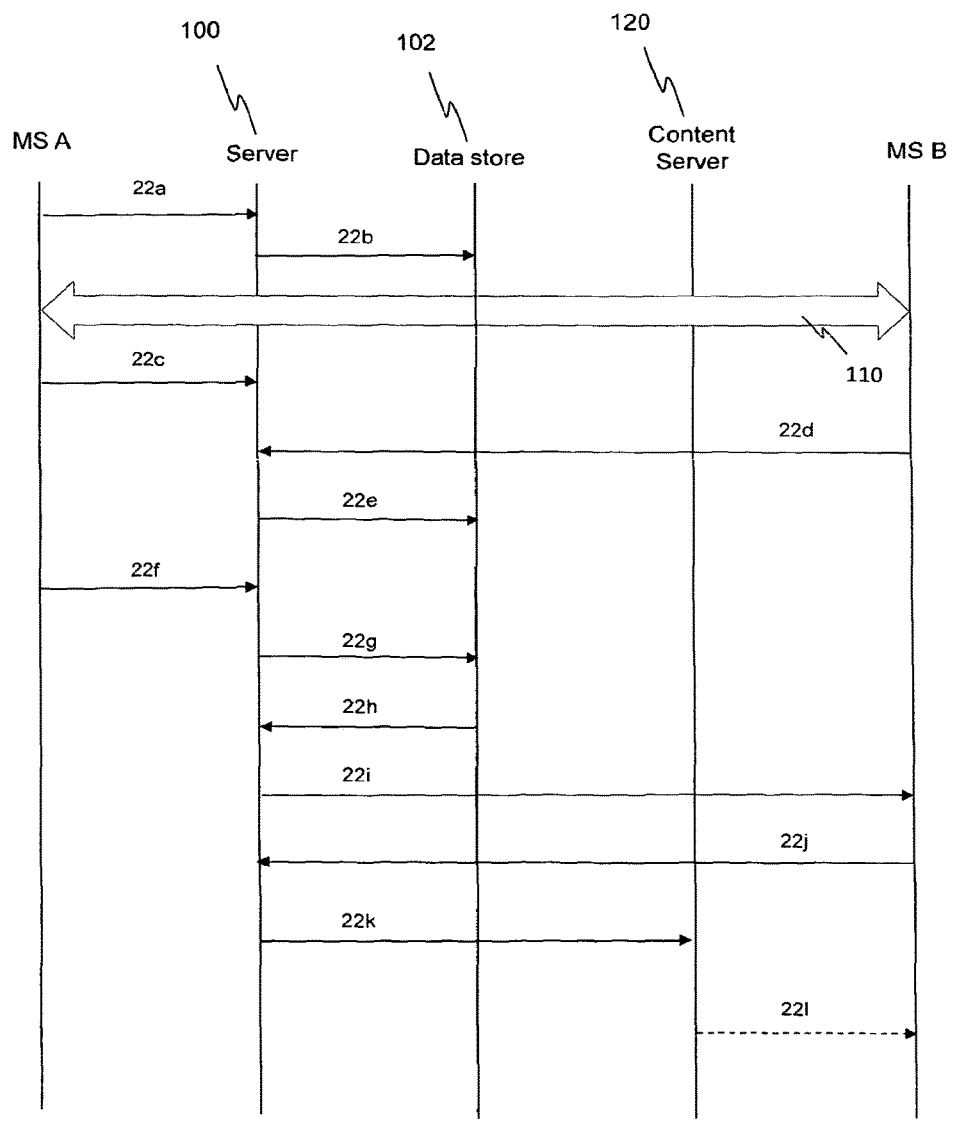
FIG. 22 is a flow diagram depicting operation of one or more embodiments of the invention using the system of FIG. 20.

FIG. 22 is a flow diagram depicting operation of embodiments of the invention, for example implemented in a system depicted in FIG. 20. Similarly to FIG. 21 described above, the predetermined affiliate comprises a user of user device MS A, and MS A transmits an affiliate identifier which identifies MS A to server system 100 in step 22a. Server system 100 updates data store 102 with the affiliate identifier associated with MS A in step 21b. A voice call is subsequently conducted between MS A in PLMN A and MS B in PLMN B, as shown by item 110.

Application software running on MS A detects that there is a call in progress between MS A and MS B and notifies server system 100 of call party details for the call in step 22c, and application software running on MS B detects the call in progress between MS B and MS A and notifies server system 100 of call party details for the call in step 22d. Server system 100 identifies that the notification of step 22c from MS A and notification of step 22d from MS B have call party details in common and establishes a separate communications session, separate from the telephone call, for the communication of data between MS A and MS B. Server system 100 updates the records for MS A and MS B in data store 102 accordingly in step 22e.

During the call, the user of MS A decides to recommend one or more downloadable resources for download to the user of MS B and using appropriate input on MS A transmits an identifier identifying one or more downloadable resources to server system 100 in step 22f.

When server system 100 receives the identifier of step 22f, it performs a lookup in data store 102 using TDN A for MS A in step 22g and identifies that a communications session has been established between MS A and MS B.

Server system 100 retrieves the affiliate identifier for MS A and TDN B for MS B from data store 102 in step 22h. Server system 100 then generates a transmissible identifier based at least in part on the identifier received from MS A in step 22f. The transmissible identifier is operable to, in response to download of the one or more downloadable resources using the transmissible identifier, associate a predetermined affiliate, e.g. the user of MS A, with the download. In this embodiment of the invention, the transmissible identifier comprises a network address for server system 100. Server system 100 then enables the download of the one or more downloadable resources to MS B by transmitting the transmissible identifier to MS B in step 22i.

When the user of MS B uses the transmissible identifier to download the one or more downloadable resources, this results in server system 100 being contacted by MS B in step 22j. Server system 100 enables the download of the one or more downloadable resources to MS B by contacting content server 120 in step 22k which results in the one or more downloadable resources being downloaded to MS B in step 22l. Since server system 100 is involved in the download path of the one or more downloadable resources downloaded by MS B, server system 100 is able to facilitate the crediting of the download recommendation to the user of MS A.

In some embodiments of the invention, server system 100 credits the download recommendation to the user of MS A by incrementing an account associated with the appropriate predetermined affiliate, e.g. the user of MS A.

In other embodiments of the invention, generating the transmissible identifier may comprise inserting a network address for server system 100 into the received identifier and server system 100 credits the download recommendation to the user of MS A by transmitting a download notification message to a predetermined network address corresponding to a download tracking entity which identifies the predetermined affiliate as the user of MS A.

Figure 23:
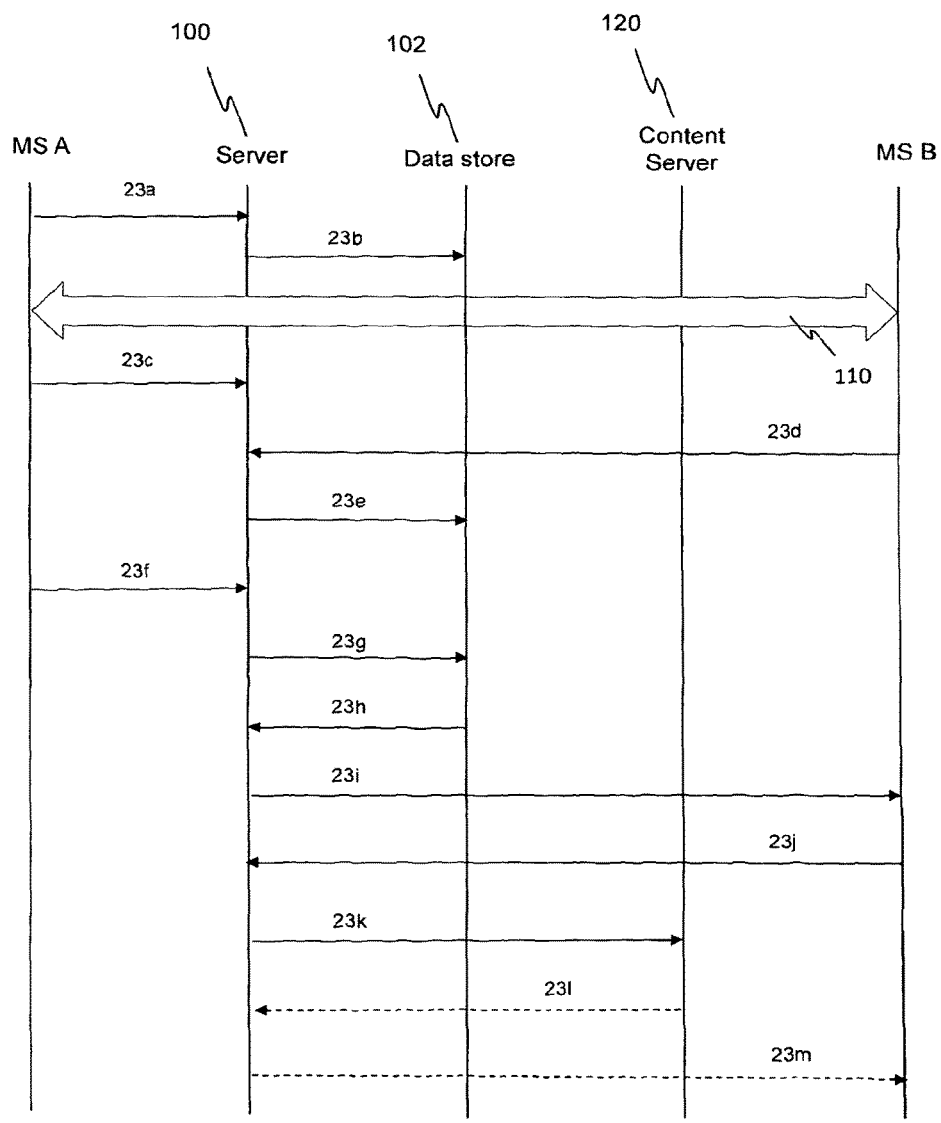
FIG. 23 is a flow diagram depicting operation of one or more embodiments of the invention using the system of FIG. 20.

FIG. 23 is a flow diagram depicting operation of embodiments of the invention, for example implemented in a system depicted in FIG. 20. Steps 23a to 23j occur in a similar manner to steps 22a to 22j described above in relation to FIG. 22.

When the user of MS B uses the transmissible identifier to download the one or more downloadable resources, this results in server system 100 being contacted by MS B in step 23j. Server system 100 enables the download of the one or more downloadable resources to MS B by contacting content server 120 in step 23k which results in the one or more downloadable resources being downloaded to server system 100 in step 23l. Server system 100 then downloads the one or more downloadable resources to MS B in step 23m.

Since server system 100 is involved in the download path of the one or more downloadable resources downloaded by MS B, server system 100 is able to facilitate the crediting of the download recommendation to the user of MS A, for example by incrementing an account associated with the appropriate predetermined affiliate, e.g. the user of MS A, or by transmitting a download notification message to a predetermined network address corresponding to a download tracking entity which identifies the predetermined affiliate as the user of MS A.

Figure 24:
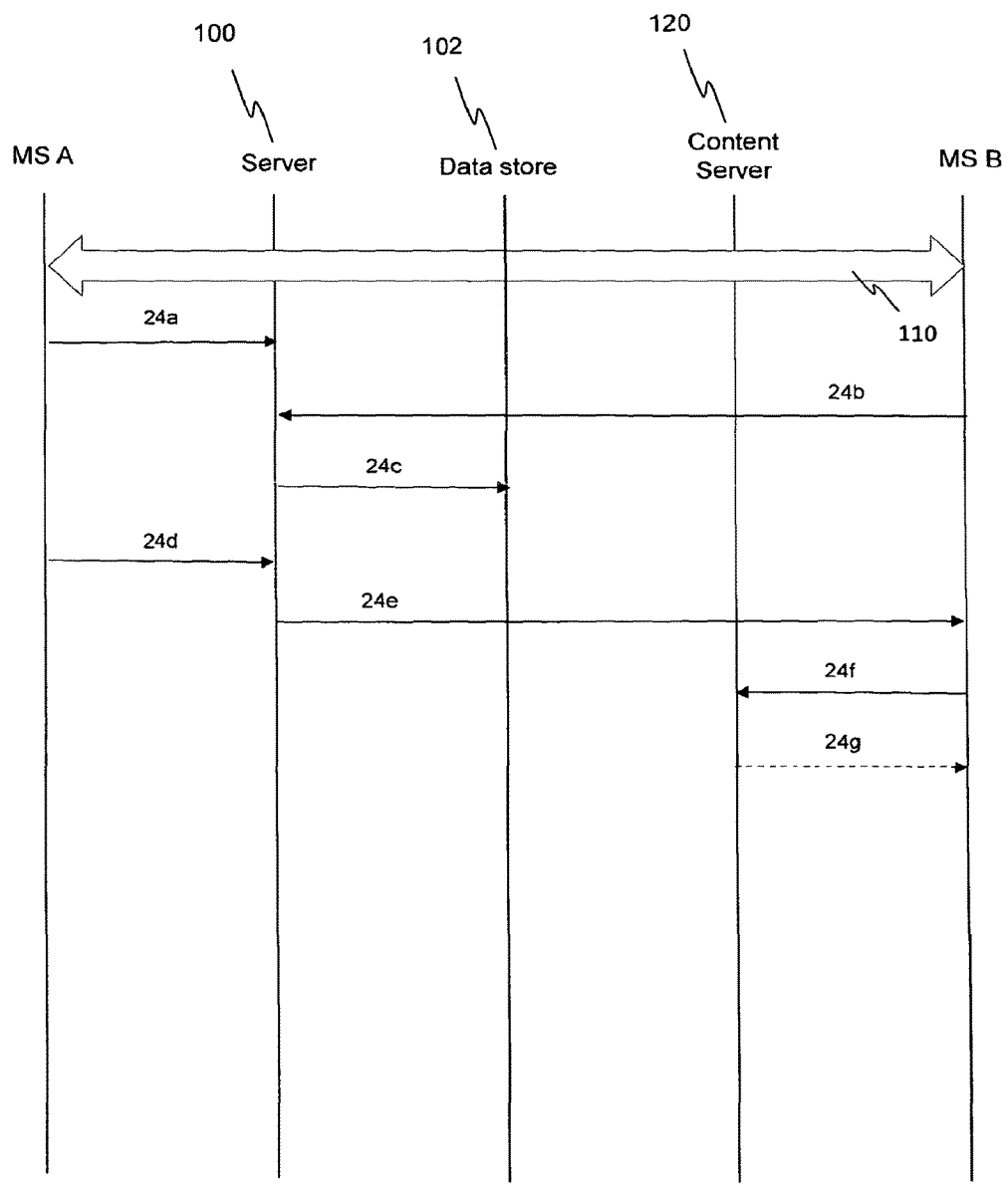
FIG. 24 is a flow diagram depicting operation of one or more embodiments of the invention using the system of FIG. 20.

FIG. 24 is a flow diagram depicting operation of embodiments of the invention, for example implemented in a system depicted in FIG. 20.

In a first embodiment depicted by FIG. 24, the predetermined affiliate comprises a user of user device MS A.

A voice call is conducted between MS A in PLMN A and MS B in PLMN B, as shown by item 110. Similarly as described above in relation to FIG. 2, application software running on MS A detects that there is a call in progress between MS A and MS B and notifies server system 100 of call party details for the call in step 24a, and application software running on MS B detects the call in progress between MS B and MS A and notifies server system 100 of call party details for the call in step 24b.

Server system 100 identifies that the notification of step 24a from MS A and notification of step 24b from MS B have call party details, TDN A and TDN B, in common and establishes a separate communications session, separate from the telephone call, for the communication of data between MS A and MS B. Server system 100 updates the records for MS A and MS B in data store 102 to indicate that a call is in progress between MS A and MS B and that a communications session between MS A and MS B, separate to the voice call between MS A and MS B, has been established in step 24c.

During the call, the user of MS A decides to recommend one or more downloadable resources to the user of MS B and using appropriate input on MS A transmits an identifier identifying one or more downloadable resources to server system 100 in step 24d. In conjunction with transmittal of the identifier identifying one or more downloadable resources to server system 100, step 24d also involves transmittal of an affiliate identifier associated with MS A to server system 100. The identifier identifying one or more downloadable resources and/or the affiliate identifier may be transmitted to server system 100 via the separate communications session.

Server may update (not shown) data store 102 with the affiliate identifier associated with MS A (not shown) received in step 24*d*.

Upon receipt of the identifier identifying one or more downloadable resources and affiliate identifier at server system 100 in step 24*d*, server system 100 generates a transmissible identifier based at least in part on the identifier for the one or more downloadable resources received from MS A in step 24*d*. The transmissible identifier is operable to, in response to download of the one or more downloadable resources using the transmissible identifier, associate a predetermined affiliate, e.g. the user of MS A, with the download. Server system 100 then enables the download of the one or more downloadable resources to MS B by transmitting the transmissible identifier to MS B in step 24*e*.

When the transmissible identifier is received at MS B, the user of MS B uses the transmissible identifier to locate the one or more downloadable resources recommended by the user of MS A in step 24*f* and download of the one or more downloadable resources to MS B occurs in step 24*g*. Download of the one or more downloadable resources to MS B using the transmissible identifier in step 24*g* results in the user of MS A being associated with the download, thus allowing the user of MS A to be rewarded or otherwise credited for recommending the one or more downloadable resources for download to the user of MS B.

In an alternative embodiment to the first embodiment described above in relation to FIG. 24, instead of MS A transmitting an affiliate identifier in conjunction with an identifier for one or more downloadable resources to server system 100 in step 24*d*, step 24*d* can just involve transmittal of an identifier identifying one or more downloadable resources. Server system 100 can then allocate an affiliate identifier to MS A itself and generate a transmissible identifier accordingly.

In a second embodiment depicted by FIG. 24, the predetermined identifier identifies a service provider associated with generation of the transmissible identifier, for example the service provider responsible for operation of server system 100 and data store 102.

In this second embodiment depicted by FIG. 24, steps 24*a* to 24*c* occur in a similar manner to steps 24*a* to 24*c* described above in relation to the first embodiment depicted by FIG. 22.

During the call, the user of MS A decides to recommend one or more downloadable resources to the user of MS B and using appropriate input on MS A transmits an identifier identifying one or more downloadable resources to server system 100 in step 24*d*. In this second embodiment, no affiliate identifier is transmitted from MS A to server system 100 in conjunction with transmittal of the identifier identifying one or more downloadable resources to server system 100 in step 24*d*.

In this second embodiment, server system 100 then generates a transmissible identifier based at least in part on the identifier identifying one or more downloadable resources received from MS A in step 24*d*. The transmissible identifier is operable to, in response to download of the one or more downloadable resources using the transmissible identifier, associate a predetermined affiliate, e.g. the service provider associated with generation of the transmissible identifier, with the download.

In this second embodiment, the predetermined identifier may comprise a network address for a server operated by the service provider at which the transmissible identifier is generated and generating the transmissible identifier may comprise inserting a network address for the server into the received identifier. The same predetermined identifier may be used by the service provider in relation to calls to/from and separate communications sessions between a plurality of user devices, not just in relation to recommendations originating from MS A and calls between MS A and MS B.

Server system 100 enables the download of the one or more downloadable resources to MS B by transmitting the transmissible identifier to MS B in step 24*e*.

When the transmissible identifier is received at MS B, the user of MS B uses the transmissible identifier to locate the one or more downloadable resources recommended by the user of MS A in step 24*f* and download of the one or more downloadable resources to MS B occurs in step 24*g*.

Download of the one or more downloadable resources to MS B using the transmissible identifier in step 24*g* results in the service provider associated with generation of the transmissible identifier being associated with the download, thus allowing the service provider to be rewarded or otherwise credited for passing the recommendation to download one or more downloadable resources from the user of MS A to the user of MS B.

In some embodiments of the invention, when the download from content server 120 occurs, the transmissible identifier indicates to content server 120 that the recommendation came via server system 100 and content server 120 can thus identify the service provider associated with generation of the transmissible identifier as the predetermined affiliate associated with the download to MS B. Content server then increments an account associated with the predetermined affiliate in order to keep track of recommendations provided via server system 100 which resulted in downloads to other user devices.

In other embodiments of the invention, when the download from content server 120 occurs, the transmissible identifier indicates to content server 120 that it should transmit a download notification message to a predetermined network address. The predetermined network address could correspond to a download tracking entity (not shown) responsible for keeping track of downloadable resource download recommendations and resulting downloadable resource downloads for a plurality of content servers. The download tracking entity can thus recognize that the recommendation from the user of MS A to download the one or more downloadable resources that were subsequently downloaded by the user of MS B came via server system 100 and can credit the service provider associated with generation of the transmissible identifier accordingly.

In an alternative embodiment to the second embodiment depicted by FIG. 24 described above, instead of steps 24*e* to 24*g* being carried out upon the user of MS B choosing to download the one or more downloadable resources recommended by the user of MS A using the transmissible identifier, server system 100 can contact content sever 120 itself, carry out the download of the one or more downloadable resources and pass the one or more downloadable resources on to MS B in a similar manner to steps 23*j* to 23*m* described above in relation to FIG. 23. In these alternative embodiments, the predetermined affiliate is the service provider, e.g. credit for download of the one or more downloadable resources will go to the service provider.

During a call between two parties, the party devices used for the call may have different operating systems. One device may therefore require that downloadable resources downloaded to the device be in a different format to the downloadable resources recommended by the other party.

For example MS A may run an Android operating system and MS B may run an iPhone operating system. Android and iPhone versions of the app may exist and one version may only be suitable for installation on one of the devices. The Android version of the app may only be available for purchase via one content server, e.g. Android Marketplace™, whereas the iPhone version of the app may only be available for purchase via another content server, e.g. iTunes™ App Store. If the user of MS A recommends an Android app to the user of MS B, this can create compatibility problems because the iPhone operating system MS B may not be able to run the recommended app in the Android format correctly.

The above compatibility problem can be tackled by conducting a compatibility check to determine whether the device (say MS B) to which the one or more downloadable resources are being recommended supports a first format (supported by MS A say) in which the one or more downloadable resources are being recommended. If the compatibility check indicates that MS B does not support the first format, then a transmissible identifier is generated such that the transmissible identifier identifies the one or more downloadable resources in a second format, different to the first format, where MS B does support the second format.

Compatibility data indicating supported file formats of a plurality of user devices may be stored in a date store such as data store 102 accessible by server system 100, and the compatibility check may be conducted at server system 100.

The compatibility check may comprises transmitting a compatibility query to MS B, and receiving a response indicating whether MS B supports the first format or not. Conducting the compatibility check may comprise performing a lookup in a file format database (not shown) responsible for providing identifiers for downloadable resources across a plurality of formats.

In embodiments of the invention described above in relation to FIGS. 20 to 24, server system 100 generates a transmissible identifier based at least in part on an identifier for one or more downloadable resources it receives from MS A, where the transmissible identifier is operable to, in response to download of the one or more downloadable resources using the transmissible identifier, associate a predetermined affiliate with the download. In alternative embodiments of the invention, MS A may transmit an identifier identifying one or more downloadable resources to server system 100, where the received identifier is operable to, in response to download of one or more downloadable resources using the received identifier, associate a predetermined affiliate with download of the one or more downloadable resources. In such alternative embodiments of the invention, MS A may generate the identifier for the one or more downloadable resources itself without requiring any modification of the identifier by server system 100. Server system 100 enables download of the one or more downloadable resources to MS B by transmitting the identifier received from MS A on to MS B. In such alternative embodiments of the invention, the predetermined affiliate may comprise the user of MS A.

Embodiments of the invention described below in relation to FIGS. 25 to 30 involve establishing a communications session for communication of data between at least two devices in a data communications network. In these embodiments, one of the at least two devices comprises a telephony user device comprising a reconfigurable graphical user interface. Another of the at least two devices comprises a device associated with a service provider. The service provider also has one or more associated telephony devices.

Figure 25:
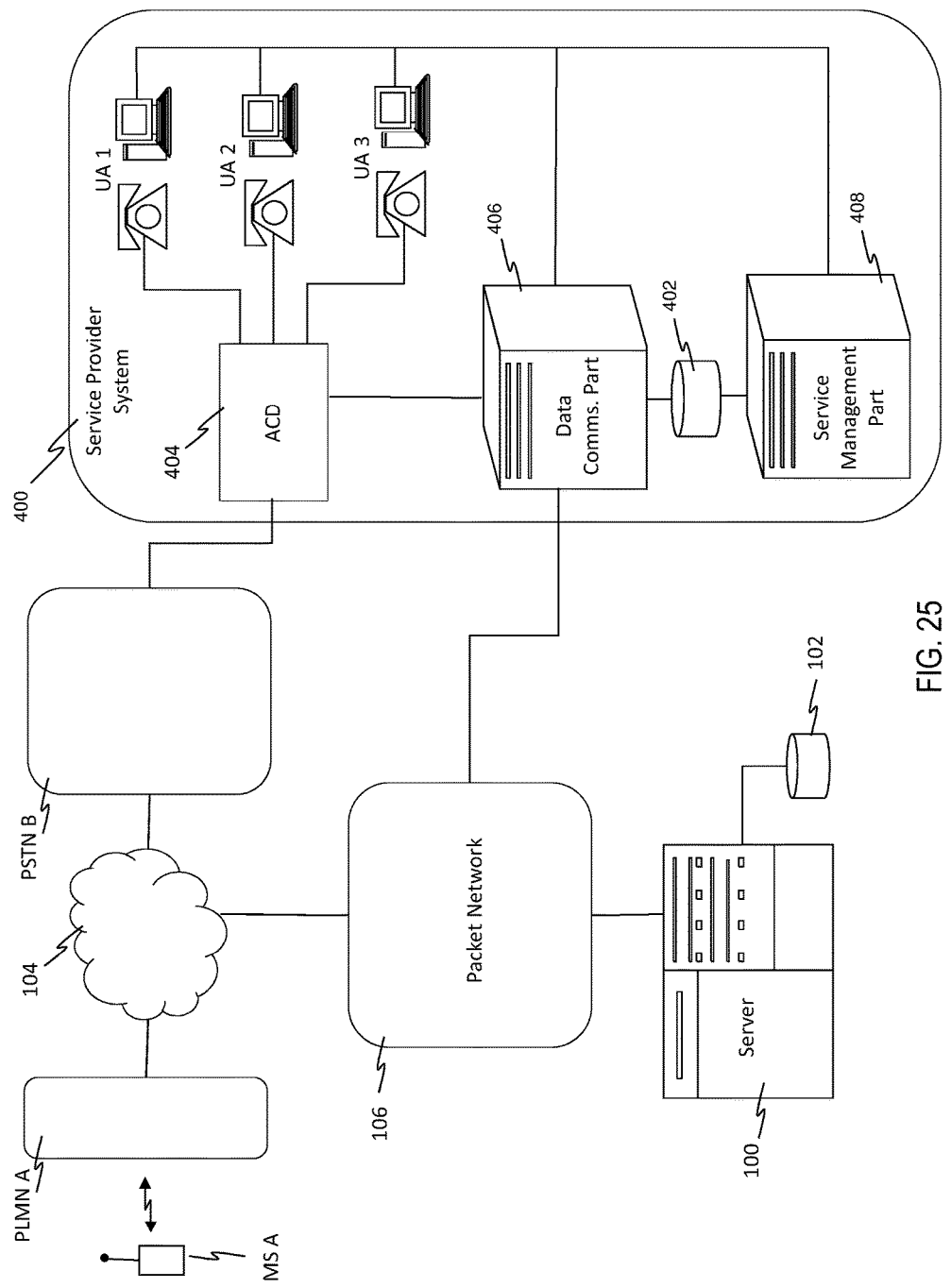
FIG. 25 is a system diagram according to one or more embodiments of the invention.

FIG. 25 is a system diagram according to embodiments of the invention. Similarly, to FIG. 1, FIG. 25 includes mobile station MS A, PLMN A, telecommunications network 104, packet network 106, server system 100 and data store 102. FIG. 25 also includes a PSTN B which functions in a similar manner to PSTN A as described above in relation to FIG. 4.

FIG. 25 also includes a service provider system 400 comprising an automatic call distributing system 404 (denoted 'ACD'), a data communications part 406, a service provider data store 402 and a service management part. Service provider system 400 also includes a number of user agent positions UA 1, UA 2, UA 3, with each user agent position comprising a user agent telephony device and a user agent computing device. Each user agent telephony device is connected to ACD 404. Each user agent computing device is connected to data communications part 406 via a Local Area network (LAN) or suchlike.

ACD 404 is capable of distributing incoming telephone calls to one or more user agents at which respective user agent operators are available. Incoming calls to the service provider system are distributed according to the availability of user agent operators at their associated user agent positions. When an incoming call from a customer is distributed to an available user agent position, a user agent operator associated with that user agent position can speak to the customer via their associated user agent telephony device and can process service data related to a service being provided to the customer via their associated computing device.

Data communications part 406 comprises a computing device such as a server with Computer Telephony Integration (CTI) capabilities. Data communications part 406 uses CTI techniques to provide user agent operators with information displayed via their associated user agent computing devices relating to calls they are conducting with customers. Data communications part 406 is capable of establishing and/or processing communication sessions between user agent computing devices and devices external to service provider system 400. Incoming data which data communications part 406 receives from an external device via a communication session can be passed on to the appropriate user agent computing device and vice versa for outgoing data from a user agent computing device.

Figure 26:
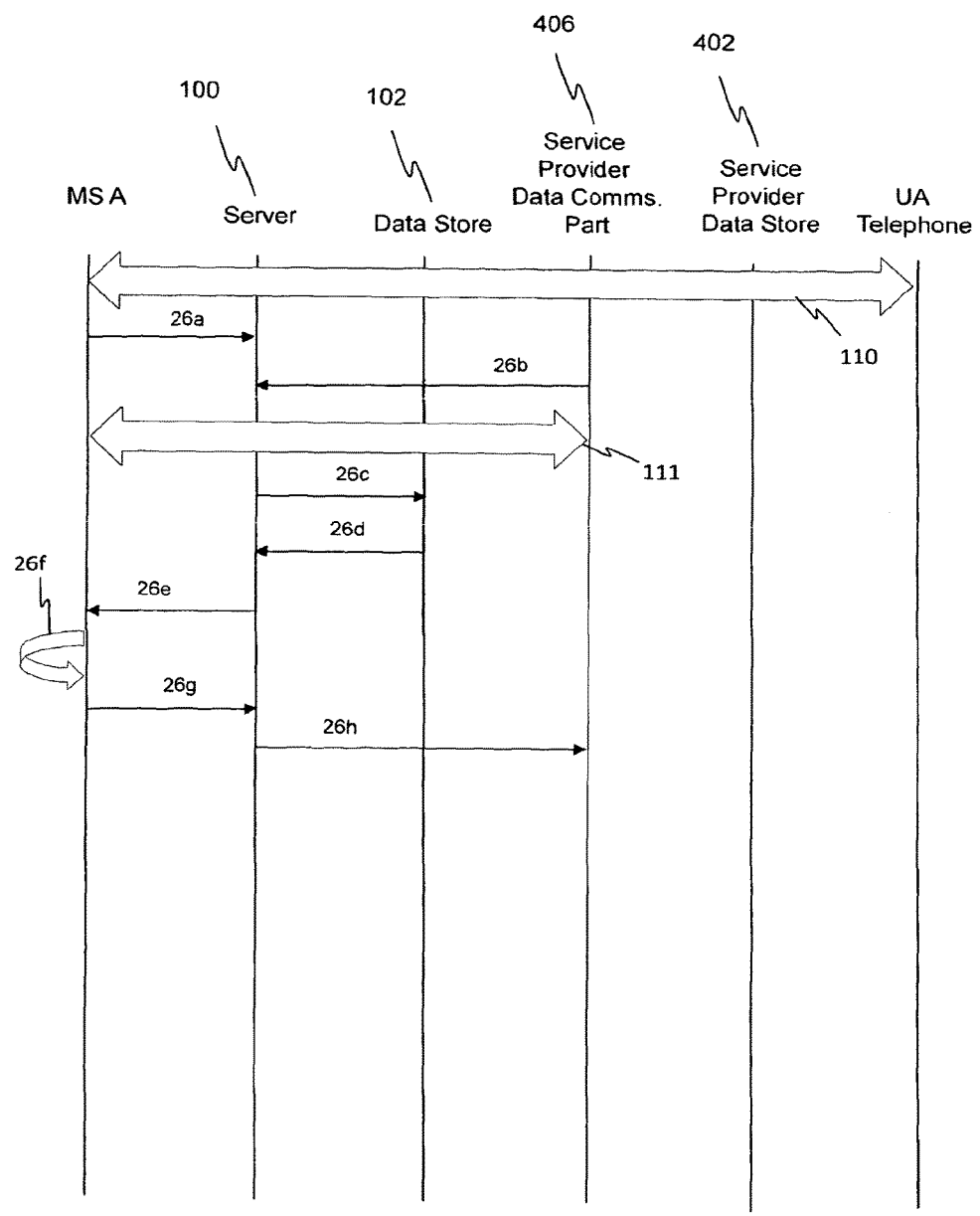
FIG. 26 is a flow diagram depicting operation of one or more embodiments of the invention using the system of FIG. 25.

FIG. 26 is a flow diagram depicting operation of embodiments of the invention using the system of FIG. 25.

Telephony user device MS A is capable of establishing a communications session for communication of data with respect to at least one other device in a data communications network. MS A includes a reconfigurable graphical user interface.

The user of MS A dials the telephone dialing number associated with service provider system 400 which results in automatic call distributing system 404 receiving the incoming call. ACD 404 proceeds to identify an available user agent operator to take the incoming call. In these embodiments, the user of MS A is a customer of the service provider.

ACD 404 identifies that a user agent operator is available at a user agent position (for example agent position 'UA 1' depicted in FIG. 25) having an associated telephone (depicted 'UA Telephone' in FIG. 26) and computing device, and distributes the call to that UA Telephone accordingly. A voice call is thus established between MS A and UA Telephone, as shown by item 110.

Application software running on MS A detects that there is a call in progress between MS A and UA Telephone and notifies server system 100 of call party details for the call, in step 26a. The call party details of step 26a may comprise a TDN associated with MS A and a TDN associated with service provider system 400.

ACD 404 notifies data communications part 406 that a call is in progress between UA Telephone and MS A. Data communications part 406 notifies server system 100 of call party details for the call, in step 26b. The call party details of step 26b may comprise a TDN associated with MS A and a TDN associated with service provider system 400. The call party details of step 26b may also comprise an extension number associated with UA Telephone.

Server system 100 establishes a separate communications session, separate from the telephone call between MS A and UA Telephone, for the transfer of data between MS A and data communications part 406, as shown by item 111. The session is established on the basis of the one or more call party details associated with the telephone call. Data communications part 406 forwards data received via the separate communication session to the computing device associated with the user agent operator of UA telephone and vice versa as and when necessary.

Upon establishment of the separate communications session, server system 100 sends a request for configuration data determined by the service provider to data store 102 in step 26c, resulting in configuration data determined by the service provider being retrieved in step 26d. Server system 100 transmits the retrieved configuration data to MS A via the separate communication session in step 26e.

When MS A receives the configuration data of step 26e, it reconfigures at least a first part of its graphical user interface according to the received configuration data, as shown by step 26f.

MS A confirms to server system 100 that it has reconfigured at least a first part of its graphical user interface according to the received configuration data in step 26g and server system 100 in turn notifies data communications part 406 of such in step 26h. Data communications part 406 notifies the appropriate user agent computing device of the reconfiguration such that the user agent operator conducting the telephone call with the user of MS A knows that the graphical user interface of MS A has been reconfigured according to the configuration data. The user agent operator can thus conduct the call accordingly, for example referring to information displayed via the reconfigured graphical user interface during the call.

In the above embodiments of the invention, the configuration data has been predetermined by the service provider prior to the call and provided to server system 100 for storage in data store 102. Server system 100 is thus able to retrieve the predetermined configuration data from data store 102 upon establishment of the separate communications session without having to contact service provider system 400.

Figure 27:
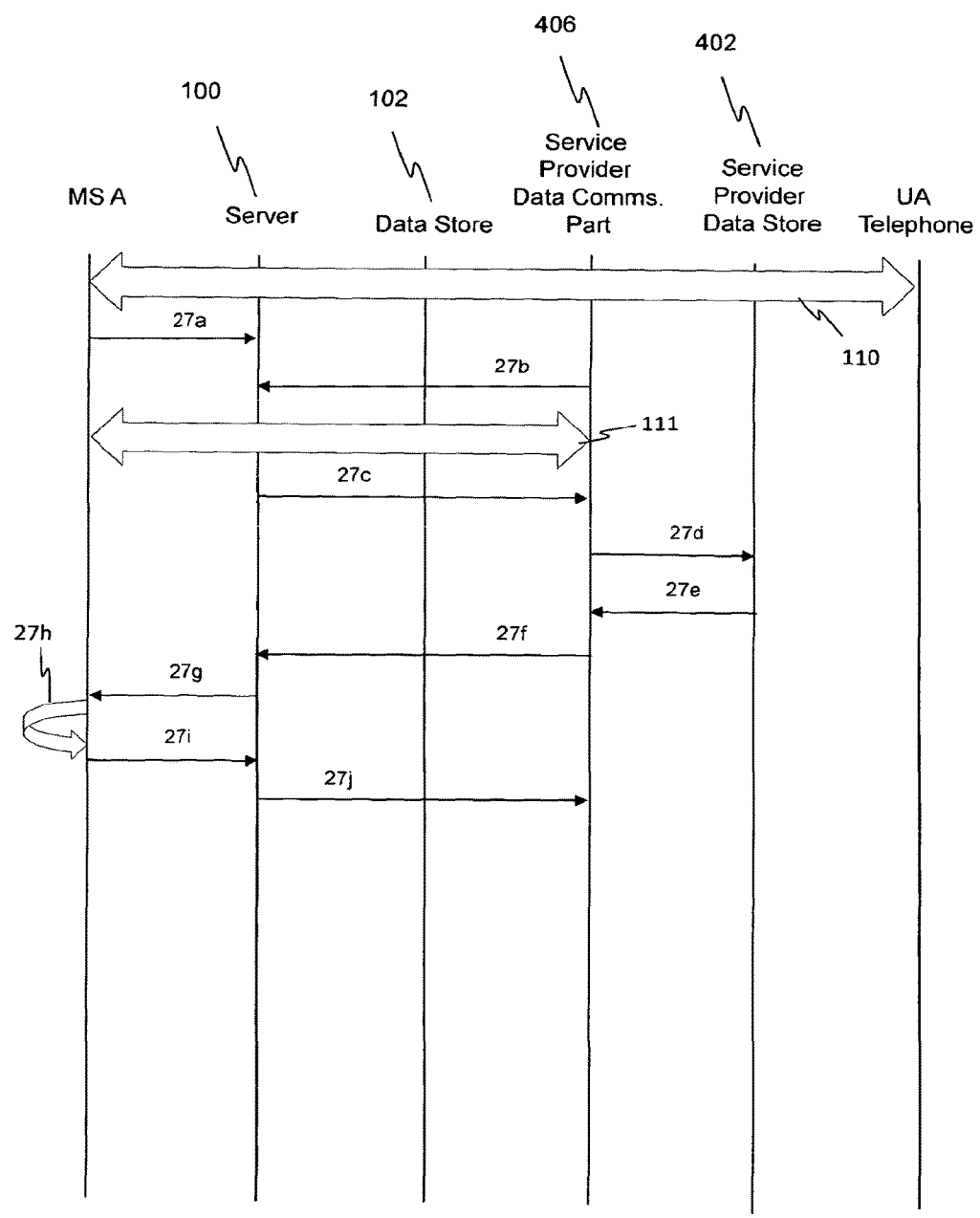
FIG. 27 is a flow diagram depicting operation of one or more embodiments of the invention using the system of FIG. 25.

FIG. 27 is a flow diagram depicting operation of embodiments of the invention using the system of FIG. 25.

In these embodiments of the invention, the configuration data has been predetermined by the service provider prior to the call, but has not been provided to server system 100. Instead, the predetermined configuration is stored in service provider data store 402.

Similarly to the embodiments of FIG. 26, a call is currently in progress between MS A and UA Telephone, as shown by item 110, MS A notifies server system 100 of the call in progress in step 27a, data communications part 406 notifies server system 100 of the call in progress in step 27b, and a separate communication session is established between MS A and data communications part 406 as shown by item 111.

In these embodiments, upon establishment of the separate communications session, server system 100 sends a request for configuration data determined by the service provider (for transmittal to MS A) to data communications part 406 in step 27c. Data communications part 406 forwards the configuration data request to service provider data store 402 in step 27d. This results in configuration data determined by the service provider being retrieved by data communications part 406 in step 27e which forwards the retrieved configuration data to server system 100 in step 27f.

Server system 100 transmits the retrieved configuration data to MS A via the separate communication session in step 27g. When MS A receives the configuration data of step 27g, it reconfigures at least a first part of its graphical user interface according to the received configuration data, as shown by step 27h. MS A confirms to server system 100 that it has reconfigured the at least first part of its graphical user interface according to the received configuration data in step 27i and server system 100 in turn notifies data communications part 406 of such in step 27j.

Figure 28:
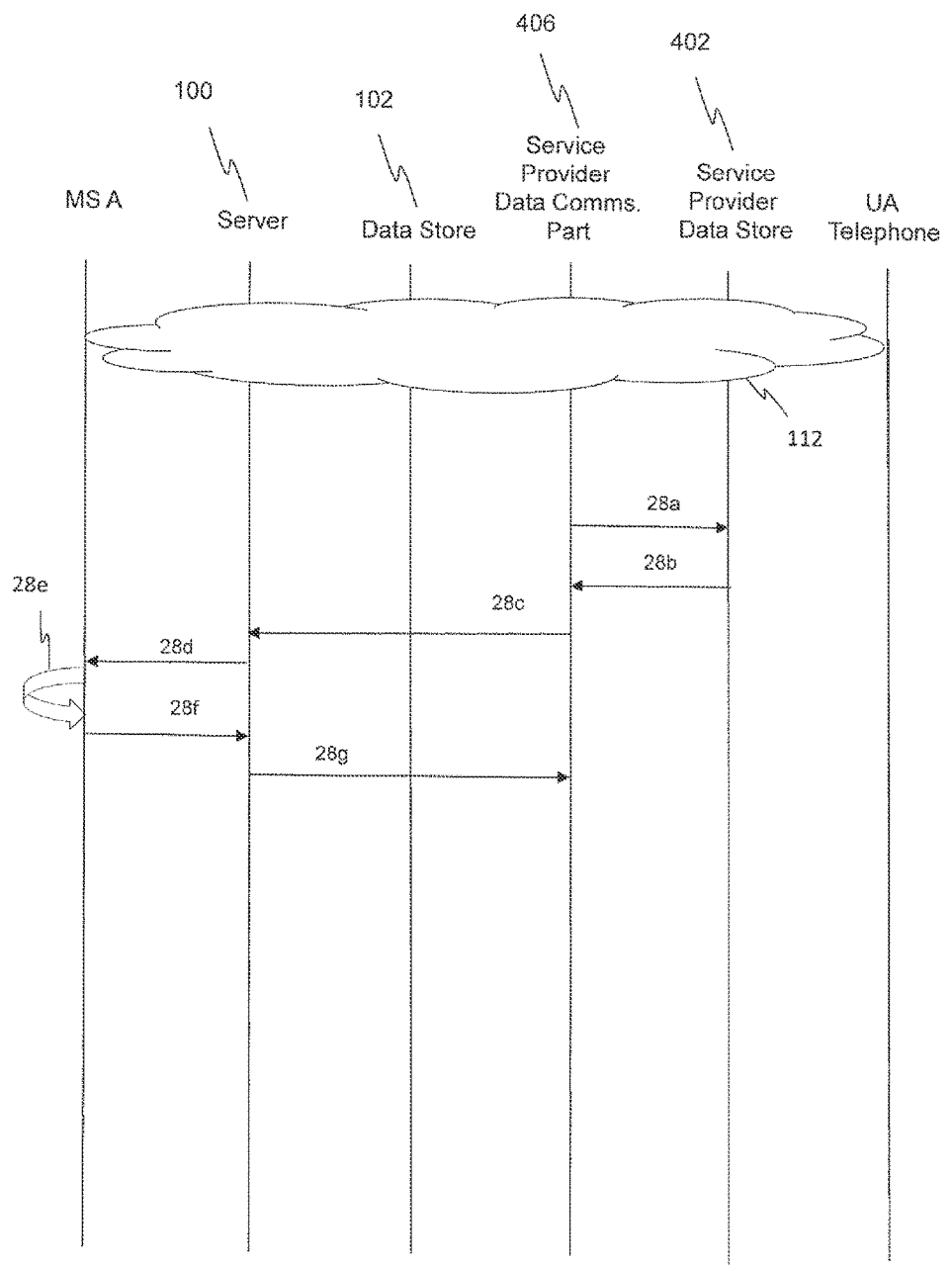
FIG. 28 is a flow diagram depicting operation of one or more embodiments of the invention using the system of FIG. 25.

FIG. 28 is a flow diagram depicting operation of embodiments of the invention using the system of FIG. 25. These embodiments depict processes carried out either after those described above in relation to FIG. 26 or after those described above in relation to FIG. 27.

Item 112 of FIG. 28 indicates one or more steps involving interaction between MS A, server system 100 and/or service provider computing device 406 during the call between the user of MS A and the user agent operator associated with UA Telephone. Some examples of such interaction are described later below.

During the call, the user agent operator associated with service provider computing device 406 realizes that further reconfiguration of the graphical user interface of MS A during the call, i.e. dynamic reconfiguration, is desirable and proceeds to initiate dynamic reconfiguration accordingly. This involves the user agent operator providing user input to their agent position computing device, for example selecting an appropriate action from an on-screen menu on a display part of the agent position computing device.

The user input is passed to data communications part 406 which sends a request for appropriate dynamic configuration data to service provider data store 402 accordingly in step 28a. The configuration data is dynamic because it is related to a reconfiguration process occurring during the call.

Dynamic configuration data is retrieved by data communications part 406 in step 28b which transmits the retrieved dynamic configuration data on to server system 100 via the separate communication session in step 28c.

Server system 100 transmits the dynamic configuration data received in step 28c to MS A via the separate communication session in step 28d. When MS A receives the dynamic configuration data of step 28d, it reconfigures at least a second part of its graphical user interface according to the received dynamic configuration data, as shown by step 28e. MS A confirms to server system 100 that it has reconfigured the at least second part of its graphical user interface according to the received configuration data in step 28f and server system 100 in turn notifies data communications part 406 of such in step 28g.

The user agent operator conducting the telephone call with the user of MS A now knows that the graphical user interface of MS A has been reconfigured according to the dynamic configuration data. The user agent operator can thus conduct the call accordingly, for example referring to information displayed via the dynamically reconfigured graphical user interface during the call.

Figure 29:
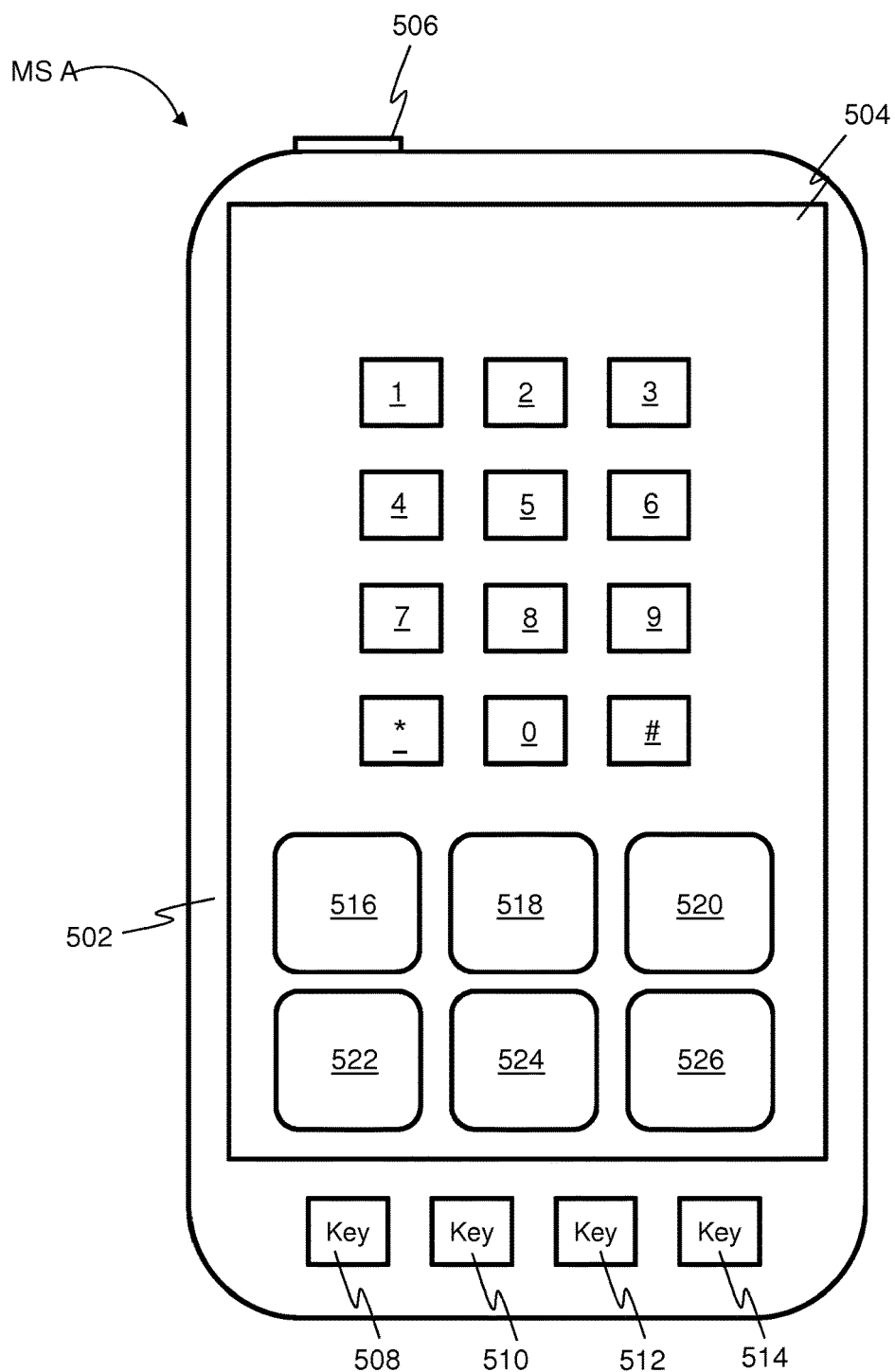
FIG. 29 shows a front view of a mobile telephony device according to one or more embodiments of the present invention.

FIG. 29 shows a front view of a mobile telephony device MS A according to embodiments of the present invention. In FIG. 29, MS A comprises an exemplary mobile telephony device, although the invention may equally be applied to a non-mobile computing device and/or other computing device with telephony capabilities. MS A can comprise a variety of different hand-held devices, for example a smartphone, Personal Digital Assistant (PDA) or Personal Pocket Computer (PCC). MS A comprises memory storage and one or more processors (not shown) for data processing purposes including implementation of an operating system, for example an Android™, Symbian™, Blackberry™ or Windows Phone™ operating system. The operating system provides a platform for execution of application software (or 'applications' or 'apps') for allowing a user to perform different tasks on MS A. The application software may be installed during manufacture or may be downloaded and installed by a user of MS A.

MS A comprises a body 502, hard-wired input keys 508, 510, 512, 514 and a power on/off button 506. MS A comprises a touch-screen user interface 504 which is operable to output a graphics display and receive input via user touches on the interface. Hard-wired input keys 508, 510, 512, 514 may be operable to execute common operations such as 'Open menu', 'Go to home screen', 'Go back to last screen', etc. Alternatively, one or more hard-wired input keys 508, 510, 512, 514 may be implemented as soft keys on touch-screen 504.

MS A supports a variety of different communication methods including telephony functionality enabling a user to conduct incoming and outgoing telephone calls with one or more remote users in a telecommunications network (not shown). MS A comprises a number of components (not shown) which are known in the art, the operation of which is not described here in detail, including one or more radio frequency transceiver(s) and aerial(s), a speech coder/decoder connected to a loudspeaker and a microphone, and, in some embodiments, a removable Subscriber Identity Module (SIM) connected via electrical contacts.

MS A includes data transfer capabilities, including data packet input/output via a data input-output interface with one or more Internet Protocol (IP) parts of the telecommunications network. MS A may include messaging functionality, for example Short Message Service (SMS) and Multimedia Messaging Service (MMS) messaging.

In these embodiments, the user of MS A is currently conducting a call with a user agent operator of service provider system 400 as described above in relation to FIGS. 25 to 28. An in-call screen application is thus configured to display an in-call screen on touch-screen user interface 504. The in-call screen displayed on touch-screen user interface 104 includes a number of soft-keys which are responsive to user touches to provide input to the in-call screen application running on mobile telephony device 100. The soft-keys include dial-pad digits 1, 2, . . . to 0 and the * ('star') and # ('hash') symbols which are used for entering telephone dialing numbers. The soft-keys also include several other soft-keys 516, 518, 520, 522, 524, 526 which are operable to initiate other in-call functionality in response to user input, for example end-call, call-hold, mute, speaker-phone, and show/hide dial-pad operations.

Figure 30:
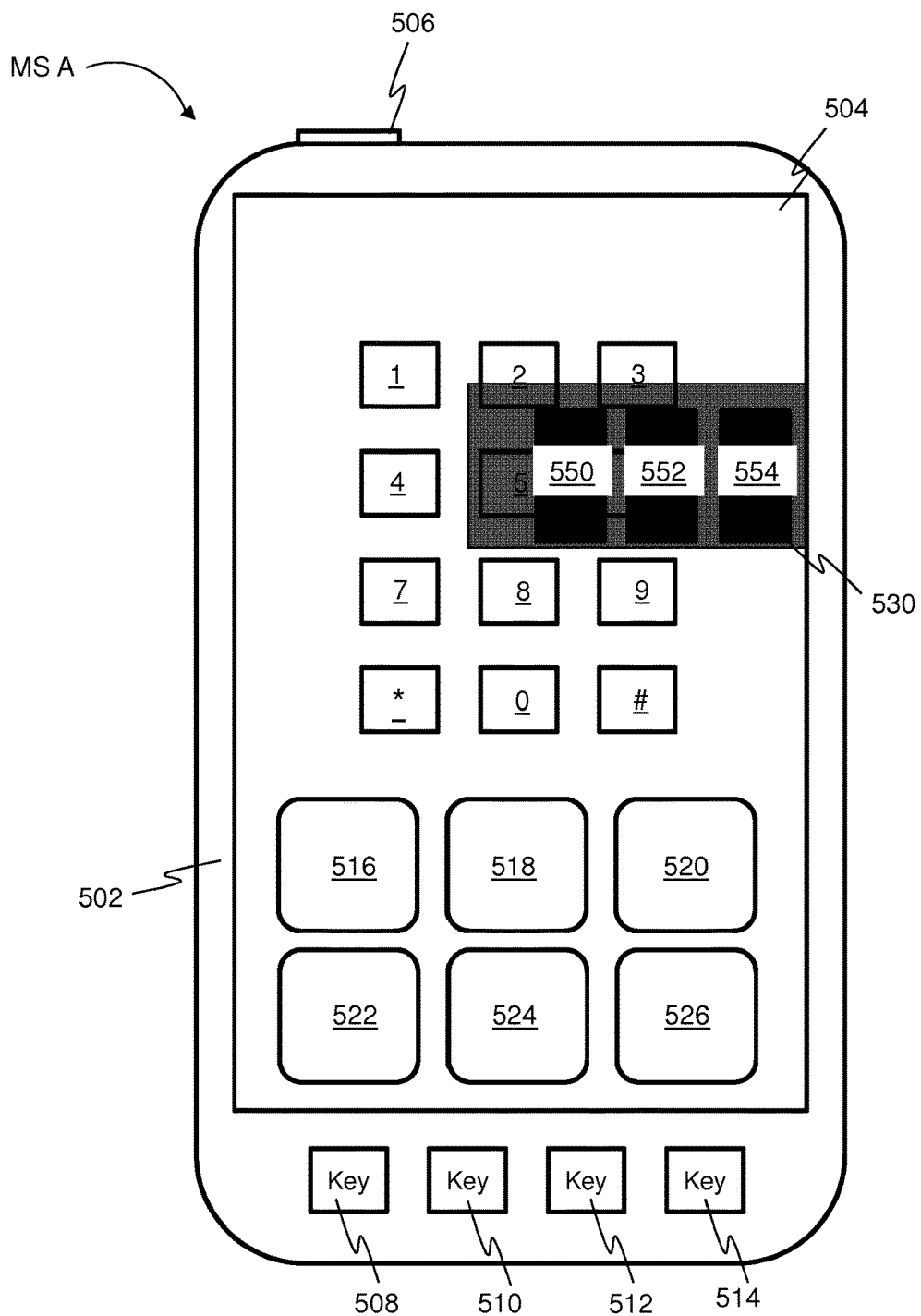
FIG. 30 shows a front view of a mobile telephony device according to one or more embodiments of the present invention.

FIG. 30 shows a front view of MS A according to embodiments of the present invention. In these embodiments, the user of MS A is currently conducting a call with a user agent operator of service provider system 400 as described above in relation to item 110 of FIG. 26 or 27. Similarly, a separate communications session has been established between MS A and service provider data communications part 406 as per item 111 of FIG. 26 or 27.

In these embodiments, configuration data determined by the service provider prior to the call has been received by MS A via the separate communication session, as per steps 26c to 26e of FIG. 26 or steps 27c to 27g of FIG. 27. MS A reconfigures at least a first part of its touch-screen user interface 504 according to the received predetermined configuration data, as depicted by step 26f of FIG. 26 or step 27h of FIG. 27.

In these embodiments, the reconfiguration results in an overlay portion being displayed over the at least first part of the screen as shown by item 530 in FIG. 30. In these embodiments, overlay portion 530 comprises a translucent layer such that the portion of the screen below overlay portion 530 is visible through overlay portion 530. In this case, the soft-keys for digits '5' and '6' on the dial-pad part of the in-call screen can be seen through translucent overlay portion 530.

In these embodiments, overlay portion 530 comprises several touch-sensitive screen regions 550, 552, 554 which are operable to initiate one or more operations of MS A independently of the in-call screen application in response to user input via touch-sensitive screen regions 550, 552, 554. This means that user input via any of touch-sensitive screen regions 550, 552, 554 will be passed to other application software of MS A rather than to the in-call screen application displaying the in-call screen below the overlay portion, e.g. pressing touch-sensitive screen region 550 will not provide a user input of the dial-pad digits '5' or '6' to the in-call screen application, but rather will be passed to other application software of MS A for processing.

Figure 31:
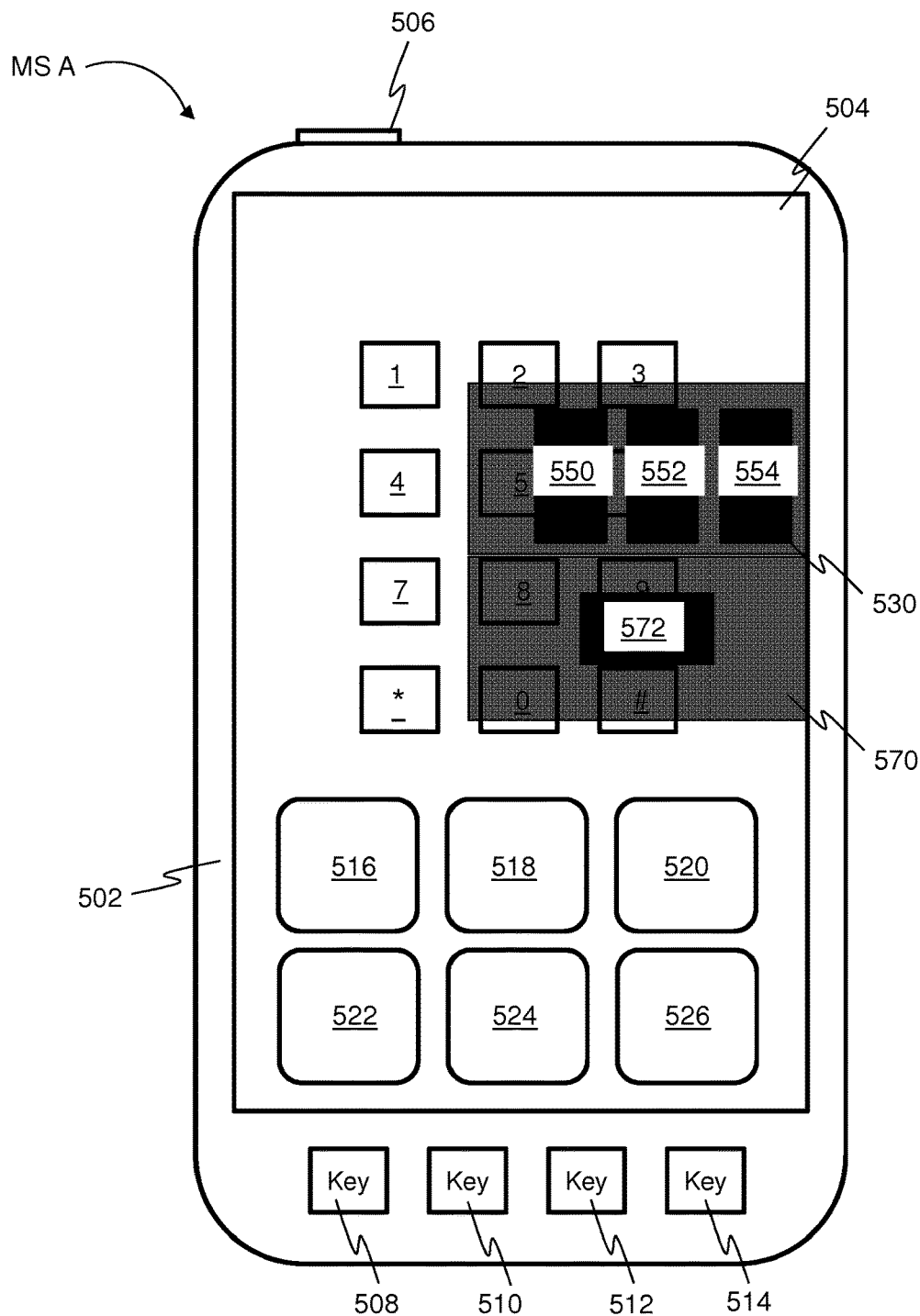
FIG. 31 shows a front view of a mobile telephony device according to embodiments of the present invention.

FIG. 31 shows a front view of MS A according to embodiments of the present invention. In these embodiments, the user of MS A is currently conducting the same call with the user agent operator of service provider system 400 as described above in relation to FIG. 30. Similarly, the separate communications session established between MS A and service provider data communications part 406 is in place.

In these embodiments, dynamic configuration data has been received by MS A via the separate communication session, as per steps 28a to 28d of FIG. 28. MS A reconfigures at least a second part of its touch-screen user interface 504 according to the received dynamic configuration data, as depicted by step 26f of FIG. 26 or step 27h of FIG. 27.

In these embodiments, the reconfiguration results in a further overlay portion being displayed over the at least second part of the screen as shown by item 570 in FIG. 31. In these embodiments, overlay portion 570 comprises a translucent layer such that the portion of the screen below overlay portion 570 is visible through overlay portion 570. In this case, the soft-keys for digits '8' and '9' on the dial-pad part of the in-call screen can be seen through translucent overlay portion 570.

In these embodiments, overlay portion 570 comprises a further touch-sensitive screen region 572 which is operable to initiate one or more operations of MS A independently of the in-call screen application in response to user input via touch-sensitive screen region 572. This means that user input via touch-sensitive screen region 572 will be passed to other application software of MS A rather than to the in-call screen application displaying the in-call screen below the overlay portion, e.g. pressing touch-sensitive screen region 572 will not provide a user input of the dial-pad digit '9' to the in-call screen application, but rather will be passed to other application software of MS A for processing.

In embodiments of the invention, touch-screen user interface 504 will be reconfigured to display touch-sensitive screen regions 550, 552, 554 upon establishment of the separate communication session. However, touch-screen user interface 504 may not be reconfigured to display touch-sensitive screen region 572 until sometime later during the call between the user of MS A and the user agent operator of service provider system 400.

To help draw the attention of the user of MS A to the fact that reconfiguration of touch-screen user interface 504 to display touch-sensitive screen region 572 has occurred, the at least first part 530 of touch-screen user interface 504 can display touch-sensitive screen regions 550, 552, 554 in a first display mode and the at least second part 570 of touch-screen user interface can display touch-sensitive screen region 572 in a second display mode. The different display modes allow a user of MS A to more easily distinguish between the different touch-sensitive screen regions.

The second display mode could involve displaying touch-sensitive screen region 572 as a flashing icon, whereas the first display mode could involve displaying touch-sensitive screen regions 550, 552, 554 as non-flashing icons. Alternatively, the second display mode could involve displaying touch-sensitive screen region 572 as a wobbling icon, whereas the first display mode could involve displaying touch-sensitive screen regions 550, 552, 554 as still icons.

In the embodiments of the invention described above in relation to FIGS. 29 to 31, predetermined configuration data is transmitted to MS A in order to reconfigure at least a first part of its touch-screen user interface. The reconfiguration results in one or more touch-sensitive screen regions being added to the screen in the form of a number of icons or 'buttons'. The user of MS A can touch the on-screen icons in order to initiate a variety of tasks associated with the service being provided by the service provider. The icons thus function as items of a menu from which the user of MS A can select actions of their choosing.

These embodiments of the invention also involve dynamic configuration data being generated and transmitted to MS A in order to reconfigure at least a second part of its touch-screen user interface such that one or more additional touch-sensitive screen regions are added to the screen in the form of a number of additional icons or 'buttons'. The additional icons thus function as additional items in the menu. The invention therefore provides processes by which the list of menu items can be expanded or otherwise modified. The invention therefore allows dynamic updating of the menu according to events which occur during the call between the user of MS A and the user agent operator of the service provider.

In the embodiments of the invention described above in relation to FIGS. 25 to 31, configuration data can include positional data defining one or more positions or locations within touch-screen user interface 504 at which the touch-sensitive screen regions should be configured. The configuration data can also include image data relating to the appearance of an icon, for example an icon containing a logo associated with the service provider and text data helping clarify what function(s) the icon is associated with.

In the embodiments of the invention described above in relation to FIGS. 26 and 27, data communications part 406 notifies the call to UA Telephone in steps 26*b* and 27*b* respectively. In alternative embodiments of the invention, the call may instead be notified to server system 100 by one or more network entities located in PSTN B in a similar manner to the notification processes described above for network element 108 and SCP 150.

Embodiments of the invention involve a service provider system 400 capable of establishing a communications session for communication of data with respect to at least a first telephony user device MS A in a data communications network, the system comprising:

a service management part 408 adapted to manage service data for the service provider;

a service data store 402 adapted to store the service data;

a telephony part 'UA Telephone' adapted to conduct a telephone call with a customer of the service provider via the at least first telephony user device MS A; and a data communications part 406 adapted to:

establish a separate communications session, separate from the telephone call, for the transfer of data to/from the first telephony user device, on the basis of one or more call party details associated with the telephone call; and retrieve service data from the service data store and transmit data including or derived from the retrieved service data via the session.

The retrieved service data may be retrieved from data store 402 and data including or derived from the retrieved service data transmitted by the data communications part in response to establishment of the session.

The data communications part may retrieve and transmit the data including or derived from the service data in response to data input via a user agent computing device part associated with the user agent operator conducting the call with the user of MS A.

In embodiments of the invention data communications part 406 may modify the retrieved service data from the service data store before transmittal via the session. The modification could be carried out on the basis of data input via the user agent computing device part. Alternatively, or in addition, the modification could be carried out on the basis of data received via the session, for example data received from MS A and/or server system 100.

The data including or derived from the retrieved service data could be transmitted to MS A in the form of predetermined configuration data via the separate communication session as described above in relation to FIGS. 26 and 27.

The data including or derived from the retrieved service data could be transmitted to MS A in the form of dynamic configuration data via the separate communication session as described above in relation to FIG. 28.

Some exemplary applications of the embodiments of the invention described above in relation to FIGS. 25 to 31 are now given. The exemplary applications involve a call between a user of MS A and a user agent operator in a service provider system. A separate communications session is established between MS A, data communications part 406 and a user agent computing device associated with the user agent operator. The exemplary applications also include some exemplary interactions as per item 112 depicted in FIG. 28.

In a first exemplary application, the service provider is providing a taxi service and the service provider system has received a call from the user of MS A which is distributed to a user agent telephony device associated with the user agent operator accordingly. In such embodiments, the service provider will typically want to obtain some information on the physical location of MS A such that the service provider knows where to send a taxi to meet the user of MS A. In such an embodiment, the service provider has predetermined configuration data which, upon establishment of the separate communication session, is transmitted to MS A. The predetermined configuration data instructs MS A to reconfigure its touch-screen user interface with a touch-sensitive screen region in an at least first part of the screen.

The touch-sensitive screen region is operable to initiate generation of geographical location data associated with the physical location of MS A and transmit data including or derived from the generated geographical location data via the separate communication session. The touch-sensitive screen region could for example comprise an icon labelled 'Send location'.

During the call, the user agent operator can thus ask the user of MS A to press the 'Send location' icon which results in the physical location of MS A being generated and transmitted from MS A to data communications part 406. The invention thus provides a convenient way for the service provider to obtain the location of the user of MS A without having to ask the user for address information verbally over the telephone and also avoids the user agent operator from having to enter in such information into the service provider system via a user agent computing device.

Once the location data is received at the user agent computing device, the user agent operator can process a taxi-booking for the user of MS A based on the received location data. The user agent operator may request retrieval of appropriate service data from service provider data store 402 by appropriate input via the agent position computing device. In this case, the retrieved service data could comprise service data including a taxi number for the booking and also service data associated with a live Estimated Time of Arrival (ETA) service for the booked taxi.

The retrieved service data is then modified on the basis of the location data received from MS A and transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate navigation via a browser application to a network address (such as an IP address or URL) associated with provision of the live ETA service, for example a network address of data communications part 406. The further touch-sensitive screen region could for example comprise an icon labelled 'Press for Live taxi ETA service'.

During the call, the user agent operator can thus ask the user of MS A to press the 'Press for Live taxi ETA service' icon which results in a browser application on MS A opening a webpage displaying information on a live ETA for their booked taxi.

In a second exemplary application, the service provider is providing a restaurant table booking service and the service provider system has received a call from the user of MS A which is distributed to a telephony user device associated with a user agent operator accordingly. In such embodiments, the service provider will typically want to obtain contacts details for the user of MS A, for example in order to know which name to book the table under and/or an email address to send a table booking confirmation email to.

In these embodiments, the service provider has predetermined configuration data which, upon establishment of the separate communication session, is transmitted to MS A. The predetermined configuration data instructs MS A to reconfigure its touch-screen user interface with a touch-sensitive screen region in an at least first part of the screen.

The touch-sensitive screen region is operable to initiate transmittal of contact data associated with a user of MS A via said session, for example by obtaining such details from address book application data stored on MS A. The touch-sensitive screen region could for example comprise an icon labelled 'Send contact details' or 'Send vCard'.

During the call, the user agent operator can thus ask the user of MS A to press the 'Send contact details' icon which results in contact details for the user of MS A being transmitted from MS A to data communications part 406. The invention thus provides a convenient way for the service provider to obtain the contact details of the user of MS A without having to ask the user for the contact details verbally over the telephone and also avoids the user agent operator from having to enter in such information into the service provider system via a user agent computing device.

Once the contact details for the user of MA A are received at the user agent computing device, the user agent operator can process a table booking for the user of MS A based on the received contact details. The user agent operator may initiate retrieval of appropriate service data from service provider data store 402. In this case, the retrieved service data could comprise service data relating to a representation of available tables in the restaurant at which the user of MS A wishes to book a table.

The retrieved service data can then be transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate navigation via a browser application to a network address associated with provision of a table choosing service, for example a network address of data communications part 406. The further touch-sensitive screen region could for example comprise an icon labelled 'Press to choose your table'.

During the call, the user agent operator can thus ask the user of MS A to press the 'Press to choose table' icon which results in a browser application on MS A opening a webpage which allows the user of MS A to see the layout of the restaurant and select a table of their choosing.

Service providers responsible for processing emergency calls could employ a combination of the above two exemplary applications of the invention in order to reconfigure a part of the touch-screen user interface which is operable to initiate transmittal of both geographical location data associated with the physical location of MS A and contact details such as name, national insurance number etc., to data communications part 406. Allowing a user to transmit their location and contact details to the emergency call processing service provider at the click of one icon could save valuable time associated with an ambulance or fire engine reaching the location of an accident or fire.

Customers of a breakdown recovery service provider could similarly benefit from such functionality.

In a third exemplary application, the service provider is providing a ticket purchasing service, for example music concert or cinema tickets, and the service provider system has received a call from the user of MS A which is distributed to a telephony user device associated with a user agent operator accordingly. In such embodiments, the service provider will typically want to obtain contact details of the user of MS A and a payment for the tickets from the user of MS. In such an embodiment, the service provider has predetermined configuration data which, upon establishment of the separate communication session, is transmitted to MS A. The predetermined configuration data instructs MS A to reconfigure its touch-screen user interface with one or more touch-sensitive screen regions in an at least first part of the screen.

One touch-sensitive screen region could comprise an icon labelled Pay for tickets'. The touch-sensitive screen region is operable to initiate processing of a transaction from an account associated with a user of said first telephony user device via said session. The region may extract payment details from a data store of MS A and contact a secure payment server in packet network 106 at which the appropriate funds can be deducted from the user's credit card or PayPal™ account or suchlike.

Another touch-sensitive screen region could comprise an icon labelled 'Send contact details', the functioning of which has been described above.

During the call, the user agent operator can thus ask the user of MS A to press the Pay for tickets' which results in a payment for the tickets being processed and notified to data communications part 406 and press the 'Send contact details' which results in contact details for the user of MS A being transmitted from MS A to data communications part 406. Alternatively, a single icon could be configured to provide both functions.

The invention thus provides a convenient way for the service provider to obtain the payment and contact details from the user of MS A without having to verbally ask the user for such over the telephone and also avoids the user agent operator from having to enter in such information into the service provider system via a user agent computing device.

Once the payment has been processed, confirmation of such is notified at the user agent computing device, and the user agent operator can process posting of the tickets to the user of MS A using an address contained in the received contact details.

The user agent operator may initiate retrieval of appropriate service data from service provider data store 402. In this case, the retrieved service data could comprise service data relating to the electronic tickets for the ticket purchase.

The retrieved service data can then be modified on the basis of the contact detail data, for example an email address, received from MS A and transmitted as dynamic configuration data to MS A via the separate communication session. Upon receipt of the dynamic configuration data at MS A, the touch-screen user interface of MS A can be reconfigured accordingly. The reconfiguration may involve configuration of a further touch-sensitive screen region in an at least second part of the screen.

The further touch-sensitive screen region could be operable to initiate emailing of electronic tickets to an email address contained in the contact details received via the session. The further touch-sensitive screen region could for example comprise an icon labelled 'Press to be emailed tickets'.

The further touch-sensitive screen region could be operable to initiate transmittal via an SMS message of electronic tickets to a phone number contained in the contact details received via the session. The further touch-sensitive screen region could for example comprise an icon labelled 'Press to receive tickets by SMS'.

The service provider associated with the above described third exemplary application, could also benefit from seat choosing functionality which allows a customer to select which seats in the appropriate event venue they would like. The seat choosing functionality could function in a similar manner as described above in relation to the second exemplary application via transmittal of dynamic configuration data to MS A. Alternatively, the seat choosing functionality could be configured via transmittal of predetermined configuration data to MS A.

In a fourth exemplary application, the service provider is a retail vendor selling one or more products or services. In such an application, an image of a product the user of MS A is considering purchasing can be transmitted to MS A and displayed on the screen of MS A. Dynamic configuration data can be generated by data communications part 406 and transmitted to MS A in order to reconfigure the touch-screen user interface of MS A to display a touch-sensitive screen region related to the purchase of the product in an at least second part of the screen. The further touch-sensitive screen region could for example comprise an icon labelled 'Buy me' which can be configured to be embedded into the displayed image of the product.

In a fifth exemplary application, the service provider is a retail vendor selling one or more spare part products. The user of MS A transmits an image of a broken spare part which needs replacing to data communications part 406 via the separate communications session. MS A thus requests dynamic configuration data from data communications part 406.

The service provider can then select an appropriate part and generate dynamic configuration data to transmit to MS A to reconfigure its touch-screen user interface to display a 'Buy me' icon or suchlike. The dynamic configuration data may include an image of the spare part which the service provider is proposing that the user of MS A purchases, allowing the user of MS A to confirm visually that the spare part is the correct spare part.

In a sixth exemplary application, when a user of MS A calls service provider system 400, instead of the call being distributed by ACD 404 to an available user agent operator, the user of MS A is directed to an IVR system with the aim of connecting the user to a suitable user agent operator. Such an Interactive Voice Response (IVR) system could prompt the user of MS A to navigate through a menu system using a series of digit key presses on the dialpad, for example "press '1' for technical support, press '2' for billing, etc." with the user having to wait and listen for each of the options for each stage of the menu system. Such IVR systems can be cumbersome and slow to use, so the dynamic reconfiguration functionality of the invention can be employed to allow the user to be redirected to a web-based alternative.

In this exemplary application, dynamic configuration data can be generated by data communications part 406 and transmitted to MS A in order to reconfigure the touch-screen user interface of MS A to display a touch-sensitive screen region related to redirection to a web alternative for an IVR in an at least second part of the screen. The touch-sensitive screen region could for example comprise an icon labelled 'Go to website alternative of IVR' icon. The icon is configured, upon user touch input on the icon, to initiate navigation via a browser application to a network address in the data communications network. The network address in this case directs the user to a web-based alternative to the standard voice-based IVR system. The web-based alternative allows a user to read the various options for each stage of the menu system on-screen and press digits accordingly. Navigation of the menu system according to the invention will tend to be quicker than the user having to wait and listen for each of the options for each stage of a standard voice-based IVR menu system.

Embodiments of the invention involve multi-party conference calls between more than two user telephony devices. In such embodiments, a separate communication session is established between the more than two telephony devices and/or associated computing devices for the communication of data between devices associated with all parties of the conference call. Such embodiments can be implemented by allocation of a conference identifier to a multiparty call, for example by server system 100. The conference identifier along with a conference call telephone dialing number can be circulated around the multiple call parties.

In some embodiments of the invention, server system 100 includes conference call hosting functionality, in which case, the conference call telephone dialing number may comprise a telephone dialing number associated with a conference call hosting module within server system 100. Alternatively, the conference call telephone dialing number may comprise a telephone dialing number associated with a dedicated conference call hosting entity within packet network 106.

Each conference call party will dial the conference call telephone dialing number and enter the conference identifier. The parties will thus be able to conduct a teleconference voice-call.

A separate communication session is then established between the user device of each party to the conference call and server system 100. Each user device will connect to server system 100 using a client-server connection request/response procedure. Each user will then enter in the conference identifier which allows server system 100 to disambiguate which conference a device should be connected to. Once each device has established a separate communication session with server system 100, any party to the conference call is able to transmit or receive data with any other party to the conference call. Data transmitted from one user device will pass to server system 100 and can be replicated and distributed to other user devices party to the conference call accordingly by server system 100. Server system 100 may employ multicast techniques, such as IP multicast, to efficiently transfer data to multiple devices.

Voicemail is a useful tool that allows people calling a busy or otherwise unavailable telephone number to leave a message for the called party that they will be able to collect later. However, many callers would prefer to send a message such as a text message rather than leave a voicemail, because a text message is easier and quicker to receive, and it is less disruptive to read a text message than to call a voicemail service and pick up a call. Accordingly, when diverted to a voicemail service, many people hang up the phone and send a text message instead.

Embodiments of the invention described below in relation to FIGS. 32 to 35 provide convenient methods by which a calling party who is trying to speak to a user of a called party device is given the option to send a message to the called party as an alternative to leaving a voicemail for the called party. Other embodiments of the invention described below in relation to FIGS. 32 to 35 provide convenient methods by which a calling party who is trying to speak to a user of a called party device is given the option to send media data such as one or more files for subsequent retrieval by the called party as an alternative to leaving a voicemail for the called party.

Figure 32:
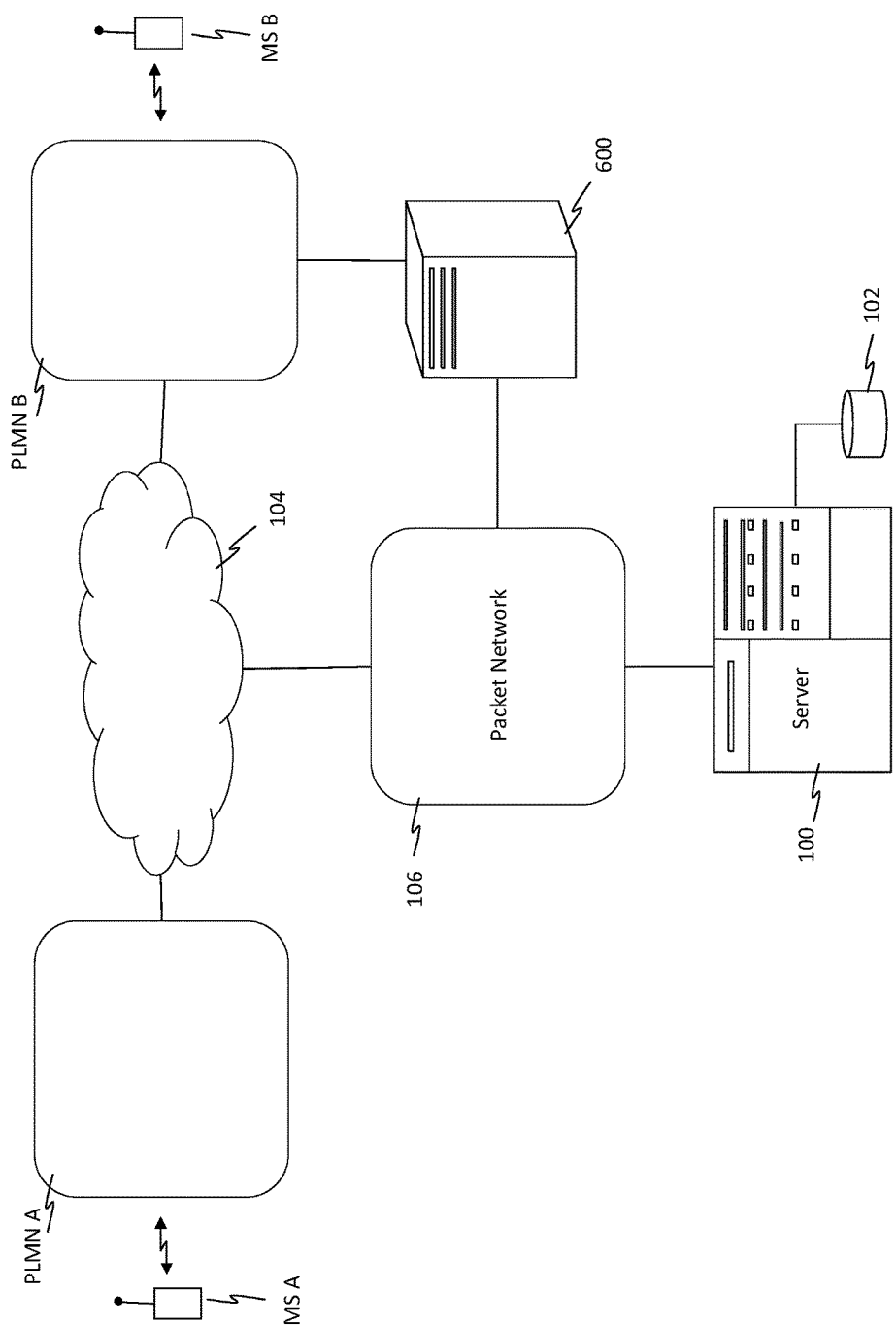
FIG. 32 is a system diagram according to one or more embodiments of the invention.

FIG. 32 is a system diagram according to embodiments of the invention. FIG. 32 includes some entities similarly depicted and labelled to FIG. 1, with such entities functioning in a similar manner. In addition, the system of FIG. 32 includes an automated system 600 connected to packet network 106 and/or PLMN B.

Automated system 600 could for example comprise a voicemail system.

Figure 33:
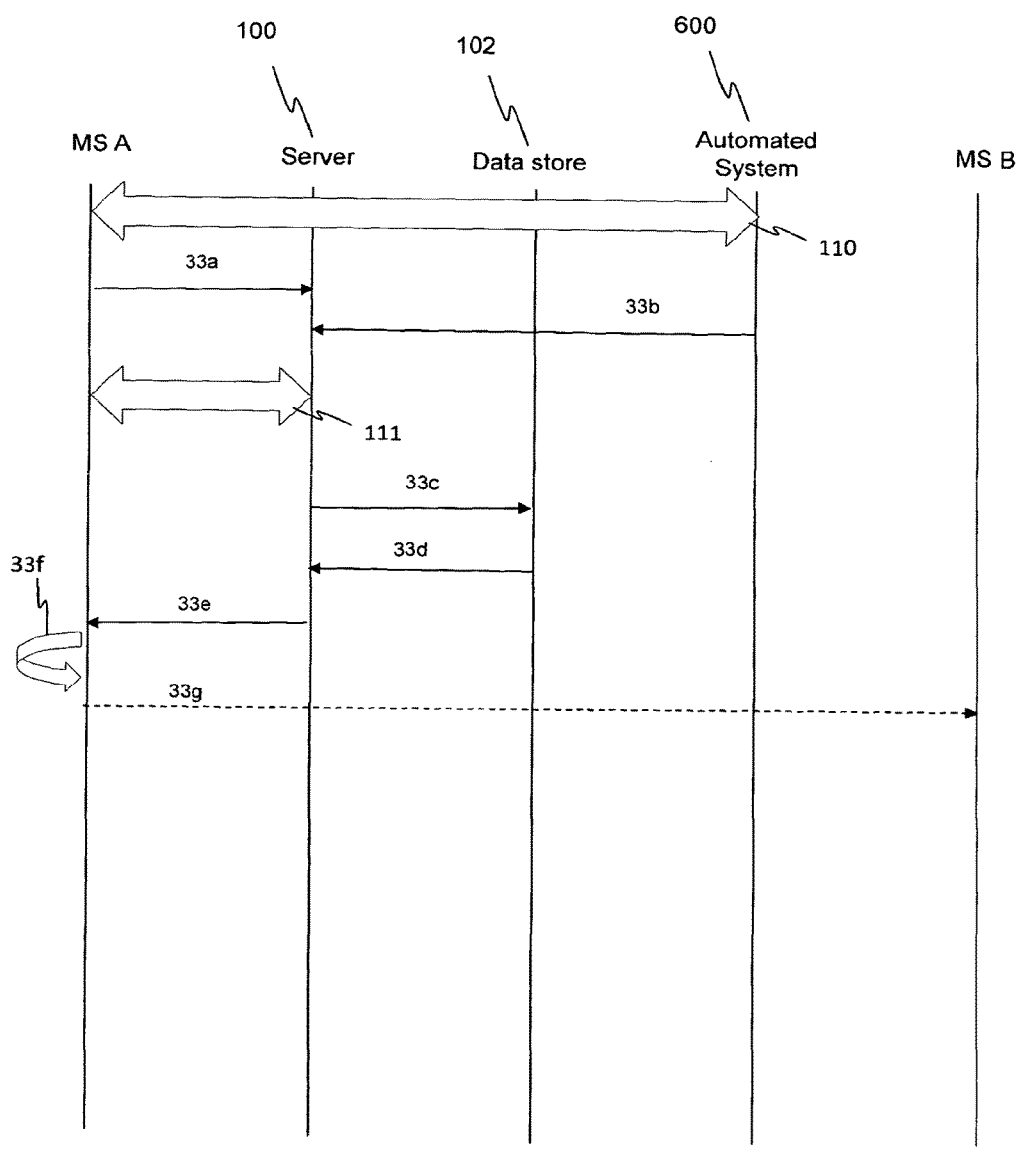
FIG. 33 is a flow diagram depicting operation of one or more embodiments of the invention using the system of FIG. 32.

FIG. 33 is a flow diagram depicting operation of embodiments of the invention using the system of FIG. 32. In these embodiments, MS A comprises a reconfigurable graphical user interface.

The user of MS A attempts to call MS B, but the call attempt is unsuccessful. The call attempt might have failed for a number of reasons, for example the user of MS B did not want to or could not answer the call, MS B is currently switched off, etc. The call is therefore redirected to an automated system 600 and a call between MS A and automated system 600 is established, as shown by item 110.

A voice call is currently in progress between MS A and automated system 600, as shown by item 110.

Under normal circumstances, automated system 600 may play an audio message such "Bob cannot take your call right now, please leave a message after the tone". The user of MS A may not want to leave a voicemail message, so might hang up. However, according to embodiments of the invention, the user of MS A is given one or more options other than leaving a voicemail message.

Application software running on MS A detects that there is a call in progress between MS A and automated system 600 and notifies server system 100 of call party details for the call, in step 33*a*.

The call party details may comprise a TDN A associated with MS A and TDN B associated with MS B. The call party details may comprise an identifier associated with automated system 600.

Automated system 600 detects the call in progress between itself and MS A and notifies server system 100 of call party details for the call, in step 33*b*.

Server system 100 identifies that the notification of step 33*a* from MS A and notification of step 33*b* from automated system 600 have call party details in common and establishes a separate communications session, separate from the telephone call, for the communication of data between MS A and server system 100, as shown by item 111. The separate communications session is established on the basis of the received call party details.

Server system 100 retrieves configuration data from data store 102 in steps 33*c* and 33*d* and transmits the configuration data on to MS A via the separate communications session in step 33*e*.

The configuration data indicates that the telephone call is with an automated system, in this case automated system 600. MS A therefore knows that the call is with an automated system and reconfigures at least a part of the graphical user interface in accordance with the configuration data received via the separate communication session.

In these embodiments of the invention, the reconfigurable graphical user interface of MS A comprises a touch-screen user interface and the reconfiguration comprises configuring one or more touch-sensitive screen regions in the at least part of the touch-screen user interface. The one or more touch-sensitive screen regions are operable to initiate one or more operations of MS A in response to user input via the one or more touch-sensitive screen regions.

In some embodiments of the invention, one of the touch-sensitive regions is operable to open a messaging application on MS A and instruct the messaging application to create a new message. The touch-sensitive region may be displayed in the form of an icon with accompanying text, for example 'Send message to called party'.

When the user of MS A presses the touch-sensitive region, a messaging application on MS A is initiated and a new message window is open. The messaging application may for example comprise a Short Message Service (SMS) application, a Multimedia Message Service (MMS) application, or an email application.

The user of MS A can then type text into the body field of the message. Once the user of MS A has finished typing in the message, the user presses a send key or similar and the message is transmitted to MS B in step 33g.

In embodiments of the invention, one of the one or more touch-sensitive regions is further operable to insert an identity associated with the intended recipient user device into a destination field of the new message. The user of MS A therefore does not need to enter in the required identity into the message.

The identity may comprise a telephony dialing number, an email address, or a Session Initiation Protocol Uniform Resource Identifier (SIP URI). The identity may be transmitted from the automated system as part of the configuration data, or retrieved from local storage on the device.

In some embodiments of the invention, the one or more touch-sensitive region is further operable to insert predetermined text into the body field of the new message. The predetermined text may for example include a commonly used text template such as 'Hi Bob, I tried to call you just now, but didn't get through. Please call me back when you are free'. The user of MS A therefore does not need to enter in the predetermined text. The predetermined text may be transmitted from the automated system as part of the configuration data, or retrieved from local storage on the device.

In other embodiments of the invention, one of the one or more touch-sensitive regions is operable to instruct said automated system to terminate said call. Hence, the user can choose not to send a message or leave a voicemail and end the call. Rather than ending the call using the telephony application on the user device, it may be more convenient for the user to initiate the termination of the call via one of the touch-sensitive regions, and this can be used to trigger the automated system to end the call on behalf of the user. In any case, in some operating systems, it may not be possible to cause the device itself to terminate the call from within an application. In such a scenario, a message, for example a SIP INFO message, instructing termination of the call can be transmitted to automated system 600 and the call can be terminated from the automated system 600.

In one embodiment of the invention, one of the one or more touch-sensitive regions is operable to instruct the automated system to initiate recordal of a voice message.

Figure 34:
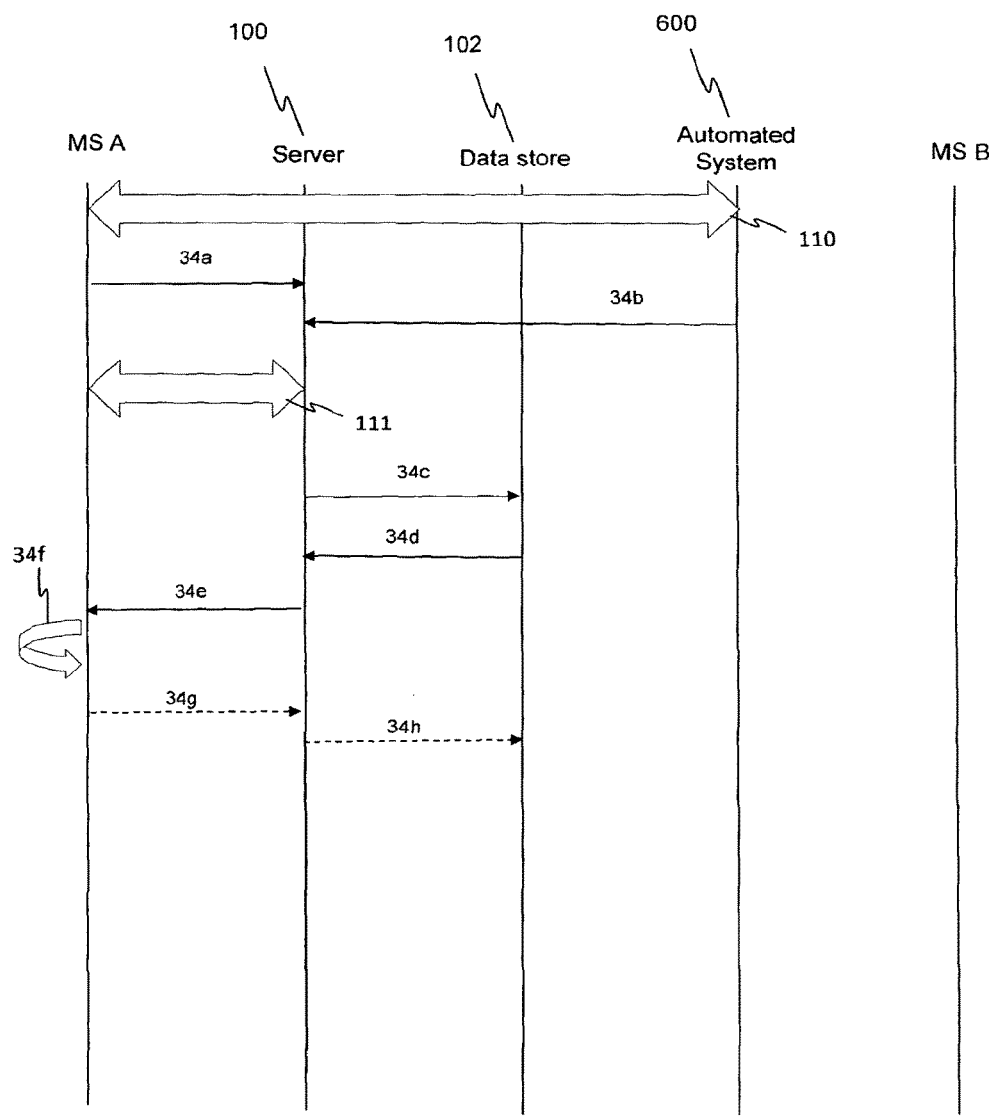
FIG. 34 is a flow diagram depicting operation of one or more embodiments of the invention using the system of FIG. 32.

FIG. 34 is a flow diagram depicting operation of embodiments of the invention using the system of FIG. 32.

In these embodiments, instead of wanting to send a message to MS B, the user of MS A wishes to convey one or more files to MS B.

In these embodiments, steps 34a to 34f occur in a similar manner to steps 33a to 33f described above in relation to FIG. 33.

Server system 100 receives call party details for a telephone call established between MS A and automated system 600. A separate communications session, separate from the telephone call, for the transfer of data to/from MS A is established, on the basis of one or more call party details associated with the telephone call. Sever 100 retrieves configuration data from data store 102 in steps 34c and 34d and transmits the configuration data to MS A in step 34e.

The configuration data instructs MS A to reconfigure at least a part of its graphical user interface as shown in step 34f.

In some embodiments of the invention the at least part is configured to include a touch-sensitive region which is operable to open a file browsing application on MS A. The user of MS A can thus select one or more files by appropriate user input to the file browsing application. The one or more selected files are then transmitted to server system 100 via the separate communication session in step 34g which stores the files in data store 102 in step 34h. The one or more files received via the session are stored in data store 102 in association with one or more call party details associated with the telephone call which enables the one or more files to be identified correctly for subsequent retrieval.

In other embodiments of the invention, the at least part is configured to include a touch-sensitive region which is operable to instruct a geographical location module application on the telephony user device to generate geographical location data relating to the physical location of the telephony user device and transmit data including or derived from the generated geographical location data via the session. Such embodiments could for example, allow the user of MS A to send in image file in the form of a map containing their current location to the user of B.

Figure 35:
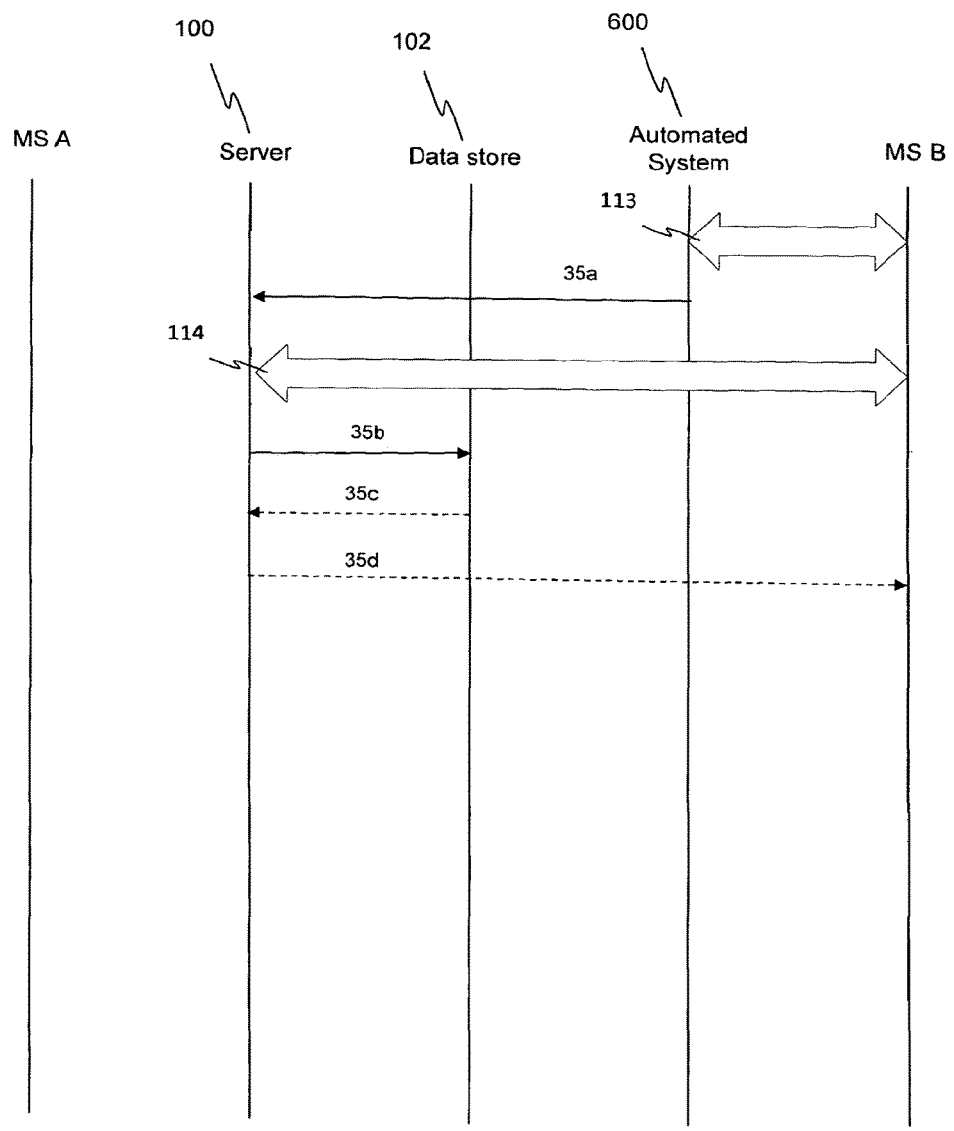
FIG. 35 is a flow diagram depicting operation of one or more embodiments of the invention using the system of FIG. 32.

FIG. 35 is a flow diagram depicting operation of embodiments of the invention using the system of FIG. 32.

These embodiments occur after the steps carried out in FIG. 34, i.e. the user of MS A has sent one or more files to server system 100 for subsequent retrieval by the user of MS B. These embodiments involve the user of MS B retrieving the one or more files from server system 100.

The user of MS B dials the number for automated system 600 and a call is established between MS B and automated system 600 as shown by item 113.

Automated system 600 detects the call in progress between itself and MS B and notifies server system 100 of call party details for the call, in step 35a.

Server system 100 establishes a separate communications session, separate from the telephone call between MS B and automated system 600, for the transfer of data to/from MS B, as shown by item 114. The separate communications session is established on the basis of one or more call party details associated with the telephone call.

Server performs a lookup in data store 102 in step 35b for files stored in association with MS B and retrieves one or more such files in step 35c. Server system 100 transmits the files retrieved in step 35c to MS B via the separate communications session in step 35d.

In some embodiments of the invention, the configuration data comprises one or more configuration settings. The one or more configuration settings indicate to MS A how it should reconfigure the at least part of its graphical user interface.

In other embodiments of the invention, one or more configuration settings are stored locally to MS A. When MS A receives configuration data via the separate communication session, MS A knows to refer to the one or more locally stored configuration settings in order to find out how to reconfigure the at least part of its graphical user interface.

In some embodiments of the invention, the configuration data is generated by automated system 600 and instead of establishing a separate communication session between server system 100 and MS A, a communication session between MS A and automated system 600 is established for the transmission of data to/from MS A.

Capabilities of the various devices to handle receipt/transmission of configuration data according to the invention can be ascertained by transmittal of a SIP INFO message with an appropriate eXtensible Markup Language (XML)

file embedded within it, with a corresponding SIP OK response message being returned containing the capability information. Such SIP INFO messages may be transmitted from automated system 600 to server system 100, from automated system 600 to MS A and/or from server system 100 to MS A.

The above embodiments are to be understood as illustrative examples of the invention. Further embodiments of the invention are envisaged.

In the above-described embodiments, the automated system is a voicemail system. In alternative embodiments, the automated system may take different forms.

In another embodiment of the invention, the automated system may comprise an interactive voice response (IVR) unit with which the user interacts on a call. Configuration data associated with the IVR unit, for example information resulting from an IVR interaction with the user, may be used to alter the information displayed on the reconfigured user interface.

In another embodiment of the invention, the automated system may comprise a conference call system, with which the user interacts on a call. Configuration data associated with the conference call system, for example a data entry screen requesting a conference call ID from the user may be displayed after the conference call system has been called by the user on a general conference calling number and a connection has been made. The conference call ID may then be collected and transmitted to the conference call system via the separate communications session.

The above described embodiments primarily relate to telephony devices having associated identities in the form of telephone dialing numbers. In other embodiments of the invention, one or more, or all of the identities could be non-telephone-dialing-numbers, for example usernames, email addresses etc. Where non-telephone-dialing-number identities are employed, mappings between non-telephone-dialing-number identities and telephone dialing number identities may be stored in data store 102 and used by server system 100 for converting from non-telephone-dialing-number identities to telephone dialing numbers after receipt of the call party details The personal computer PC A described above could alternatively be another device or combination of devices with corresponding data processing, display and data input capabilities, for example a television, a smart television, a general purpose desktop computer terminal, a general purpose laptop computer terminal, a general purpose tablet computer terminal, an in-car computing and communications system a satellite navigation system, games console, or any combination thereof.

In embodiments of the invention described above, telephone calls to/from mobile stations and POTS phones are detected either by application software running on the mobile stations or by a telephony apparatus configured accordingly. In alternative embodiments of the invention, during a voice call, a party to the call uses a computing terminal to enter in call party details (for example the calling and called party telephone dialing numbers) for the call via a web server interface. The web server interface passes the call party details to server system 100 which can then establish a communications session, separate to the voice call, on the basis of the calling and called party telephone dialing numbers received from the web server interface.

The logical coupling between user devices for a user may be temporary or more permanent. If for example a user has a POTS phone and a PC as their user devices in their home, then these devices will tend to be used by the user on a fairly permanent basis, so the logical coupling would tend to be more permanent. If for example a user has a mobile phone and a satellite navigation system in their car, then the logical coupling between the two devices may only be valid when the user is in or near their car, so the logical coupling would only be maintained temporarily when the two devices are within close enough proximity of each other.

The logical coupling between a user's devices can be activated (or otherwise triggered) by a variety of different processes. One example could involve communication between a smartphone and a satellite navigation system via a short wave radio interface (such as a Bluetooth™ interface) in order to couple the two devices together locally, along with subsequent registration of details of such with server system 100. Another example could be registration of device details via a website. A further example might involve registration by a service engineer when installing a telephone and set-top box combination. Alternatively, registration could be carried out over the telephone verbally to an administrative operator, or via an Interactive Voice Response (IVR) system.

The above embodiments of the invention describe telephone calls and establishment of communications sessions for user devices of two parties. All embodiments of the invention can be applied to user devices of multiple parties numbering more than two. When the multiple parties are conducting a multi-leg teleconference, a communications session can be created between all of their user devices, allowing communication of data, not just between two user devices, but between many different combinations of user devices, i.e. multi-branch data communication.

The connections between server system 100 and the user devices are described above as being HTTP or HTTPS connections. In alternative embodiments of the invention, the connections could be peer-to-peer connections such that data is communicated between the user devices through a number of peer-to-peer nodes. Creating the peer-to-peer connections may involve use of processes for traversing firewalls, for example using protocols such as the Simple Traversal of User Datagram Protocol (UDP) Through Network Address Translators (NATs) (STUN) protocol.

Further alternatively, the connections could initially be created as HTTP or HTTPS connections between server system 100 and the user devices, but then could be migrated to peer-to-peer connections according to network topography and/or current network load.

Embodiments of the invention described above involve communication of different types of data during a communication session, for example software component identifiers, software applications, feature identifiers, authorization requests, authorization indications, geographical location data, etc. Any of these different types of data may be communicated between the various combinations of devices in the above described embodiments, including mobile station to mobile station and mobile station to PC, both with or without use of telephony apparatus for call detection.

Embodiments of the invention described above allow a single predetermined affiliate such as a user of a device or a service provider to be associated with download of one or more files by a user of another device. In alternative embodiments of the invention, both a user of a device and a service provider can be associated with download of one or more file by a user of another device.

The exemplary embodiments described above in relation to FIGS. 29 to 31 include reconfiguration of a touch-screen user interface mobile telephone device MS A. The invention can equally be applied to a mobile telephony device having a non-touch-sensitive screen, in which case the reconfiguration can involve reconfiguring one or more soft-keys accordingly.

In the above-described embodiments, both call parties transmit, either from the telephony device, or an associated device, call party identifiers for each party to the server system 100 in the process of setting up the separate data communications session. These call party identifiers are, in the embodiments described, both telephony dialing numbers (TDNs). In alternative embodiments of the invention, one party or both parties may be identified by another form of call party identifier, using for example one or more lookup mechanisms which map a telephony dialing number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialing number of either party (since either party may be identified by other mechanisms), it is preferred that at least one of the devices includes the telephony dialing number of the other party. Indeed, whilst it is again not necessary, it is preferred that both parties transmit the telephony dialing number of the other party, if available, to the server system 100, during the session setup. Furthermore, in order at least to reduce latency at the server, and/or to reduce the need to maintain a separate store of identities and/or to reduce the need to implement a registration mechanism, it is preferred that both parties transmit both their own telephony dialing number and the telephony dialing number of the other party, if available, to the server system 100, during the session setup. If a call party is identifiable using an additional identifier, such as an extension number or a conference call ID, the additional identifier is preferably transmitted in association with both of the telephony dialing numbers, if available, by one or each party to the call.

As mentioned above, in alternative embodiments of the invention, one, or each, of the call parties may transmit, either from the telephony device, or an associated device, a unique identifier in the form other than that of a telephony dialing number which is nonetheless recognizable by the server system 100. A user device which interacts with the server may thus transmit the unique identifier to identify one party, or both parties, as a party to the call, instead of a telephony dialing number. For example, the server system 100 may have access to a data store which includes a set of unique identifiers for all subscribers registered to receive the service provided by the server system 100, along with a corresponding telephony dialing number for a telephony device associated with each respective unique identifier. Such unique identifiers may be allocated by the server system 100 during an initial registration procedure, and notified to, and stored by, an application on the user device which interacts with the server system 100 during the registration procedure. Other globally unique identifiers, such as email addresses, Facebook™ IDs, etc. may be used alternatively, or in addition, to such allocated unique identifiers.

In embodiments of the invention, at least one of the two call parties may use a Voice-over-Internet-Protocol (VoIP) enabled device or other device employing the session Initiation Protocol (SIP). One, or each, party may be identified in the call setup procedures by means of a unique SIP user identifier which may include a telephone dialing number as a user identifier or a user identifier other than a telephony dialing number, for example a SIP identifier in the form of username@hostname. Thus, a SIP user identifier can be transmitted to the server system 100 as a call party identifier identifying at least one or, each, participant in the call.

In embodiments of the invention, a call party identifier may take the form of an Internet Protocol (IP) address, which may be either a static or dynamically allocated IP address. This may for example be the IP address which a user device transmits to the server system 100 in a client-server connection setup request, for example an HTTP setup request, when establishing a leg of the communications session. This may uniquely identify the call party associated with the device making the request. If for example, a given party sends the telephony dialing number of only the other party to the server system 100 in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments of the invention, to identify a call party and may be one of the call party identifiers which forms part of the call party details transmitted to the server system 100, e.g. in a connection setup request during session establishment.

In embodiments of the invention, a call party identifier may take the form of a session identifier, or other unique identifier, generated by the server system 100 and received from the server system 100 by a user device in a push notification message. Such a push notification message may be sent from the server in response to the server receiving call party details from the other party to the call, in a first communication session leg. The push notification message is configured, on receipt, to trigger the user device to set up a second communication session leg with the server system 100. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialing number, or other call party identifier, by the server system 100. Hence, an identifier received in a push notification message may be used, in some embodiments of the invention, to identify a call party and may be one of the call party identifiers which forms part of the call party details transmitted to the server system 100, e.g. in a connection setup request during session establishment.

A unique identifier in any of the various forms described above, in a form other than that of a telephony dialing number, may be used to identify a given party to the call, in call party details transmitted by a user device associated with that given party. A unique identifier in any of the various forms described, in a form other than that of a telephony dialing number, may in addition, or in the alternative, be used to identify another party to the call, in call party details transmitted by that given party. The server system 100 may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialing number, or other received unique identifier, and a different unique identifier. The different unique identifier may then be used instead to identify the other party to the call in the call party details transmitted by at least one side of the call to the server system 100.

In the above, various forms of alternative call party identifiers are described. Whatever form the supplied unique identifier takes, the server system 100 may have a corresponding database and lookup mechanism to map a supplied unique identifier to a different call party identifier, such as a telephony dialing number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialing number of the other call party when the call is established. Hence, it is preferable that the system is configured such that at least one of the two parties may transmit the call party identifier of the other party to the server system 100 in the form of a telephony dialing number, and that the server system 100 is able to process one or more call party details in such a form in order to establish the separate communications session.

In alternative embodiments of the invention, rather than both call parties transmitting both calling party and called party identifiers to identify the parties to a call, at least one of the parties may transmit only one of the two call party identifiers to the server system 100. This may be done according to a predetermined convention, e.g. a convention which determines that the calling party should always transmit both identifiers but the called party need only transmit one identifier (or vice-versa). Again, the server system 100 is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialing number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server system 100 as a party to the call. However, providing both sides of the call do not use a number withholding service, the other party's device may be able identify both parties to the call, and preferably transmits call party details identifying both call parties to the server system 100 during session establishment. Again, the server system 100 is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow is preferably conducted via the PLMN, the communications relating to the separate data communications session, e.g. communications with the server system 100, may be conducted via a different radio access network (RAN), such as a wireless local area network (WLAN) based on the IEEE 802.11 standards.

In the above-described embodiments, the server system 100 is described as a single computing device located in a single network location. However, it should be understood that the server may consist of a distributed set of computing devices or applications, either co-located in a single network location, or dispersed in different network locations.

Various measures (for example, a method, telephony user device, computer software and a computer program product) of establishing a communications session for communication of data with respect to a telephony user device and at least one other user device in a data communications network are provided. Communications are conducted with a server system. The communications comprise a client-server connection. Call party details of a telephone call are transmitted to the server system in the communications. The telephone call involves at least the telephony user device, as a first telephony user device involved in said call, and a second telephony user device involved in said call. The call party details include a first identity associated with the first telephony user device and a second identity associated with the second telephony user device. The call party details allow the server system to establish a communications session whilst the telephone call is in progress. The communications session is separate from the telephone call and is for the transmission of data between the telephony user device and the at least one other user device via the server system. The separate communications session is continued in parallel with the telephone call, such that voice call data is transmitted and received between the telephony user device and the second telephony user device via the telephone call and other data may be transmitted and received between the telephony user device and the at least one further user device via the separate communications session.

In some embodiments, at least the second identity comprises a telephone dialing number.

In some embodiments, one of the first identity and the second identity comprises a telephone dialing number and the other of the first identity and the second identity comprises a non-telephone-dialing-number identity.

In some embodiments, the first identity comprises a telephone dialing number and the second identity comprises a telephone dialing number.

In some embodiments, at least one client-server connection request is transmitted to the server system.

In some embodiments, the at least one client-server connection request is transmitted in response to the telephone call being established.

In some embodiments, the at least one client-server connection request is transmitted in response to initiation of a data communications service on the telephony user device after the telephone call is established.

In some embodiments, the telephony user device includes an operating system and registers with the operating system to be notified upon the establishment of a telephone call involving the telephony user device.

In some embodiments, the telephony user device registers with an application programming interface of the operating system that is associated with the start and/or end of call events.

In some embodiments, the telephony user device includes communication session application software having an associated application identifier and the application identifier is transmitted to the server system.

In some embodiments, the telephony user device includes communication session application software having an associated application identifier, other data comprising the application identifier is received, and the received other data is directed to the communication session application software on the basis of the application identifier.

In some embodiments, the other data comprising the application identifier is received as a push notification.

In some embodiments, the client-server connection with the server system is maintained after termination of the telephone call.

In some embodiments, the telephony user device comprises a mobile telephony user device.

In some embodiments, the client-server connection is a HyperText Transfer Protocol (HTTP) connection.

In some embodiments, the client-server connection is a HyperText Transfer Protocol Secure (HTTPS) connection.

Various measures (for example, a method, server system, telecommunications network, computer software and a computer program product) of establishing a communications session for communication of data with respect to a telephony user device and at least one further user device in a data communications network are provided. Communications are conducted with a telephony user device. The communications comprise a client-server connection. Call party details of a telephone call are received from the telephony user device in the communications. The telephone call involves at least the telephony user device, as a first telephony user device involved in the call, and a second telephony user device involved in the call. The call party details include a first identity associated with the first telephony user device and a second identity associated with the second telephony user device. A communications session is established whilst the telephone call is in progress. The communications session is separate from the telephone call and is for the transmission of data between the telephony user device and the at least one other user device. The separate communications session is continued in parallel with the telephone call, such that voice call data is transmitted and received between the telephony user device and the second telephony user device via the telephone call and other data may be transmitted and received between the telephony user device and the at least one further user device via the separate communications session.

In some embodiments, the first identity comprises a telephone dialing number and the second identity comprises a telephone dialing number.

In some embodiments, one of the first identity and the second identity comprises a telephone dialing number and the other of the first identity and the second identity comprises a non-telephone-dialing-number identity.

In some embodiments, the non-telephone-dialing-number identity is mapped to a telephone dialing number after receipt of the call party details.

In some embodiments, the telephone call comprises a calling party and a called party. Call party details are received from telephony apparatus acting on behalf of the calling party and/or telephony apparatus acting on behalf of the called party.

In some embodiments, call party details are received from the telephony user device and/or the second telephony user device.

In some embodiments, at least part of the call party details is received from both the telephony apparatus acting on behalf of the calling party and the telephony apparatus acting on behalf of the called party.

In some embodiments, call party details including both said first and second identities are received from telephony apparatus acting on behalf of the called party and/or from telephony apparatus acting on behalf of the calling party.

In some embodiments, call party details including both the first and second identities are received from both telephony apparatus acting on behalf of the called party and from telephony apparatus acting on behalf of the calling party. The call party details received on behalf of each respective party are matched to establish the separate communications session.

In some embodiments, establishing said communications session comprises receiving at least one client-server connection request from at least one of the telephony user device and the at least one further user device, and establishing a client-server connection with the at least one of the telephony user device and the at least one further user device.

In some embodiments, establishing said session comprises receiving a client-server connection request from each of the telephony user device and the at least one further user device and establishing a client-server connection with each of the telephony user device and the at least one further user device.

In some embodiments, the client-server connection is maintained whilst the telephone call is established, by transmitting a message to keep the client-server connection alive if the telephone call lasts more than a connection threshold period.

In some embodiments, data, selected from the group consisting of a photographic image data file; a word processing document data file; a spreadsheet document data file; a presentation document data file; a video image data file; and streaming video, is received from at least one of the telephony user device and the at least one further user device, during the separate communications session. The data is transmitted to another of the telephony user device and the at least one further user device.

In some embodiments, data is transmitted via the client-server connection.

In some embodiments, a service data object is received from one of the telephony user device and the at least one further user device, during the separate communications session. The service data object is processed in combination with additional service data to generate derived service data. The derived service data is transmitted to another of the telephony user device and the at least one further user device.

In some embodiments, a service data object is received from one of the telephony user device and the at least one further user device, during the separate communications session. The service data object is transmitted to another of the telephony user device and the at least one further user device.

In some embodiments, the telephony user device includes communication session application software having an associated application identifier, and the application identifier is received from the telephony user device.

In some embodiments, the application identifier is stored in association with the first identity associated with the telephony user device.

In some embodiments, the telephony user device includes communication session application software having an associated application identifier, other data is received for the telephony user device, and other data including the application identifier is transmitted for the telephony user device.

In some embodiments, the other data including the application identifier is transmitted as a push notification.

In some embodiments, the client-server connection is a HyperText Transfer Protocol (HTTP) connection.

In some embodiments, the client-server connection is a HyperText Transfer Protocol Secure (HTTPS) connection.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, wherein the separate communications session is established whilst the telephone call is in progress, and wherein the separate communications session is continued in parallel with said telephone call, such that voice call data is transmitted via said telephone call and other data may be transmitted via said communications session, after the establishment of the separate communications session.

In some embodiments, said first identity comprises a telephone dialing number and said second identity comprises a telephone dialing number.

In some embodiments, one of said first identity and said second identity comprises a telephone dialing number and the other of said first identity and said second identity comprises a non-telephone-dialing-number identity.

Some embodiments comprise mapping said non-telephone-dialing-number identity to a telephone dialing number after receipt of said call party details.

In some embodiments, said telephone call comprises a calling party and a called party, and said method comprises receiving call party details from telephony apparatus acting on behalf of said calling party and/or telephony apparatus acting on behalf of said called party.

Some embodiments comprise receiving call party details from said first telephony user device and/or said second telephony user device.

Some embodiments comprise receiving at least part of said call party details from both said telephony apparatus acting on behalf of said calling party and said telephony apparatus acting on behalf of said called party.

Some embodiments comprise receiving call party details including both said first and second identities from telephony apparatus acting on behalf of said called party and/or from telephony apparatus acting on behalf of said calling party.

Some embodiments comprise receiving call party details including both said first and second identities from both telephony apparatus acting on behalf of said called party and from telephony apparatus acting on behalf of said calling party, and matching the call party details received on behalf of each respective party to establish said separate communications session.

In some embodiments, establishing said session comprises receiving at least one client-server connection request from at least one of said at least two different user devices, and establishing a client-server connection with said at least one of said at least two different user devices.

In some embodiments, establishing said session comprises receiving a client-server connection request from each of said at least two different user devices and establishing a client-server connection with each of said at least two different user devices.

In some embodiments, said at least one client-server connection request is transmitted in response to said telephone call being established.

In some embodiments, said at least one client-server connection request is transmitted in response to initiation of a data communications service on at least one of said at least two different user devices after the telephone call is established.

Some embodiments comprise maintaining said client-server connection whilst said telephone call is established, by transmitting a message to keep said client-server connection alive if said telephone call lasts more than a connection threshold period.

Some embodiments comprise receiving data, selected from the group consisting of a photographic image data file; a word processing document data file; a spreadsheet document data file; a presentation document data file; a video image data file; and streaming video, from one of said at least two different user devices, during said separate communications session, and transmitting said data to another of said at least two different user devices.

Some embodiments comprise transmitting said data via said client-server connection.

Some embodiments comprise establishing said separate communications session via a server and transmitting said data via a data communication path between said two different user devices which is established on the basis of information received from said server, said connection between said two different user devices not including said server in said data communication path.

Some embodiments comprise receiving a service data object from one of said at least two different user devices, during said separate communications session, processing said service data object in combination with additional service data to generate derived service data; and transmitting said derived service data to another of said at least two different user devices.

Some embodiments comprise receiving a service data object from one of said at least two different user devices, during said separate communications session, and transmitting said service data object to another of said at least two different user devices.

Some embodiments provide server apparatus arranged to perform the method of establishing a communications session.

Some embodiments provide a telecommunications network arranged to perform the method of establishing a communications session.

Some embodiments provide computer software adapted to perform the method of establishing a communications session.

Some embodiments provide a telephony user device capable of establishing a communications session for communication of data with respect to at least one other user device in a data communications network, the user device being capable of:

transmitting call party details of a telephone call, the telephone call involving at least said telephony user device, as a first telephony user device involved in said call, and a second telephony user device involved in said call, said call party details including a first identity associated with said first telephony user device and a second identity associated with said second telephony user device, at least said second identity comprising a telephone dialing number; and establishing a separate communications session, separate from said telephone call, for the receipt of data from said at least one other user device, on the basis of said first and second identities transmitted in said call party details, wherein the separate communications session is capable of being established whilst the telephone call is in progress, and wherein the separate communications session is capable of being continued in parallel with said telephone call, such that voice call data is received via said telephone call and other data may be received via said communications session, after the establishment of the separate communications session.

Some embodiments provide computer software for a telephony user device adapted to perform a method of establishing a communications session for communication of data with respect to at least one other user device in a data communications network, the method comprising:

transmitting call party details of a telephone call, the telephone call involving at least said telephony user device, as a first telephony user device involved in said call, and a second telephony user device involved in said call, said call party details including a first identity associated with said first telephony user device and a second identity associated with said second telephony user device, at least said second identity comprising a telephone dialing number; and establishing a separate communications session, separate from said telephone call, for the receipt of data from said at least one other user device, on the basis of said first and second identities transmitted in said call party details, wherein the separate communications session is capable of being established whilst the telephone call is in progress, and wherein the separate communications session is capable of being continued in parallel with said telephone call, such that voice call data is received via said telephone call and other data may be received via said communications session, after the establishment of the separate communications session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, wherein at least one of said at least two different user devices is a further user device, the further user device being different to said first telephony user device and said second telephony user device, and wherein said establishing comprises communicating with said further user device.

Some embodiments comprise mapping one of said first and second identities to a network address for said further user device.

Some embodiments comprise, prior to said telephone call, storing an association between said one of said first and second identities to said network address, and performing said mapping on the basis of said association.

Some embodiments comprise receiving, along with said call party details, a network address for said further device, during the telephone call.

Some embodiments comprise transmitting a notification to said network address, said notification relating to said session.

In some embodiments, establishing said session comprises receiving a client-server connection request from said further user device, and establishing a client-server connection with said further user device.

In some embodiments, establishing said session comprises receiving a client-server connection request from one of said first and second telephony user devices and establishing a client-server connection with one of said first and second telephony user devices.

In some embodiments, said client-server connection request is transmitted in response to said telephone call being established.

In some embodiments, said client-server connection request is transmitted in response to initiation of a data communications service on said further device after the telephone call is established.

Some embodiments comprise notifying said further user device of a change in state of said separate communications session in response to receiving an indication that said telephone call has been terminated.

In some embodiments, said further user device is selected from the group consisting of a set-top box, a television, a general purpose desktop computer terminal, a general purpose laptop computer terminal, a general purpose tablet computer terminal and an in-car computing and communications system.

Some embodiments provide server apparatus arranged to perform the method for establishing the communication session.

Some embodiments provide a telecommunications network arranged to perform the method for establishing the communication session.

Some embodiments provide computer software arranged to perform the method for establishing the communication session.

Some embodiments provide a user device capable of establishing a communications session for communication of data with respect to at least one other user device in a data communications network, the user device being a further user device other than at least a first telephony user device and a second telephony device, the further user device being configured for:

receiving call party details of a telephone call, the telephone call involving at least said first telephony user device and said second telephony user device, said call party details including a first identity associated with said first telephony user device and a second identity associated with said second telephony user device, at least said second identity comprising a telephone dialing number; and establishing a separate communications session, separate from said telephone call, for the receipt of data from said at least one other user device, on the basis of said first and second identities transmitted in said call party details, wherein the separate communications session is capable of being established whilst the telephone call is in progress, and wherein the separate communications session is capable of being continued in parallel with said telephone call, such that voice call data is received via said telephone call and other data may be received via said communications session, after the establishment of the separate communications session.

In some embodiments, said further user device is selected from the group consisting of a set-top box, a television, a general purpose desktop computer terminal, a general purpose laptop computer terminal, a general purpose tablet computer terminal and an in-car computing and communications system.

Some embodiments provide computer software for a user device adapted to perform a method of establishing a communications session for communication of data with respect to at least one other user device in a data communications network, the user device being a further user device other than at least a first telephony user device and a second telephony device, the method comprising:

receiving call party details of a telephone call, the telephone call involving at least said first telephony user device and said second telephony user device, said call party details including a first identity associated with said first telephony user device and a second identity associated with said second telephony user device, at least said second identity comprising a telephone dialing number; and establishing a separate communications session, separate from said telephone call, for the receipt of data from said at least one other user device, on the basis of said first and second identities transmitted in said call party details, wherein the separate communications session is capable of being established whilst the telephone call is in progress, and wherein the separate communications session is capable of being continued in parallel with said telephone call, such that voice call data is received via said telephone call and other data may be received via said communications session, after the establishment of the separate communications session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, wherein the method comprises:

receiving in-call signaling information relating to said telephone call in a network element involved in said telephone call; and triggering the transmission of said call party details in response to the receipt of said in-call signaling information.

In some embodiments, said network element is a call switching element.

In some embodiments, said method comprises setting a call-state trigger in said switching element and triggering the transmission of said call party details in response to said call switching element entering into a predetermined call state.

In some embodiments, said call-state trigger is an intelligent network (IN) call state trigger.

In some embodiments, at least one of said first and second telephony user devices is a mobile telephony user device and said IN call state trigger is a Customized Applications for Mobile networks Enhanced Logic (CAMEL) call state trigger.

Some embodiments comprise handing call control to a service control point (SCP) in response to said triggering and transmitting calling party details from said SCP to a remote server, at which the separate communications session is established.

In some embodiments, said network element comprises a call initiating element.

In some embodiments, said network element comprises a call initiating element configured to initiate the establishment of said telephone call in response to a remote click-to-dial website action by a user.

In some embodiments, one of said two different user devices is a further user device, different to said first and second telephony user devices.

In some embodiments, said network element is a network element for controlling telephone calls associated with said first telephony user device, and said separate communications session is established between said further user device and said second telephony user device.

In some embodiments, said two different user devices comprise said first and second telephony user devices.

Some embodiments provide a network element arranged to perform the method of establishing the communication session.

Some embodiments provide a telecommunications network arranged to perform the method of establishing the communication session.

Some embodiments provide computer software adapted to perform the method of establishing the communication session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, receiving, from one of said at least two different user devices, an identifier identifying a software component to be used in said separate communications session; and enabling the download of said software component to another of said at least two different user devices, in response to the receipt of said software component identifier.

In some embodiments, said method comprises conducting a capability check to determine whether said another of said at least two different user devices is initially enabled with said software component, and conducting said enabling if the capability check indicates that said another of said at least two different user devices is not initially enabled with said software component.

In some embodiments, said method comprises storing capability data indicating capabilities of a plurality of user devices in a data store accessible by a server, and conducting said capability check at said server.

In some embodiments, said capability check comprises transmitting a capability query to said another of said at least two different user devices, and receiving a response indicating whether said another of said at least two different user devices is initially enabled with said software component.

In some embodiments, said separate communications session is established using a session establishment software application or operating system function on said another of said at least two different user devices, and said software component is a software application which interoperates with said session establishment software application or operating system function.

In some embodiments, establishing said session comprises receiving a client-server connection request from, and establishing a client-server connection with, said another of said at least two different user devices, and transmitting said software application via said client-server connection.

In some embodiments, said client-server connection request is transmitted in response to said telephone call being established.

In some embodiments, said client-server connection request is transmitted in response to a notification received during said telephone call, after the telephone call is established.

Some embodiments provide server apparatus arranged to perform the method of establishing the communications session.

Some embodiments provide a telecommunications network arranged to perform the method of establishing the communications session.

Some embodiments provide computer software adapted to perform the method of establishing the communications session.

Some embodiments provide a telephony user device capable of establishing a communications session for communication of data with respect to at least one other user device in a data communications network, the telephony user device being capable of:

transmitting call party details of a telephone call, the telephone call involving at least said telephony user device, said telephony user device being a first telephony user device, and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least one other user device, enabling the download of a software component to be used in said separate communications session to said at least one other user device, said enabling comprising transmitting an identifier identifying a software component to be used in said separate communications session.

Some embodiments provide computer software for a telephony user device arranged to perform a method of establishing a communications session for communication of data with respect to at least one other user device in a data communications network, the method comprising:

transmitting call party details of a telephone call, the telephone call involving at least said telephony user device, said telephony user device being a first telephony user device, and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least one other user device, enabling the download of a software component to be used in said separate communications session to said at least one other user device, said enabling comprising transmitting an identifier identifying a software component to be used in said separate communications session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, wherein establishing said separate communications session comprises:

in response to receiving said call party details, identifying at least one of said at least two different user devices which is an initially non-enabled user device that does not have a capability associated with participating in said session; and enabling the download of a software application to the initially non-enabled user device, in order to provide the initially non-enabled user device with the capability associated with participating in said session.

In some embodiments, said enabling comprises transmitting a network address from which the software application can be downloaded.

In some embodiments, said network address is in the form of a Uniform Resource Locator (URL).

Some embodiments provide server apparatus arranged to perform the method of establishing the communications session.

Some embodiments provide a telecommunications network arranged to perform the method of establishing the communications session.

Some embodiments provide computer software adapted to perform the method of establishing the communications session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, receiving an identifier identifying a feature of said separate communications session that requires authorization for use by a user device;

in response to receipt of an authorization indication on behalf of one of said at least two different user devices, enabling the use of said feature by at least one other of said at least two different user devices.

Some embodiments comprise requesting authorization from said one of said at least two different user devices, to authorize the use of said feature by said at least one other of said at least two different user devices.

Some embodiments comprise receiving said identifier from said one of said at least two different user devices.

Some embodiments comprise transmitting payment authorization to a payment server on behalf of said one of said at least two different user devices to authorize the use of said feature by said at least one other of said at least two different user devices.

In some embodiments, enabling the use of said feature comprises using a service application to process service data transmitted during said separate communications session, said service application requiring authorization.

In some embodiments, enabling the use of said feature comprises accessing data in relation to which an identifier is transmitted during said separate communications session, said data access requiring authorization.

Some embodiments provide server apparatus arranged to perform the method of establishing the communications session.

Some embodiments provide a telecommunications network arranged to perform the method of establishing the communications session.

Some embodiments provide computer software adapted to perform the method of establishing the communications session.

Some embodiments provide a method of establishing a communications session for communication of data with respect to at least two different user devices in a data communications network, the method comprising the steps of:

receiving call party details of a telephone call, the telephone call involving at least a first telephony user device and a second telephony user device, said call party details including a first identity associated with said first telephony user device and a second identity associated with said second telephony user device, at least one of said first and second identities comprising a telephone dialing number; and establishing, on the basis of said first and second identities received in said call party details a separate communications session, separate from said telephone call, for the communication of data to and/or from said at least two different user devices, wherein the method comprises, during the separate communications session:

in response to receiving geographical location data relating to one of said at least two different user devices, transmitting data including or derived from said received geographical location data to at least one other of said at least two different user devices.

Some embodiments comprise requesting authorization from said one of said at least two different user devices, to authorize the transmission of said data including or derived from said received geographical location data to said at least one other of said at least two different user devices.

Some embodiments comprise receiving said geographical location data from said one of said at least two different user devices.

Some embodiments comprise receiving said geographical location data in the form of a data object including geographical coordinate data, conducting a capability check in relation to whether said at least one other of said at least two different user devices is capable of processing said geographical coordinate data during said separate communications session, and transmitting said geographical coordinate data to said at least one other of said at least two different user devices in response to said capability check indicating said at least one other of said at least two different user devices is capable of processing said geographical coordinate data during said separate communications session.

Some embodiments comprise receiving said geographical location data in the form of a data object including geographical coordinate data, generating a map image derived from said geographical coordinate data, and transmitting said derived map image to said at least one other of said at least two different user devices.

In some embodiments, said method comprises conducting a capability check in relation to whether said at least one other of said at least two different user devices is capable of processing said geographical coordinate data during said separate communications session, and transmitting said derived map image to said at least one other of said at least two different user devices in response to said capability check indicating said at least one other of said at least two different user devices is not capable of processing said geographical coordinate data during said separate communications session.

In some embodiments, establishing said session comprises receiving a client-server connection request from, and establishing a client-server connection with, said at least one other of said at least two different user devices, and transmitting said data including or derived from said received geographical location data via said client-server connection.

In some embodiments, said data including or derived from said received geographical location data is transmitted in response to a request received from said at least one other of said at least two different user devices during said separate communications session.

In some embodiments, said data including or derived from said received geographical location data is transmitted in response to a request from said one of said at least two different user devices during said separate communications session.

Some embodiments provide server apparatus arranged to perform the method of establishing the communications session.

Some embodiments provide a telecommunications network arranged to perform the method of establishing the communications session.

Some embodiments provide computer software adapted to perform the method of establishing the communications session.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of establishing a communications session for communication of data with respect to a first telephony user device and a second telephony user device in a data communications network, the method comprising:
    at said first telephony user device conducting communications with a server system;
    transmitting at least one client-server connection request to the server system in said communications and establishing a client-server connection with the server system; and
    transmitting call party details of a telephone call from said first telephony user device to the server system in said communications, the telephone call involving at least said first telephony user device and said second telephony user device, said call party details including a first identity associated with said first telephony user device and a second identity associated with said second telephony user device,
    wherein said call party details allow the server system to establish a communications session between the first telephony user device and the second telephony user device whilst the telephone call is in progress, the communications session being separate from said telephone call and for transmission of data between said first telephony user device and said second telephony user device via the server system,
    wherein the separate communications session is continued in parallel with said telephone call, such that voice call data is transmitted and received between the first telephony user device and the second telephony user device via said telephone call and other data may be transmitted and received between said first telephony user device and said second telephony user device via the separate communications session, and
    wherein the method comprises receiving a message from the server system to keep said client-server connection alive when said telephone call lasts more than a connection threshold period and
    wherein the method comprises the first telephony user device transmitting data to the second telephony user device via the separate communications session.

2. The method of claim 1, wherein at least said second identity comprises a telephone dialing number.

3. The method of claim 1, wherein one of said first identity and said second identity comprises a telephone dialing number and the other of said first identity and said second identity comprises a non-telephone dialing-number identity.

4. The method of claim 1, wherein said first identity comprises a telephone dialing number and said second identity comprises a telephone dialing number.

5. The method of claim 1, comprising transmitting said at least one client-server connection request in response to said telephone call being established or in response to initiation of a data communications service on said first telephony user device after the telephone call is established.

6. The method of claim 1, wherein the first telephony user device includes an operating system and wherein the method comprises registering with the operating system to be notified upon the establishment of a telephone call involving the first telephony user device.

7. The method of claim 6, comprising registering with an application programming interface of the operating system that is associated with the start and/or end of call events.

8. The method of claim 1, wherein said first telephony user device includes communication session application software having an associated application identifier and wherein the method comprises:
    transmitting the application identifier to the server system.

9. The method of claim 1, wherein said first telephony user device includes communication session application software having an associated application identifier, and wherein the method comprises:
    receiving other data comprising the application identifier; and
    directing the received other data to the communication session application software on the basis of the application identifier.

10. The method of claim 9, comprising receiving said other data comprising the application identifier as a push notification.

11. The method of claim 1, comprising maintaining said client-server connection with the server system after termination of said telephone call.

12. The method of claim 1, wherein the first telephony user device comprises a mobile telephony user device.

13. The method of claim 1, wherein said client-server connection is a HyperText Transfer Protocol (HTTP) connection or a HyperText Transfer Protocol Secure (HTTPS) connection.

14. A first telephony user device capable of establishing a communications session for communication of data with respect to a second telephony user device in a data communications network, wherein:
    said first telephony user device is configured to conduct communications with a server system;

said first telephony user device is configured to transmit at least one client-server connection request to the server system in said communications and establish a client-server connection with the server system; and said first telephony user device is configured to transmit call party details of a telephone call to the server system in said communications, the telephone call involving at least said first telephony user device and said second telephony user device, said call party details including a first identity associated with said first telephony user device and a second identity associated with said second telephony user device, wherein said call party details allow the server system to establish a communications session between the first telephony user device and the second telephony user device whilst the telephone call is in progress, the communications session being separate from said telephone call and for transmission of data between said first telephony user device and said second telephony user device via the server system, wherein the separate communications session is continued in parallel with said telephone call, such that voice call data is transmitted and received between the first telephony user device and the second telephony user device via said telephone call and other data may be transmitted and received between said first telephony user device and said second telephony user device via the separate communications session, and wherein the first telephony user device is configured to receive a message from the server system to keep said client-server connection alive when said telephone call lasts more than a connection threshold period, and wherein the first telephony user device is configured to transmit data to the second telephony user device via the separate communications session.

\* \* \* \* \*